United States Patent
Cho

(10) Patent No.: US 8,125,543 B2
(45) Date of Patent: Feb. 28, 2012

(54) SOLID-STATE IMAGING DEVICE AND IMAGING APPARATUS WITH COLOR CORRECTION BASED ON LIGHT SENSITIVITY DETECTION

(75) Inventor: Hirotake Cho, Kanagawa (JP)

(73) Assignee: Sony Corporation, Tokyo (JP)

( * ) Notice: Subject to any disclaimer, the term of this patent is extended or adjusted under 35 U.S.C. 154(b) by 477 days.

(21) Appl. No.: 12/041,931

(22) Filed: Mar. 4, 2008

(65) Prior Publication Data

US 2008/0218597 A1  Sep. 11, 2008

(30) Foreign Application Priority Data

Mar. 6, 2007 (JP) ................................ 2007-055797

(51) Int. Cl.
*H04N 5/217* (2006.01)
*H04N 9/083* (2006.01)
*H04N 3/14* (2006.01)
*H04N 5/335* (2006.01)
*H04N 9/04* (2006.01)

(52) U.S. Cl. ...................................... 348/241; 348/276

(58) Field of Classification Search .................. 348/273, 348/276

See application file for complete search history.

(56) References Cited

U.S. PATENT DOCUMENTS 6,847,397 B1 * 1/2005 Osada ........................... 348/273
(Continued)

FOREIGN PATENT DOCUMENTS

JP  2001-218073  8/2001
(Continued)

OTHER PUBLICATIONS

Japanese Office Action issued on Oct. 25, 2011, in connection with counterpart JP Application No. 2007-055797.

*Primary Examiner* — Albert Cutler
(74) *Attorney, Agent, or Firm* — SNR Denton US LLP

(57) ABSTRACT

A solid-state imaging device includes: a first detecting portion that detects each component by dividing a first wavelength region of image information into a plurality of wavelength regions; a second detecting portion that detects components in the first wavelength region with higher sensitivity than the components in the first wavelength region detected by the first detecting portion; and a signal processing unit including a high sensitization signal processing portion that acquires a signal indicating a measured amount on the basis of a unit signal corresponding to each wavelength detected in the first detecting portion and that executes a sensitivity correction operation on the unit signal corresponding to each wavelength detected in the first detecting portion by using the signal indicating the measured amount and a signal of the component in the first wavelength region, which has high sensitivity and is detected in the second detecting portion.

8 Claims, 27 Drawing Sheets

U.S. PATENT DOCUMENTS

| | | | |
|---|---|---|---|
| 6,853,748 B2 * | 2/2005 | Endo et al. | 382/167 |
| 6,882,364 B1 * | 4/2005 | Inuiya et al. | 348/252 |
| 6,897,425 B2 * | 5/2005 | Osada | 250/208.1 |
| 7,126,633 B2 * | 10/2006 | Saito | 348/279 |
| 7,468,746 B2 * | 12/2008 | Sugimoto | 348/229.1 |
| 7,609,306 B2 * | 10/2009 | Oda | 348/273 |
| 7,796,814 B2 * | 9/2010 | Sato et al. | 382/167 |
| 2001/0024237 A1 * | 9/2001 | Osada et al. | 348/273 |
| 2005/0248667 A1 * | 11/2005 | Schweng et al. | 348/234 |
| 2007/0109422 A1 * | 5/2007 | Osada et al. | 348/222.1 |

FOREIGN PATENT DOCUMENTS

| | | |
|---|---|---|
| JP | 2009-504012 | 1/2009 |
| WO | 99/59345 | 11/1999 |
| WO | 2007/015982 | 2/2007 |

\* cited by examiner

FIG. 1

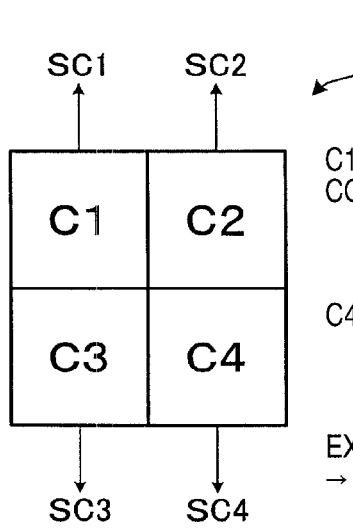

C1, C2, C3 (ALLOWING FIRST WAVELENGTH REGION COMPONENT TO BE TRANSMITTED
  1) PRIMARY COLOR SYSTEM → R, G, B
  2) COMMPLEMENTARY COLOR SYSTEM → Cy, Mg, Ye

C4 (FIRST WAVELENGTH REGION COMPONENT + α)
  → ALL BAND TRANSMITTED → EQUIVALENT TO STATE IN WHICH THERE IS NO COLOR FILTER

EXAMPLE: FIRST WAVELENGTH REGION COMPONENT
→ VISIBLE LIGHT REGION COMPONENT
  α → INVISIBLE LIGHT REGION COMPONENT
  → INFRARED LIGHT COMPONENT, ULTRAVIOLET LIGHT COMPONENT

FIG. 2A
BAYER ARRANGEMENT

| G | R | G | R |
|---|---|---|---|
| B | G | B | G |
| G | R | G | R |
| B | G | B | G |

FIG. 2B
FIRST ARRANGEMENT → SQUARE MATRIX ARRANGEMENT

| A | B | A | R | A | B | A | R |
|---|---|---|---|---|---|---|---|
| G | A | G | A | G | A | G | A |
| A | R | A | B | A | R | A | B |
| G | A | G | A | G | A | G | A |
| A | B | A | R | A | B | A | R |
| G | A | G | A | G | A | G | A |
| A | R | A | B | A | R | A | B |
| G | A | G | A | G | A | G | A |

R: RED PIXEL 12R/ RED FILTER 14R
G: GREEN PIXEL 12G/ GREEN FILTER 14G
B: BLUE PIXEL 12B/ BLUE FILTER 14B
A: WIDE WAVELENGTH REGION PIXEL 12A / WHITE FILTER 14W OR NONE

FIG. 2C
SECOND ARRANGEMENT

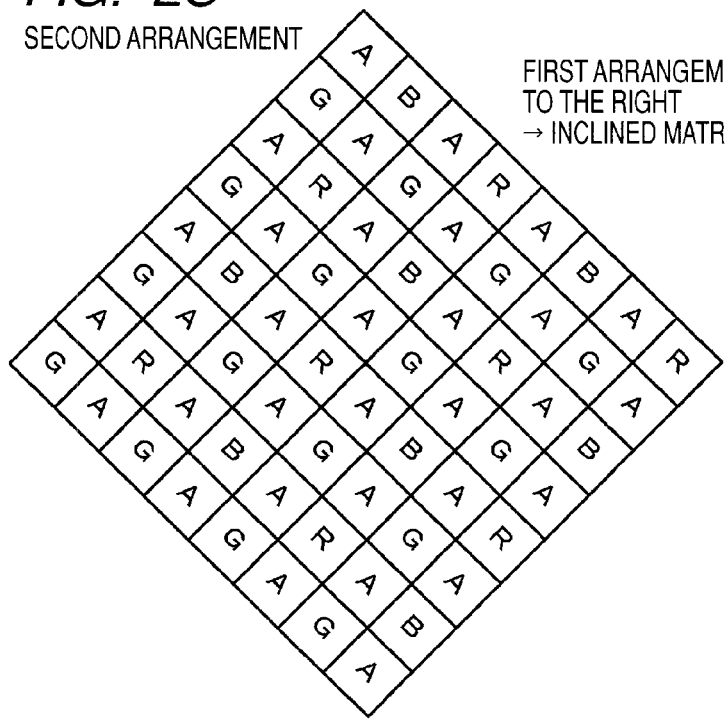

FIRST ARRANGEMENT IS ROTATED BY 45° TO THE RIGHT
→ INCLINED MATRIX ARRANGEMENT

FIG. 4

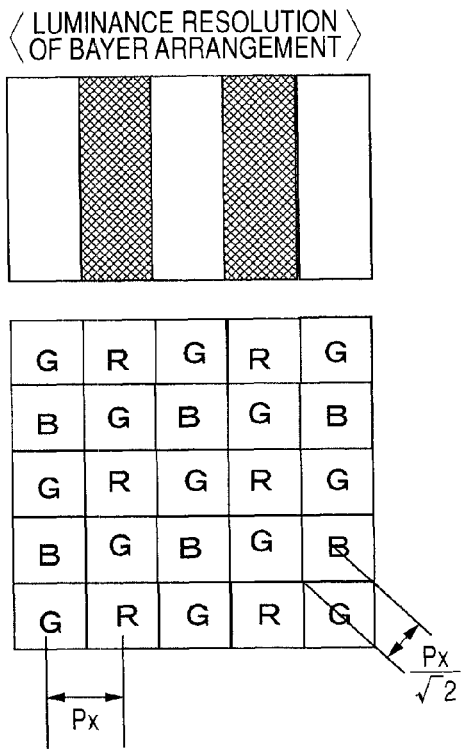
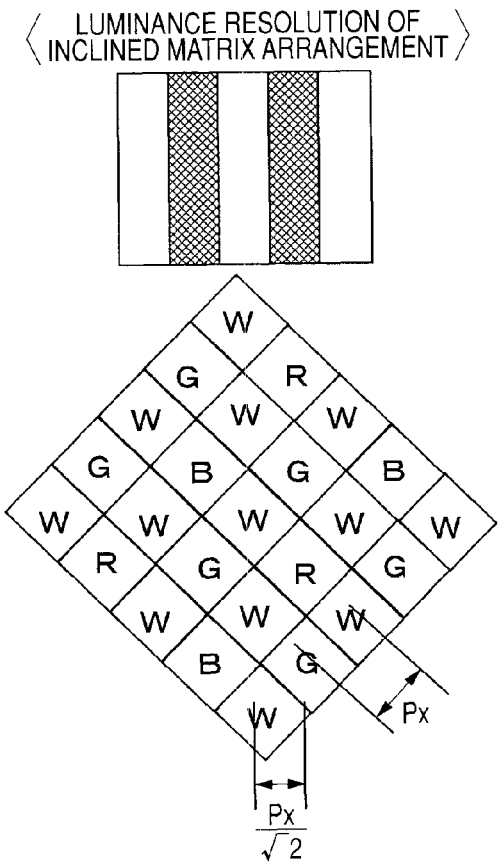

⟨ LUMINANCE RESOLUTION OF BAYER ARRANGEMENT ⟩

⟨ LUMINANCE RESOLUTION OF INCLINED MATRIX ARRANGEMENT ⟩

SAMPLING FREQUENCY
HORIZONTAL: $Fs = 1/Px$
VERTICAL: $Fs = 1/Py$
INCLINATION 45°: $Fs = \sqrt{2}/Px$ SAMPLING FREQUENCY
HORIZONTAL: $Fs = \sqrt{2}/Px$
VERTICAL: $Fs = \sqrt{2}/Py$
INCLINATION 45°: $Fs = 1/Px$ NYQUIST LIMIT (1/2Fs)
HORIZONTAL: $1/2Fs = 1/(2 \cdot Px)$
VERTICAL: $1/2Fs = 1/(2 \cdot Py)$
INCLINATION 45°: $1/2Fs = \sqrt{2}/(2 \cdot Px)$ NYQUIST LIMIT (1/2Fs)
HORIZONTAL: $1/2Fs = \sqrt{2}/(2 \cdot Px)$
VERTICAL: $1/2Fs = \sqrt{2}/(2 \cdot Py)$
INCLINATION 45°: $1/2Fs = 1/(2 \cdot Px)$

FIG. 5

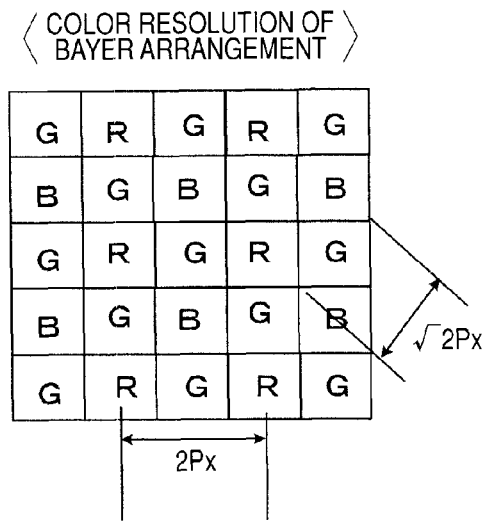

⟨COLOR RESOLUTION OF BAYER ARRANGEMENT⟩

SAMPLING FREQUENCY
HORIZONTAL: Fs = 1/(2·Px)
VERTICAL: Fs = 1/(2·Py)
INCLINATION 45°: Fs = 1/(√2·Px)

NYQUIST LIMIT (1/2Fs)
HORIZONTAL: 1/2Fs = 1/(2·Px)
VERTICAL: 1/2Fs = 1/(2·Py)
INCLINATION 45°: 1/2Fs = √2/(4·Px)

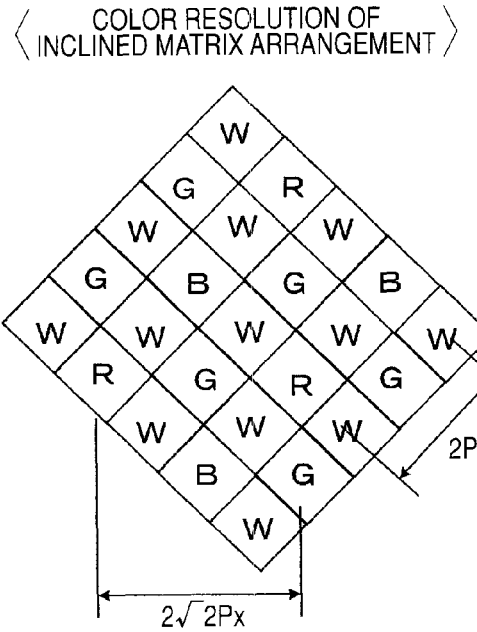

⟨COLOR RESOLUTION OF INCLINED MATRIX ARRANGEMENT⟩

SAMPLING FREQUENCY
HORIZONTAL: Fs = √2/(4·Px)
VERTICAL: Fs = √2/(4·Py)
INCLINATION 45°: Fs = 1/(2·Px)

NYQUIST LIMIT (1/2Fs)
HORIZONTAL: 1/2Fs = √2/(8·Px)
VERTICAL: 1/2Fs = √2/(8·Py)
INCLINATION 45°: 1/2Fs = 1/(4·Px)

FIG. 6

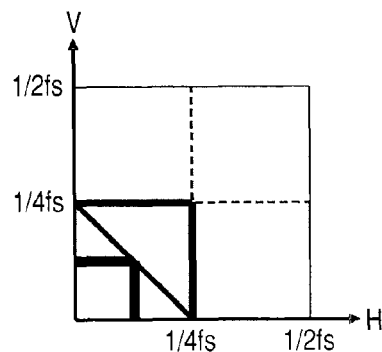

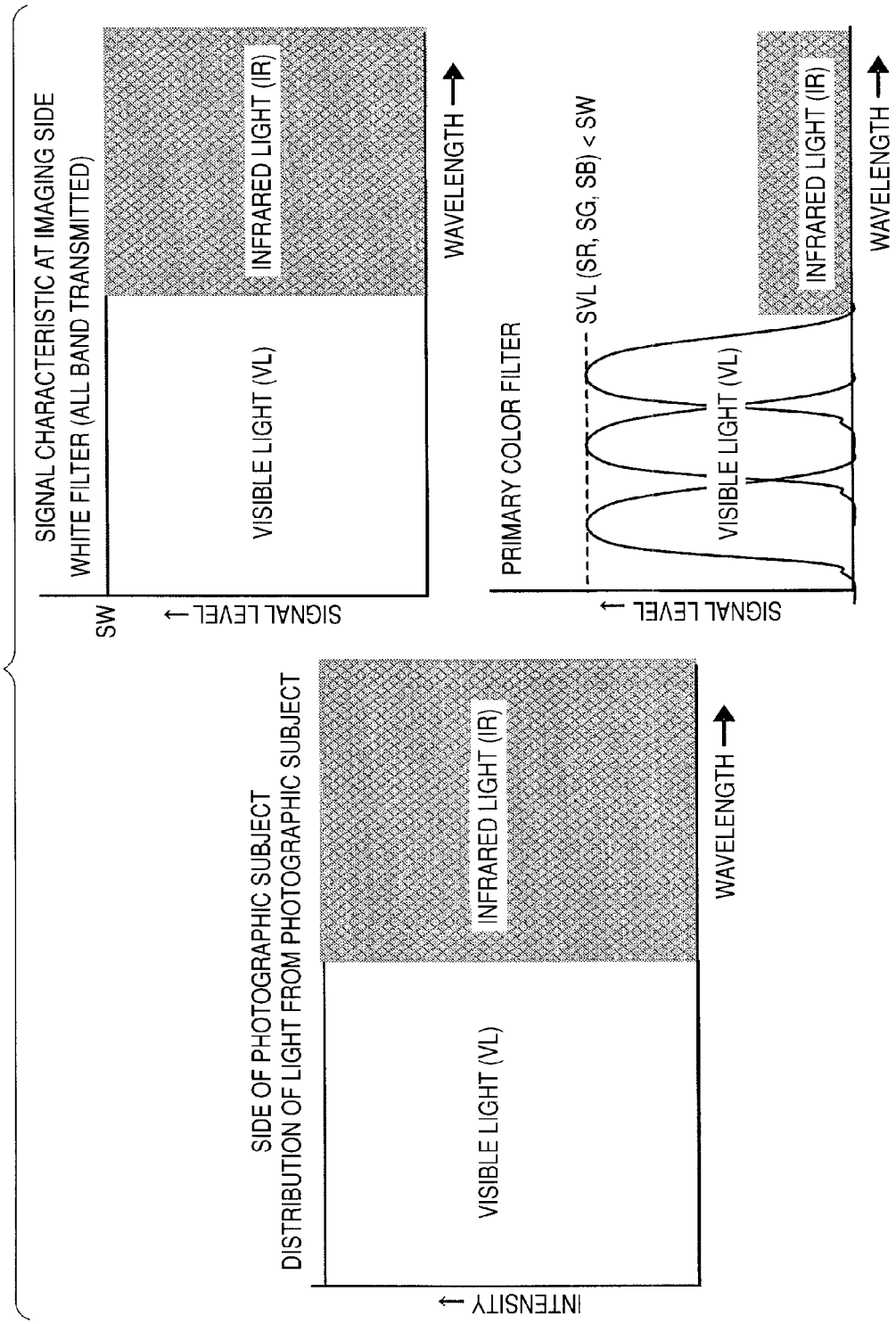

INCLINED MATRIX ARRANGEMENT

SQUARE ARRANGING

DEMOSAIC IMAGE W

R: RED PIXEL 12R/
RED FILTER 14R

G: GREEN PIXEL 12G/
GREEN FILTER 14G

B: BLUE PIXEL 12B/
BLUE FILTER 14B

A: WIDE WAVELENGTH
REGION PIXEL 12A/
WHITE FILTER 14W
OR NONE

BL: BLANK PIXEL 12BL

DEMOSAIC IMAGE G

DEMOSAIC IMAGE R

DEMOSAIC IMAGE B

INTERPOLATION PROCESSING
WITH CORRELATION CORRECTION

FIG. 13

STATE IN WHICH INCLINED MATRIX ARRANGEMENT IS CHANGED TO SQUARE MATRIX ARRANGEMENT

| G | BL | B | BL | G | BL | B |
|---|---|---|---|---|---|---|
| BL | A | BL | A | BL | A | BL |
| R | BL | G | BL | R | BL | G |
| BL | A | BL | A | BL | A | BL |
| G | BL | B | BL | G | BL | B |
| BL | A | BL | A | BL | A | BL |
| R | BL | G | BL | R | BL | G |

HIGH-SENSITIVITY MOSAIC IMAGE W

|   |   |   |   |   |   |   |
|---|---|---|---|---|---|---|
|   | A |   | A |   | A |   |
|   |   |   |   |   |   |   |
|   | A |   | A |   | A |   |
|   |   |   |   |   |   |   |
|   | A |   | A |   | A |   |
|   |   |   |   |   |   |   |

GWBL MOSAIC IMAGE G1 (REFER TO R AND B)

| G | BL | g | BL | G | BL | g |
|---|---|---|---|---|---|---|
| BL | A | BL | A | BL | A | BL |
| g | BL | G | BL | g | BL | G |
| BL | A | BL | A | BL | A | BL |
| G | BL | g | BL | G | BL | g |
| BL | A | BL | A | BL | A | BL |
| g | BL | G | BL | g | BL | G |

WBL MOSAIC IMAGE W2 (REFER TO G1)

| a | BL | a | BL | a | BL | a |
|---|---|---|---|---|---|---|
| BL | A | BL | A | BL | A | BL |
| a | BL | a | BL | a | BL | a |
| BL | A | BL | A | BL | A | BL |
| a | BL | a | BL | a | BL | a |
| BL | A | BL | A | BL | A | BL |
| a | BL | a | BL | a | BL | a |

HIGH-SENSITIVITY DEMOSAIC IMAGE W3

| a | a | a | a | a | a | a |
|---|---|---|---|---|---|---|
| a | A | a | A | a | A | a |
| a | a | a | a | a | a | a |
| a | A | a | A | a | A | a |
| a | a | a | a | a | a | a |
| a | A | a | A | a | A | a |
| a | a | a | a | a | a | a |

FIG. 14

STATE IN WHICH INCLINED MATRIX ARRANGEMENT IS CHANGED TO SQUARE MATRIX ARRANGEMENT

| G | BL | B | BL | G | BL | B |
|---|---|---|---|---|---|---|
| BL | A | BL | A | BL | A | BL |
| R | BL | G | BL | R | BL | G |
| BL | A | BL | A | BL | A | BL |
| G | BL | B | BL | G | BL | B |
| BL | A | BL | A | BL | A | BL |
| R | BL | G | BL | R | BL | G |

GREEN MOSAIC IMAGE G

| G |  |  |  | G |  |  |
|---|---|---|---|---|---|---|
|  |  |  |  |  |  |  |
|  |  | G |  |  |  | G |
|  |  |  |  |  |  |  |
| G |  |  |  | G |  |  |
|  |  |  |  |  |  |  |
|  |  | G |  |  |  | G |

GWBL MOSAIC IMAGE G1 (REFER TO R AND B)

| G | BL | g | BL | G | BL | g |
|---|---|---|---|---|---|---|
| BL | A | BL | A | BL | A | BL |
| g | BL | G | BL | g | BL | G |
| BL | A | BL | A | BL | A | BL |
| G | BL | g | BL | G | BL | g |
| BL | A | BL | A | BL | A | BL |
| g | BL | G | BL | g | BL | G |

GBL MOSAIC IMAGE G2 (REFER TO W2)

| G | BL | g | BL | G | BL | g |
|---|---|---|---|---|---|---|
| BL | g | BL | g | BL | g | BL |
| g | BL | G | BL | g | BL | G |
| BL | g | BL | g | BL | g | BL |
| G | BL | g | BL | G | BL | g |
| BL | g | BL | g | BL | g | BL |
| g | BL | G | BL | g | BL | G |

DEMOSAIC IMAGE G3 NOT HAVING HIGH SENSITIVITYY (REFER TO W3)

| G | g | g | g | G | g | g |
|---|---|---|---|---|---|---|
| g | g | g | g | g | g | g |
| g | g | G | g | g | g | G |
| g | g | g | g | g | g | g |
| G | g | g | g | G | g | g |
| g | g | g | g | g | g | g |
| g | g | G | g | g | g | G |

FIG. 15

STATE IN WHICH INCLINED MATRIX ARRANGEMENT IS CHANGED TO SQUARE MATRIX ARRANGEMENT

| G | BL | B | BL | G | BL | B |
|---|---|---|---|---|---|---|
| BL | A | BL | A | BL | A | BL |
| R | BL | G | BL | R | BL | G |
| BL | A | BL | A | BL | A | BL |
| G | BL | B | BL | G | BL | B |
| BL | A | BL | A | BL | A | BL |
| R | BL | G | BL | R | BL | G |

RED MOSAIC IMAGE R

| | | | | | | |
|---|---|---|---|---|---|---|
| | | | | | | |
| R | | | | R | | |
| | | | | | | |
| | | | | | | |
| | | | | | | |
| R | | | | R | | |

RGWBL MOSAIC IMAGE R0 (REFER TO W2)

| G | BL | r | BL | G | BL | r |
|---|---|---|---|---|---|---|
| BL | A | BL | A | BL | A | BL |
| R | BL | G | BL | R | BL | G |
| BL | A | BL | A | BL | A | BL |
| G | BL | r | BL | G | BL | r |
| BL | A | BL | A | BL | A | BL |
| R | BL | G | BL | R | BL | G |

RWBL MOSAIC IMAGE R1 (REFER TO W2)

| r | BL | r | BL | r | BL | r |
|---|---|---|---|---|---|---|
| BL | A | BL | A | BL | A | BL |
| R | BL | r | BL | R | BL | r |
| BL | A | BL | A | BL | A | BL |
| r | BL | r | BL | r | BL | r |
| BL | A | BL | A | BL | A | BL |
| R | BL | r | BL | R | BL | r |

RBL MOSAIC IMAGE R2 (REFER TO W2)

| r | BL | r | BL | r | BL | r |
|---|---|---|---|---|---|---|
| BL | r | BL | r | BL | r | BL |
| R | BL | r | BL | R | BL | r |
| BL | r | BL | r | BL | r | BL |
| r | BL | r | BL | r | BL | r |
| BL | r | BL | r | BL | r | BL |
| R | BL | r | BL | R | BL | r |

DEMOSAIC IMAGE R3 NOT HAVING HIGH SENSITIVITY (REFER TO W3)

| r | r | r | r | r | r | r |
|---|---|---|---|---|---|---|
| r | r | r | r | r | r | r |
| R | r | r | r | R | r | r |
| r | r | r | r | r | r | r |
| r | r | r | r | r | r | r |
| r | r | r | r | r | r | r |
| R | r | r | r | R | r | r |

FIG. 16

STATE IN WHICH INCLINED MATRIX ARRANGEMENT IS CHANGED TO SQUARE MATRIX ARRANGEMENT

| G  | BL | B  | BL | G  | BL | B  |
|----|----|----|----|----|----|----|
| BL | A  | BL | A  | BL | A  | BL |
| R  | BL | G  | BL | R  | BL | G  |
| BL | A  | BL | A  | BL | A  | BL |
| G  | BL | B  | BL | G  | BL | B  |
| BL | A  | BL | A  | BL | A  | BL |
| R  | BL | G  | BL | R  | BL | G  |

BLUE MOSAIC IMAGE B

|   |   |   | B |   |   | B |
|---|---|---|---|---|---|---|
|   |   |   |   |   |   |   |
|   |   |   |   |   |   |   |
|   |   |   |   |   |   |   |
|   |   |   | B |   |   | B |
|   |   |   |   |   |   |   |
|   |   |   |   |   |   |   |

BGWBL MOSAIC IMAGE B0 (REFER TO W2)

| G  | BL | B  | BL | G  | BL | B  |
|----|----|----|----|----|----|----|
| BL | A  | BL | A  | BL | A  | BL |
| b  | BL | G  | BL | b  | BL | G  |
| BL | A  | BL | A  | BL | A  | BL |
| G  | BL | B  | BL | G  | BL | B  |
| BL | A  | BL | A  | BL | A  | BL |
| b  | BL | G  | BL | b  | BL | G  |

BWBL MOSAIC IMAGE B1 (REFER TO W2)

| b  | BL | B  | BL | b  | BL | B  |
|----|----|----|----|----|----|----|
| BL | A  | BL | A  | BL | A  | BL |
| b  | BL | b  | BL | b  | BL | b  |
| BL | A  | BL | A  | BL | A  | BL |
| b  | BL | B  | BL | b  | BL | B  |
| BL | A  | BL | A  | BL | A  | BL |
| b  | BL | b  | BL | b  | BL | b  |

BBL MOSAIC IMAGE B2 (REFER TO W2)

| b  | BL | B  | BL | b  | BL | B  |
|----|----|----|----|----|----|----|
| BL | b  | BL | b  | BL | b  | BL |
| b  | BL | b  | BL | b  | BL | b  |
| BL | b  | BL | b  | BL | b  | BL |
| b  | BL | B  | BL | b  | BL | B  |
| BL | b  | BL | b  | BL | b  | BL |
| b  | BL | b  | BL | b  | BL | b  |

DEMOSAIC IMAGE B3 NOT HAVING HIGH SENSITIVITY (REFER TO W3)

| b | b | B | b | b | b | B |
|---|---|---|---|---|---|---|
| b | b | b | b | b | b | b |
| b | b | b | b | b | b | b |
| b | b | b | b | b | b | b |
| b | b | B | b | b | b | B |
| b | b | b | b | b | b | b |
| b | b | b | b | b | b | b |

FIG. 17

SQUARE MATRIX ARRANGEMENT CODING

| A | B | A | R | A | B | A |
|---|---|---|---|---|---|---|
| G | A | G | A | G | A | G |
| A | R | A | B | A | R | A |
| G | A | G | A | G | A | G |
| A | B | A | R | A | B | A |
| G | A | G | A | G | A | G |
| A | R | A | B | A | R | A |

HIGH-SENSITIVITY MOSAIC IMAGE W2

| A |   | A |   | A |   | A |
|---|---|---|---|---|---|---|
|   | A |   | A |   | A |   |
| A |   | A |   | A |   | A |
|   | A |   | A |   | A |   |
| A |   | A |   | A |   | A |
|   | A |   | A |   | A |   |
| A |   | A |   | A |   | A |

HIGH-SENSITIVITY MOSAIC IMAGE W3

| A | a | A | a | A | a | A |
|---|---|---|---|---|---|---|
| a | A | a | A | a | A | a |
| A | a | A | a | A | a | A |
| a | A | a | A | a | A | a |
| A | a | A | a | A | a | A |
| a | A | a | A | a | A | a |
| A | a | A | a | A | a | A |

FIG. 18

SQUARE MATRIX ARRANGEMENT CODING

| A | B | A | R | A | B | A |
|---|---|---|---|---|---|---|
| G | A | G | A | G | A | G |
| A | R | A | B | A | R | A |
| G | A | G | A | G | A | G |
| A | B | A | R | A | B | A |
| G | A | G | A | G | A | G |
| A | R | A | B | A | R | A |

GREEN MOSAIC IMAGE G

|   |   |   |   |   |   |   |
|---|---|---|---|---|---|---|
| G |   | G |   | G |   | G |
|   |   |   |   |   |   |   |
| G |   | G |   | G |   | G |
|   |   |   |   |   |   |   |
| G |   | G |   | G |   | G |
|   |   |   |   |   |   |   |

GW MOSAIC IMAGE G2

| A | g | A | g | A | g | A |
|---|---|---|---|---|---|---|
| G | A | G | A | G | A | G |
| A | g | A | g | A | g | A |
| G | A | G | A | G | A | G |
| A | g | A | g | A | g | A |
| G | A | G | A | G | A | G |
| A | g | A | g | A | g | A |

DEMOSAIC IMAGE G3 NOT HAVING HIGH SENSITIVITY

| g | g | g | g | g | g | g |
|---|---|---|---|---|---|---|
| G | g | G | g | G | g | G |
| g | g | g | g | g | g | g |
| G | g | G | g | G | g | G |
| g | g | g | g | g | g | g |
| G | g | G | g | G | g | G |
| g | g | g | g | g | g | g |

FIG. 19

SQUARE MATRIX ARRANGEMENT CODING

| A | B | A | R | A | B | A |
|---|---|---|---|---|---|---|
| G | A | G | A | G | A | G |
| A | R | A | B | A | R | A |
| G | A | G | A | G | A | G |
| A | B | A | R | A | B | A |
| G | A | G | A | G | A | G |
| A | R | A | B | A | R | A |

RED MOSAIC IMAGE R

|   |   |   | R |   |   |   |
|---|---|---|---|---|---|---|
|   |   |   |   |   |   |   |
|   | R |   |   |   | R |   |
|   |   |   |   |   |   |   |
|   |   |   | R |   |   |   |
|   |   |   |   |   |   |   |
|   | R |   |   |   | R |   |

GRW MOSAIC IMAGE R1

| A | r | A | R | A | r | A |
|---|---|---|---|---|---|---|
| G | A | G | A | G | A | G |
| A | R | A | r | A | R | A |
| G | A | G | A | G | A | G |
| A | r | A | R | A | r | A |
| G | A | G | A | G | A | G |
| A | R | A | r | A | R | A |

RW MOSAIC IMAGE R2

| A | r | A | R | A | r | A |
|---|---|---|---|---|---|---|
| r | A | r | A | r | A | r |
| A | R | A | r | A | R | A |
| r | A | r | A | r | A | r |
| A | r | A | R | A | r | A |
| r | A | r | A | r | A | r |
| A | R | A | r | A | R | A |

DEMOSAIC IMAGE R3 NOT HAVING HIGH SENSITIVITY

| r | r | r | R | r | r | r |
|---|---|---|---|---|---|---|
| r | r | r | r | r | r | r |
| r | R | r | r | r | R | r |
| r | r | r | r | r | r | r |
| r | r | r | R | r | r | r |
| r | r | r | r | r | r | r |
| r | R | r | r | r | R | r |

FIG. 20

SQUARE MATRIX ARRANGEMENT CODING

| A | B | A | R | A | B | A |
|---|---|---|---|---|---|---|
| G | A | G | A | G | A | G |
| A | R | A | B | A | R | A |
| G | A | G | A | G | A | G |
| A | B | A | R | A | B | A |
| G | A | G | A | G | A | G |
| A | R | A | B | A | R | A |

BLUE MOSAIC IMAGE B

| | B | | | | B | |
|---|---|---|---|---|---|---|
| | | | | | | |
| | | | B | | | |
| | | | | | | |
| | B | | | | B | |
| | | | | | | |
| | | | B | | | |

GBW MOSAIC IMAGE B1

| A | B | A | b | A | B | A |
|---|---|---|---|---|---|---|
| G | A | G | A | G | A | G |
| A | b | A | B | A | b | A |
| G | A | G | A | G | A | G |
| A | B | A | b | A | B | A |
| G | A | G | A | G | A | G |
| A | b | A | B | A | b | A |

BW MOSAIC IMAGE B2

| A | B | A | b | A | B | A |
|---|---|---|---|---|---|---|
| b | A | b | A | b | A | b |
| A | b | A | B | A | b | A |
| b | A | b | A | b | A | b |
| A | B | A | b | A | B | A |
| b | A | b | A | b | A | b |
| A | b | A | B | A | b | A |

DEMOSAIC IMAGE B3 NOT HAVING HIGH SENSITIVITY

| b | B | b | b | b | B | b |
|---|---|---|---|---|---|---|
| b | b | b | b | b | b | b |
| b | b | b | B | b | b | b |
| b | b | b | b | b | b | b |
| b | B | b | b | b | B | b |
| b | b | b | b | b | b | b |
| b | b | b | B | b | b | b |

CORRELATION DETECTION FRAME IN THE HORIZONTAL AND VERTICAL DIRECTIONS

CORRELATION DETECTION FRAME IN THE PN DIRECTIONS

W_P = G (x, y) * W_PLPF/G_PLPF

W_N = G (x, y) * W_NLPF/G_NLPF

W (x, y) = W_N * DIFF_PN+W_P * (1-DIFF_PN)

<LUMINANCE SIGNAL INTERPOLATION PROCESSING WITH REFERENCE TO G>

FIG. 25A
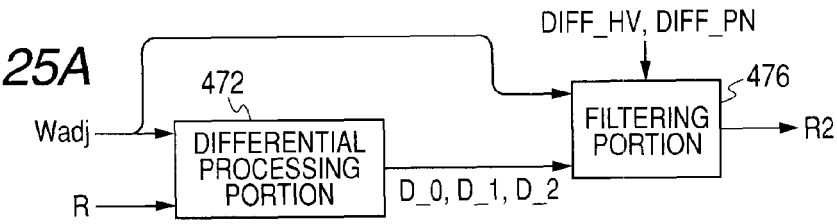
FIG. 25B
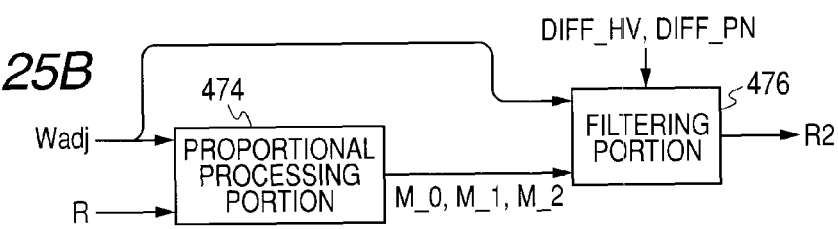
FIG. 26A
HIGH-SENSITIVITY DEMOSAIC IMAGE W
FOR REFERENCE
| W | W | W | W | W | W | W | W |
|---|---|---|---|---|---|---|---|
| W | W | W | W | W | W | W | W |
| W | W_0 | W | W | W | W | W | W |
| W | W | W_1 | W | W | W | W | W |
| W | W | W | W_2 | W | W | W | W |
| W | W | W | W | W | W | W | W |
| W | W | W | W | W | W | W | W |
| W | W | W | W | W | W | W | W |
FIG. 26B
SQUARE ARRANGEMENT COLOR CODING
| A | B | A | R | A | B | A | R |
|---|---|---|---|---|---|---|---|
| G | A | G | A | G | A | G | A |
| A | R_0 | A | B | A | R | A | B |
| G | A | G_1 | A | G | A | G | A |
| A | B | A | R_2 | A | B | A | R |
| G | A | G | A | G | A | G | A |
| A | R | A | B | A | R | A | B |
| G | A | G | A | G | A | G | A |
⟨ COLOR SIGNAL INTERPOLATION PROCESSING WITH REFERENCE TO W ⟩
$D\_0 = W\_0 - R\_0$
$D\_2 = W\_2 - R\_2$
$D\_1 = (D\_0 + D\_2)/2$
$R\_1 = W\_1 - D\_1$
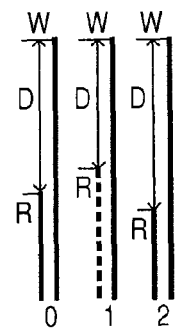

FIG. 27A
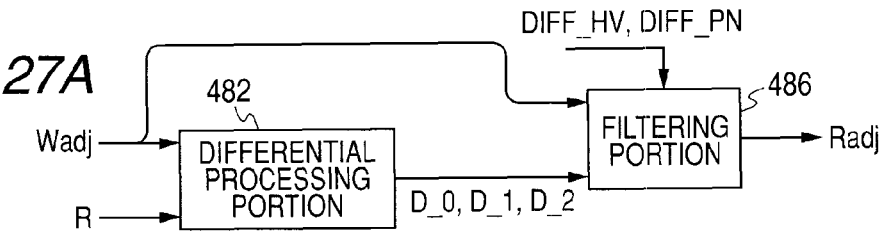
FIG. 27B
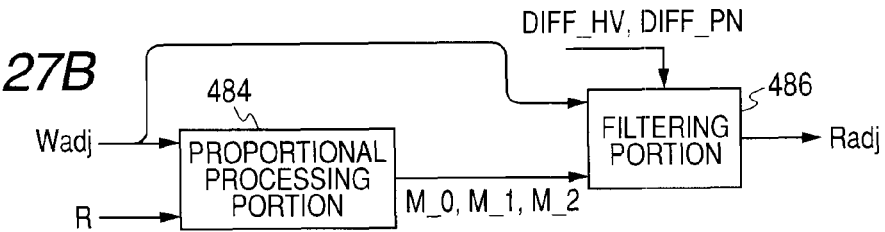
FIG. 28A
HIGH-SENSITIVITY DEMOSAIC IMAGE W FOR REFERENCE
| W | W | W | W | W | W | W | W |
|---|---|---|---|---|---|---|---|
| W | W | W | W | W | W | W | W |
| W | W | W | W | W | W | W | W |
| W_0 | W_1 | W_2 | W | W | W | W | W |
| W | W | W | W | W | W | W | W |
| W | W | W | W | W | W | W | W |
| W | W | W | W | W | W | W | W |
| W | W | W | W | W | W | W | W |
FIG. 28B
SQUARE ARRANGEMENT COLOR CODING
| A | B | A | R | A | B | A | R |
|---|---|---|---|---|---|---|---|
| G | A | G | A | G | A | G | A |
| A | R | A | B | A | R | A | B |
| G_0 | A | G_1 | A | G_2 | A | G | A |
| A | B | A | R | A | B | A | R |
| G | A | G | A | G | A | G | A |
| A | R | A | B | A | R | A | B |
| G | A | G | A | G | A | G | A |
⟨ANTI-ALIASING PROCESSING WITH REFERENCE TO W⟩
G COLOR
$D\_0 = W\_0 - G\_0$
$D\_1 = W\_1 - G\_1$
$D\_2 = W\_2 - G\_2$
$Dave = (D\_0 + 2*D\_1 + D\_2)/4$
$G\_1 = W\_1 - Dave$
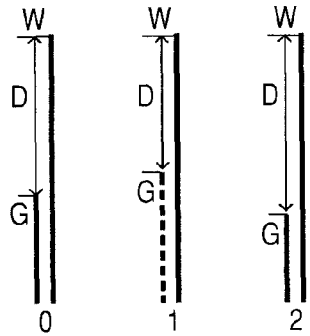

FIG. 29

STATE IN WHICH INCLINED MATRIX ARRANGEMENT IS CHANGED TO SQUARE MATRIX ARRANGEMENT

⟨ANTI-ALIASING PROCESSING WITH REFERENCE TO W⟩

B COLOR (R COLOR)

DIFFERENCE BETWEEN B PIXEL AND W PIXEL IN THE HORIZONTAL DIRECTION:

$D\_H1 = B(x-2, y) - W(x-2, y)$
$D\_H2 = B(x, y) - W(x, y)$
$D\_H3 = B(x+2, y) - W(x+2, y)$ $B\_H = W(x, y) + (D\_H1 + D\_H2 + D\_H3)/3$

DIFFERENCE BETWEEN B PIXEL AND W PIXEL IN THE VERTICAL DIRECTION:

$D\_V1 = B(x, y-2) - W(x, y-2)$
$D\_V2 = B(x, y) - W(x, y)$
$D\_V3 = B(x, y+2) - W(x, y+2)$ $B\_V = W(x, y) + (D\_V1 + D\_V2 + D\_V3)/3$

COORDINATE (x, y)

B PIXEL AFTER ANTI-ALIASING
$B(x, y) = (1 - DIFF\_HV) * B\_V + DIFF\_HV * B\_H$

IMAGE Wadj FOR REFERENCE
(WBL MOSAIC IMAGE W2)

SOLID-STATE IMAGING DEVICE AND IMAGING APPARATUS WITH COLOR CORRECTION BASED ON LIGHT SENSITIVITY DETECTION

CROSS REFERENCES TO RELATED APPLICATIONS

The present invention contains subject matter related to Japanese Patent Application JP 2007-055797 filed in the Japanese Patent Office on Mar. 6, 2007, the entire contents of which being incorporated herein by reference.

BACKGROUND OF THE INVENTION

1. Field of the Invention

The present invention relates to a solid-state imaging device, which is an example of a semiconductor device for detection of physical amount distribution, and an imaging apparatus. Specifically, the present invention relates to a signal acquisition technique suitable for application to a solid-state imaging device or the like using a semiconductor device for detection of physical amount distribution in which a plurality of unit constituent elements with sensitivity to electromagnetic waves, such as light or radiant rays, input from the outside are arranged and which can read physical amount distribution, which is converted into electrical signals by the unit constituent elements, as electrical signals. In particular, the present invention relates to a structure of using a high-sensitivity pixel.

2. Description of the Related Art

A physical amount distribution detection semiconductor device in which a plurality of unit constituent elements (for example, elements) with sensitivity to electromagnetic waves, such as light or radiant rays, input from the outside are arranged in a line shape or in a matrix is used in various fields.

For example, in a field of visual equipment, a CCD (charge coupled device) type or MOS (metal oxide semiconductor) type or CMOS (complementary metal oxide semiconductor) type solid-state imaging device that detects a change of light (an example of an electromagnetic wave), which is an example of physical amount, is used. These solid-state imaging devices read physical amount distribution, which is converted into electrical signals by unit constituent elements (pixels in the solid-state imaging device), as electrical signals.

For example, the solid-state imaging device generates and accumulates signal charges by detecting electromagnetic waves, such as light or radiant rays, input from the outside in a photodiode, which is a photoelectric conversion element (light receiving element; photosensor) provided in an imaging portion (pixel portion) of a device portion, and reads the accumulated signal charges (photoelectrons) as image information.

In the case of a configuration for acquiring a color image, it is a mainstream to use an image sensor in which a color filter, which allows only a component having a specific wavelength to be transmitted therethrough, is arranged in each pixel and a required color component is restored by using a set of plurality of pixels.

Specifically, colors are distinguished by a color arrangement in which color reduction filters corresponding to, for example, red (R), green (G), and blue (B) colors, which are three primary colors, are used as a set of color filters and three primary color light components transmitted through the filters are separately detected by providing a semiconductor layer that detects light below the color filters. In addition, it may also be considered to use an arrangement in which white (Y), red (R), green (G), and blue (B) for luminance signal acquisition are combined. All the arrangements described above are called Bayer arrangements.

In a solid-state imaging element based on a single plate color method, each pixel has only information on a single color component as described above. Accordingly, for example, demosaic processing for restoring a required color component in each pixel by performing interpolation processing using color information on surrounding pixels is performed (for example, refer to JP-A-04-088784).

On the other hand, in a digital still camera or a movie camera, an improvement in quality of an image photographed under low illuminance has been an important issue in recent years. In the case of photographing an image under low illuminance, it is common to lower a shutter speed, to use a lens having a bright aperture value, or to use an external light source for visible light, such as a flash.

In this case, lowering the shutter speed causes hand trembling or blurring of a photographic subject. Moreover, in general, there is also a limitation in an aperture value of a lens. For this reason, it is difficult to realize the brightness more than a certain extent. In addition, in the case when the external light source for visible light is used, there is a problem that an atmosphere based on illumination in the place may be spoiled.

Since a color temperature is low under a low illuminance condition, a light source that emits a large amount of infrared light is used in many cases. In addition, if invisible light, such as infrared light, is used as auxiliary light, the atmosphere is hardly spoiled. Therefore, a technique of increasing effective photographing sensitivity under a light source including a large amount of invisible light, such as infrared light, has been demanded.

As an example of measures against the problems described above, it is considered to add white (Y) for high-sensitivity luminance signals in a known color coding arrangement which is basically used. For example, JP-A-04-088784 discloses signal processing for obtaining a high-sensitivity image using an imaging element to which a YRGB arrangement, in which white (Y) for luminance signals is added in the Bayer arrangement where red (R), green (G), and blue (B) are arranged in a square matrix, is applied. In this structure, signal processing for obtaining high resolution and high sensitivity is explained by using a white pixel of pixels arranged in a checker pattern assuming that a color filter array, in which white pixels are arranged in the checker pattern, is applied and none of the pixels sense components (for example, infrared light) other than visible light components.

That is, in the arrangement proposed in JP-A-04-088784, a Y pixel in the checker arrangement has sensitivity to almost the entire visible light. Accordingly, a signal larger than that in a case of a configuration where green (G) pixels are arranged in a checker pattern is obtained. For this reason, it is possible to obtain a satisfactory S/N ratio of signals in the checker arrangement, which influences resolution or luminance information, compared with a case of a checker arrangement of green pixels.

SUMMARY OF THE INVENTION

However, in order to add the white (Y) for high-sensitivity luminance signals in the known color coding arrangement that is basically used, a predetermined color (one color or a plurality of colors) in the known arrangement should be replaced with the white (Y). As a result, it is concerned that a decrease in color resolution occurs or a false color due to the decrease in color resolution is generated. An increase in the number of pixels of white (Y) is advantageous in obtaining high sensitivity or high resolution. In this case, however, a problem of a decrease in color resolution or generation of a false color becomes noticeable.

Therefore, in view of the above, it is desirable to provide a structure capable of acquiring information with satisfactory quality (especially, quality of color signals resulting from a decrease in color resolution) even in a case where a high-sensitivity pixel is added to a color coding arrangement.

According to an embodiment of the present invention, there is provided a display device including: a first detecting portion that detects each component by dividing a first wavelength region of image information into a plurality of wavelength regions (typically, dividing a visible light region into components corresponding to respective colors of G, R, and B); and a second detecting portion that detects components in the first wavelength region with higher sensitivity than the components in the first wavelength region detected by the first detecting portion. That is, the second detecting portion is made to function as a detecting portion corresponding to high sensitivity.

In addition, there is provided a high sensitization signal processing portion that acquires a signal (detection information obtained by the first detecting portion) indicating a measured amount on the basis of a unit signal corresponding to each wavelength detected in the first detecting portion and that executes a sensitivity correction operation on the unit signal corresponding to each wavelength detected in the first detecting portion by using the signal indicating the measured amount and a signal (detection information obtained by the second detecting portion) of the component in the first wavelength region, which has high sensitivity and is detected in the second detecting portion.

Here, the high sensitization signal processing portion executes the sensitivity correction operation and performs processing for suppressing incorrect color information (false color suppressing processing) while executing demosaic processing for generating information, in which wavelength components or sensitivity is uniform, from mosaic shaped information, in which wavelength components or sensitivity varies, for the position of each of all of the detecting portions. The quality of a demosaic image is improved by executing the sensitivity correction operation and the false color suppressing processing during execution of demosaic processing without executing the sensitivity correction operation after generating the demosaic image.

As the false color suppressing processing, for example, pixel interpolation processing or anti-aliasing processing (alias removing processing) based on difference information between detection information of the first detecting portion and detection information of the second detecting portion, or pixel interpolation processing or anti-aliasing processing based on proportional information between the detection information of the first detecting portion and the detection information of the second detecting portion. Since the detection information of the second detecting portion is included in both the cases, an advantage in that a sensitivity correction operation is also executed automatically by executing the false color suppressing processing is obtained.

In addition, a solid-state imaging device may be formed as a one chip type device or a module type device in which an imaging unit and a signal processing unit or an optical system are collectively packaged and which has an imaging function.

In addition, the present invention may be applied to not only a solid-state imaging device but also an imaging apparatus. In this case, the same effect as the solid-state imaging device is obtained in the imaging apparatus. Here, the imaging apparatus refers to a camera (or a camera system) or a portable apparatus having an imaging function, for example. In addition, the "imaging" includes not only imaging of an image at the time of normal photographing of a camera but also detection of a fingerprint and the like as a broad sense of meaning.

According to the embodiment of the present invention, the sensitivity correction operation or the false color suppressing processing using detection information obtained by the second detecting portion corresponding to high sensitivity is performed while the demosaic processing is being executed. Accordingly, it is possible to effectively suppress generation of a false color, which occurs due to a decrease in color resolution that may not be avoided in the case of adding high-sensitivity pixels to a color coding arrangement. In the case of executing the sensitivity correction operation after executing the demosaic processing, if a false color is generated in a demosaic image generated, it becomes difficult to suppress a false color in a subsequent sensitivity correction operation.

On the other hand, in the case of executing the false color suppressing processing by using difference information or proportional information between detection information of the first detecting portion corresponding to sensitivity, which is not high sensitivity, and detection information of the second detecting portion corresponding to high sensitivity, it is possible to acquire a high-sensitivity demosaic image for which the sensitivity correction operation is executed and in which generation of a false color is suppressed. By performing demosaic processing using a detecting portion output with high sensitivity, it is possible to realize signal processing with high sensitivity and high S/N ratio and to effectively suppress a false color.

BRIEF DESCRIPTION OF THE DRAWINGS

FIG. 1 is a view illustrating a basic structure of an example of color arrangement of a color separation filter adopted in an embodiment;

FIGS. 2A to 2C are views illustrating a specific example (first example) of color coding;

FIG. 4 is a view explaining the relationship between luminance resolutions of a Bayer arrangement and an inclined matrix arrangement shown in FIG. 2C;

FIG. 5 is a view explaining the relationship between color resolutions of the Bayer arrangement and the inclined matrix arrangement shown in FIG. 2C;

FIG. 6 is a view illustrating the relationship between luminance resolution and color resolution as a relationship between sampling frequencies in a horizontal direction and a vertical direction;

FIG. 7 is a view illustrating a basic light transmission characteristic (spectral characteristic) of each color filter included in a color filter group;

FIG. 13 is a view explaining a process of generating a high-sensitivity demosaic image in the inclined matrix arrangement shown in FIG. 2C;

FIG. 14 is a view explaining a process of generating a green demosaic image not having high sensitivity in the inclined matrix arrangement shown in FIG. 2C;

FIG. 15 is a view explaining a process of generating a red demosaic image not having high sensitivity in the inclined matrix arrangement shown in FIG. 2C;

FIG. 16 is a view explaining a process of generating a blue demosaic image not having high sensitivity in the inclined matrix arrangement shown in FIG. 2C;

FIG. 17 is a view explaining a process of generating a high-sensitivity demosaic image in a square matrix arrangement shown in FIG. 2B;

FIG. 18 is a view explaining a process of generating a green demosaic image not having high sensitivity in the square matrix arrangement shown in FIG. 2B;

FIG. 19 is a view explaining a process of generating a red demosaic image not having high sensitivity in the square matrix arrangement shown in FIG. 2B;

FIG. 20 is a view explaining a process of generating a blue demosaic image not having high sensitivity in the square matrix arrangement shown in FIG. 2B;

FIGS. 25A and 25B are views illustrating an example of a detailed configuration of an interpolation processing portion for color signals;

FIGS. 26A and 26B are views explaining an algorithm of interpolation processing for color signals;

FIGS. 27A and 27B are views illustrating an example of a detailed configuration of an anti-aliasing processing portion for color signals;

FIGS. 28A and 28B are views explaining an algorithm of anti-aliasing processing for green signals;

FIG. 29 is a view explaining an algorithm of anti-aliasing processing for blue signals.

DESCRIPTION OF THE PREFERRED EMBODIMENTS

Figure 3:
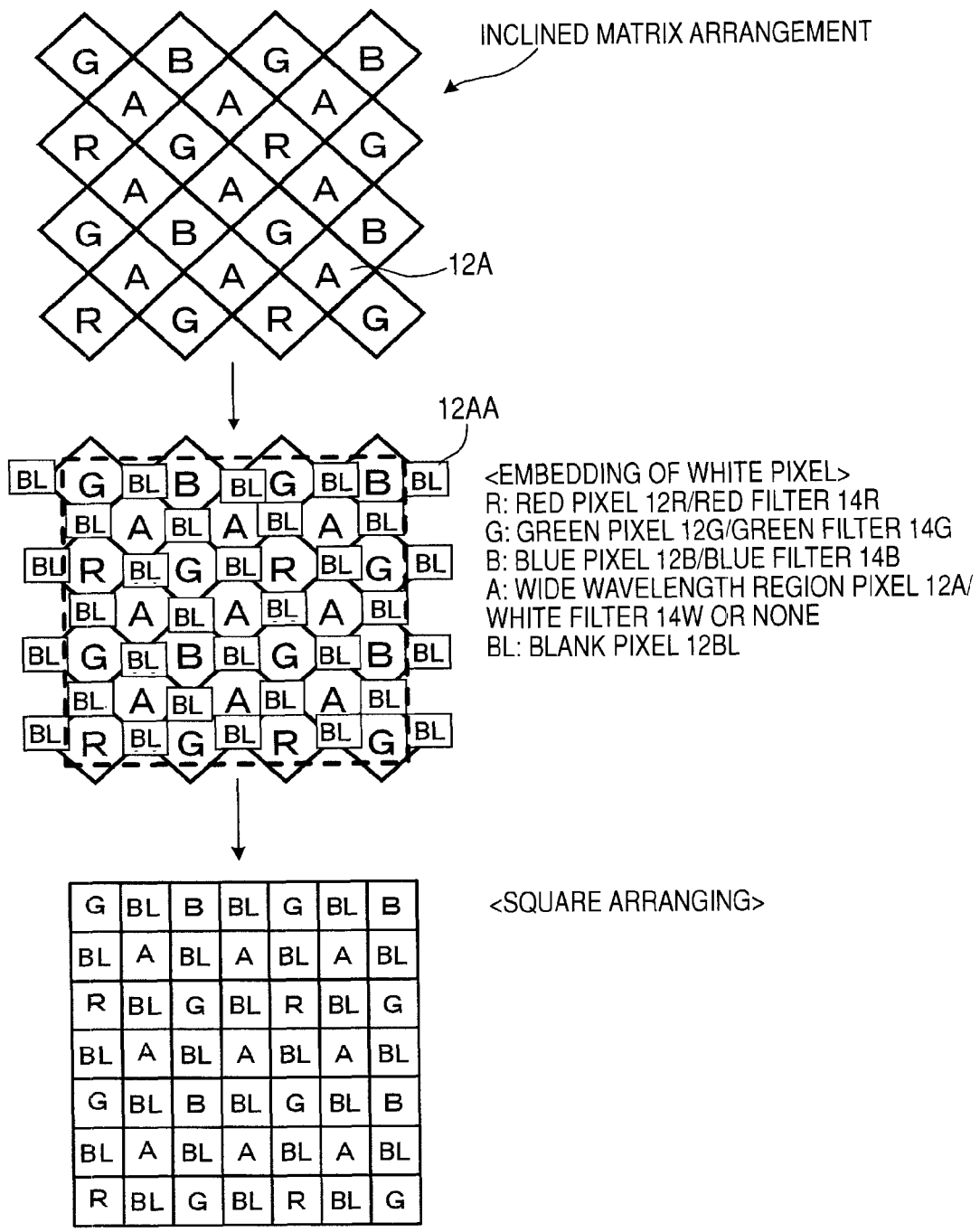
FIG. 3 is a view illustrating a specific example (second example) of color coding.

Hereinafter, embodiments of the present invention will be described in detail with reference to the accompanying drawings.

<<Basic Concept>>

FIG. 1 is a view illustrating the basic structure of an example of a color arrangement of color separation filters adopted in an embodiment. Here, three color filters C1, C2, and C3 (all of which allow a first wavelength region component, which belongs to a selective specific wavelength region, to be transmitted therethrough) that are used for a visible light color image and correspond to three wavelength regions (color components) and a color filter C4 different from the color filters C1, C2, and C3, that is, four kinds of color filters having different filter characteristics are arranged regularly (in a square matrix in this example). In addition, in this example, the first wavelength region component is a visible light region component.

Components can be separately detected by causing a corresponding detecting portion to detect each of the components through the color filters C1, C2, C3, and C4. A detecting portion where the color filters C1, C2, and C3 are arranged is a first detecting portion, and a detecting portion where the color filter C4 is arranged is a second detecting portion. In addition, the detecting portion (detecting element) where the color filters C1, C2, and C3 are arranged serves to detect components in a condition, in which wavelengths of a first wavelength region (visible light region) are divided, so as to meet further color separation, such that a color image can be acquired.

In the present embodiment, in order to realize a pixel with high light use efficiency, first, as a first method, components in the second wavelength region may be configured to include most of the components (visible light region components) in the first wavelength region and also include invisible light region components (for example, ultra violet light components positioned at a side of a short wavelength and infrared light components positioned at a side of a long wavelength) that are components other than the visible light region components. This is an idea of improving the use efficiency of light (electromagnetic waves) by also using components other than components in the first wavelength region.

In this manner, a detection signal with high light use efficiency output from the second detecting portion becomes a wide wavelength region signal having both a so-called luminance signal component of visible light and an invisible signal component. As a result, a high-resolution wide wavelength region image can be obtained. In addition, a visible light color image can be obtained as a highly reproducible image by executing predetermined correction operation processing (which means color correction operation processing here) between detection signals output from the first detecting portion that has detected components in the first wavelength region through the color filters C1, C2, and C3.

Furthermore, since image information of infrared light that is not visible by an eye can be simultaneously obtained when an infrared component is applied as an invisible light component, for example, imaging under a low illuminance environment becomes possible. Since a clear image can be obtained through imaging performed by illuminating infrared light, for example, even at night when there is no visible light, an application as an image sensor for crime prevention is also possible. Thus, corresponding to an image of visible light that is visible by an eye, image information of infrared light that is not visible by an eye can be received simultaneously with a visible light component. Accordingly, application as a key device with respect to a new information system becomes possible. Furthermore, since image information of ultra violet light that is not visible by an eye can be simultaneously obtained when an ultra violet component is applied as an invisible light component, for example, imaging for plant observation becomes also possible.

Moreover, in order to apply a first technique, it is necessary to detect an invisible light region component in the second detecting portion. Accordingly, since invisible light, such as infrared light, needs to be incident on the second detecting portion, imaging is performed in a condition where an infrared light cut-off filter often used in the related art is removed.

Although a detailed explanation is omitted, in order to realize a pixel having high light use efficiency, it is more preferable to apply a second technique of setting a component in a first wavelength region (visible light region component) as a pixel having higher sensitivity than all or particularly a G color component of the first detecting portion, which detects components in the first wavelength region through the color filters C1, C2, and C3, while applying the first technique. It is an idea of increasing the use efficiency of light (electromagnetic waves) in the case of components in the first wavelength region by causing the second detecting portion to perform detection with higher sensitivity than the first detecting portion.

Furthermore, in this case, a visible light color image can be acquired with high sensitivity by executing predetermined correction operation processing (which means high sensitization correction operation processing here) between a high-sensitivity signal (an example of a detection signal), which is detected in the second detecting portion, and a detection signal output from the first detecting portion that has detected components in the first wavelength region through the color filters C1, C2, and C3.

Ideally, each of the color filters C1, C2, and C3 is a primary color filter having a transmittance of about 1 in a color component within a visible light range and a transmittance of about zero in other color components. For example, the color filters C1, C2, and C3 may be primary color filters corresponding to a blue component B (for example, a transmittance is about 1 at a wavelength $\lambda=400$ to 500 nm and about zero at other wavelengths), a green component G (for example, a transmittance is about 1 at a wavelength $\lambda=500$ to 600 nm and about zero at other wavelengths), and a red component R (for example, a transmittance is about 1 at a wavelength $\lambda=600$ to 700 nm and about zero at other wavelengths), which are three primary colors of visible light VL (wavelength $\lambda=380$ to 780 nm).

Alternatively, each of the color filters C1, C2, and C3 is a primary color filter, which is based on a complementary color system, having a transmittance of about zero in a color component within the visible light range and a transmittance of about 1 in other color components. For example, the color filters C1, C2, and C3 may be primary color filters, which is based on a complementary color system, having a transmittance of about zero with respect to three primary color components of visible light, such as yellow Ye (for example, a transmittance is about zero at a wavelength $\lambda=400$ to 500 nm and about 1 at other wavelengths), magenta Mg (for example, a transmittance is about zero at a wavelength $\lambda=500$ to 600 nm and about 1 at other wavelengths), and cyan Cy (for example, a transmittance is about zero at a wavelength $\lambda=600$ to 700 nm and about 1 at other wavelengths).

Since the sensitivity of a complementary color filter is higher than that of a primary color filter, the sensitivity of an imaging apparatus can be increased when transmitted light of a visible region uses complementary color filters corresponding to complementary colors of three primary colors. On the contrary, by using color filters based on a primary color system, color signals corresponding to primary colors can be acquired even if differential processing is not performed. An advantage that signal processing of a visible light color image becomes easy is obtained.

In addition, the transmittance of 'about 1' corresponds to an ideal condition, but actually, a color reduction filter in which a transmittance of light is reduced is essentially obtained. Accordingly, the transmittance is relatively reduced. Even in this case, it is desirable that the transmittance in the wavelength region be much larger than that in the other wavelength regions. A part whose transmittance is not '1' may be included. In addition, the transmittance of 'about zero' also corresponds to an ideal condition, and it is desirable that the transmittance in the wavelength region be much smaller than that in the other wavelength regions. A part whose transmittance is not 'zero' may be included.

In addition, it is desirable to configure both the primary color system and the complementary color system such that wavelength region components of predetermined colors (primary colors or complementary colors) within a visible light region are transmitted. It does not matter whether or not light in an ultra violet light region or an infrared light region is transmitted. That is, a transmittance with respect to ultra violet light or infrared light does not matter. Preferably, the transmittance with respect to ultra violet light or infrared light is zero, since it is advantageous in terms of color reproducibility.

For example, in the case of a color filter typically used in a current condition, a transmittance with respect to each of the R, G, and B colors within a visible light region is high and transmittances with respect to the other colors (for example, G and B in the case of R) are low. However, there is no specification on the transmittance of a region other than the visible light region. In general, a transmittance of a corresponding color is higher than transmittances of the other colors (for example, G and B in the case of R). For example, each filter has sensitivity to an infrared region and allows light in an infrared region to be transmitted therethrough. However, in the present embodiment, even if a transmittance is high in regions other than the visible light region, a basic idea is not affected although there is a problem of color reproducibility.

On the other hand, the color filter C4 is preferably a color filter for a predetermined wavelength region that allows the second detecting portion to be a pixel with higher light use efficiency than the detecting portion of each of the color filters C1, C2, and C3. Typically, it is desirable to use color filter C4 that allows components in all regions from the first wavelength region (visible light in this example) to an infrared light region, all regions from an ultra violet light region to the first wavelength region (visible light in this example), or components in all bands from the ultra violet light region to the infrared light region through the first wavelength region (visible light in this example) to be transmitted therethrough. Such a color filter C4 is called an all band pass filter.

In addition, similar to the color filters C1, C2, and C3, it is ideal that the color filter C4 not allowing components excluding the first wavelength region (visible light in this example) to be transmitted therethrough. In addition, as for the first wavelength region (visible light in this example), the color filter C4 may be formed as a pixel having higher light use efficiency than the detecting portion of each of the color filters C1, C2, and C3. In this case, it is preferable to increase the light use efficiency with respect to a G component, which has a large effect on the luminance, as compared with the detecting portion of each of the color filters C1, C2, and C3.

For example, the second detecting portion preferably uses a white filter that has sensitivity to light (wavelength of 450 to 660 nm) from blue to red. In a point that the color filter C4 allows components corresponding to all wavelengths from visible light to infrared light (especially, near-infrared light) to be transmitted therethrough, the color filter C4 may be actually configured not to include a color filter. Thus, in the present embodiment, it is called that the second detecting portion performs detection 'through the color filter C4' including the configuration in which a color filter is not actually provided.

In addition, it is sufficient that detecting portions (for example, imaging elements, such as photodiodes) of pixels where the color filters C1, C2, and C3 are arranged have sensitivity to visible light, and they need not have sensitivity to near-infrared light. On the other hand, a detecting portion configured to include a photodiode of a pixel where the color filter C4 is arranged needs to have sensitivity to visible light and infrared light in the case when the color filter C4 is an all band pass filter and corresponds to infrared light.

In addition, a color pixel where the color filter C4 is arranged is used not only for reproduction of physical information (wide wavelength region image in this example) on a component in the second wavelength region, which is obtained on the basis of a color pixel where the color filter C4 is arranged, but also as a color correction pixel or a sensitivity correction pixel with respect to a color signal for reproduction of visible light color image that can be obtained on the basis of color pixels where the color filter C1, C2, and C3 are arranged. The color filter C4 functions as a correction filter for the color filters C1, C2, and C3.

For example, in order to reproduce a visible light color image, signal components SC1, SC2, and SC3 in the first wavelength region in a color pixel where the color filters C1, C2, and C3 are arranged are actually separated from components in the second wavelength region (infrared light) different from the components in the first wavelength region, such that signal components SC1, SC2, and SC3 are detected in separate detection regions.

In addition, components in regions other than a visible light region can also be used at the time photographing under a low illuminance environment by using the signal component SC4 obtained in a detecting portion corresponding to high light use efficiency where the color filter C4 is arranged. As a result, since a signal level that is detected increases compared with a case of only visible light components, noises can be effectively reduced.

In addition, more preferably, a correction operation (especially referred to as a color reproduction correction operation) that enables satisfactory color reproduction is executed on each of the signal components SC1, SC2, and SC3 by using the signal component SC4, or a correction operation (especially referred to as a high sensitization correction operation) is executed on each of the signal components SC1, SC2, and SC3 such that a signal with higher sensitivity is obtained.

In addition, an image in which visible light and invisible light are mixed may be acquired in the case of a wide wavelength region image obtained through the color filter C4. However, for example, in the case when the color filter C4 is an all band pass filter that allows components in all bands from the first wavelength region (visible light in this example) to infrared light to pass therethrough, only an infrared image may be taken out by subtracting components of the visible light image, which can be obtained by the signal components SC1, SC2, and SC3, from the signal component SC4.

Thus, by arranging four kinds of color filters having separate filter characteristics in each pixel of an imaging element, such as a photodiode, and performing a matrix operation of signal outputs obtained in four kinds of wavelength regions (here, each pixel where four kinds of color filters are arranged) where four kinds of color filters are arranged, a visible light color image obtained mainly through the color filters C1, C2, and C3 can a wide wavelength region image obtained through the color filter C4 can be acquired independently and simultaneously, and the wide wavelength region image can also be used for correction of the visible light color image.

Here, similar to previous imaging signal processing, it may be considered that a luminance signal (referred to a mixed luminance signal in the present embodiment), which is acquired on the basis of each pixel signal acquired from pixels through the color filters C1, C2, and C3, is set as an output luminance signal. However, in the present embodiment, such processing is not performed but an output luminance signal is acquired from a wide wavelength region signal SA obtained through the color filter C4. In addition, the mixed luminance signal is used to generate a color difference signal, which is an example of an output color signal.

In addition, an optical member (so-called infrared light cut-off filter), which is an example of an color reduction filter and which is thick and heavy and is made of expensive glass does not need to be provided in front of a sensor on an optical path of an imaging optical system. Since an expensive infrared light cut-off filter (IR cut-off filter) does not need to be provided, it is possible to make an optical system light and compact and to significantly reduce cost. It is needless to say that a mechanism for insertion/extraction of an infrared light cut-off filter is not necessary, and accordingly, the size of an apparatus is not increased.

Further, since an infrared light cut-off filter is not provided, a reduction in light transmittance caused by the infrared light cut-off filter does not occur. Accordingly, high sensitivity increased corresponding to the above effect can also be obtained. In addition, by performing color imaging without using an infrared light cut-off filter, it is possible to obtain the high sensitivity by effectively using light in a near infrared light region in combination with a current signal processing circuit. Accordingly, even under low illuminance, satisfactory color reproducibility is obtained. In this case, the color reproducibility can be further improved by performing color correction.

<<Color Coding>>

FIGS. 2A to 2C and 3 are views illustrating specific examples of color coding. A basic idea is that a Bayer arrangement, which is a typical example of a square matrix arrangement shown in FIG. 2A, is basically used and some of R, G, and B that form the arrangement are assigned for high resolution pixels (herein after, referred to as a white (W) pixel) At this time, various kinds of arrangements may be obtained according to which one of the R, G, and B is to be replaced or the number selected. In addition, in the present embodiment, a square matrix that is inclined by 45° is eventually obtained.

Some of the R, G, and B are replaced with a white filter W such that a detecting portion (detection region) for a high-sensitivity pixel, which receives and detects components corresponding to all wavelengths of visible light, can be provided. That is, three wavelength region (color component) filters for visible light color images, which include primary color filters 14R (red), 14G (green), and 14B (blue), and a white filter 14W (white) for infrared light different from components of the primary color filters 14R, 14G, and 14B, that is, four kinds of color filters 14 having different filter characteristics are arranged regularly. The white filter 14W may be formed to have a property, which allows all components (R, G, and B components) in a visible light band to be transmitted, and at the same time, to have a property which also allows an infrared light component to be transmitted.

Moreover, in a point that the a white pixel where the white filter 14W is arranged allows components corresponding to all wavelengths from visible light to infrared light (especially, near-infrared light) to be transmitted therethrough, the configuration of a wide wavelength region pixel 12A (All) in which the color filter 14 is not actually provided can be adapted.

Here, when an imaging element is actually formed, an on-chip microlens may be further formed on a color filter layer. In this case, if a color filter is not provided only in a portion of the color filter C4, measures, such as embedding the corresponding portion, are required. However, if the white filter 14W is provided in the color filter C4, such measures are not needed. In addition, in the case when the white filter 14W is provided in the color filter C4, an advantage that the detection sensitivity of a visible light region can be adjusted according to the detection sensitivity with respect to the color filters C1, C2, and C3 is obtained.

Regarding the pixel arrangement, pixels (wide wavelength region pixels 12A) for a wide wavelength region are simply added to visible light pixels of RGB primary colors filters. In this case, the resolution may be decreased in both a visible light color image and an infrared light image. For example, if one G pixel of the known RGB Bayer arrangement is replaced with the wide wavelength region pixel 12A, the resolution is decreased. However, the problem of a decrease in resolution can be solved by studying the arrangement of the wide wavelength region pixel 12A and a pixel (for example, a green pixel 12G) corresponding to a wavelength component largely contributing to the resolution.

At this time, in the case that a color separation filter structure in which the color filters 14 corresponding to respective colors are arranged in a mosaic pattern, it is important that the wide wavelength region pixels 12A where infrared light and visible light are mixed are arranged to have a predetermined matrix gap to thereby form a mosaic pattern and one kind of pixels of RGB pixels, which are based on a primary color system of visible light, or Cy, Mg, and Ye pixels, which are based on a complementary color system, are arranged to have a predetermined matrix gap to thereby form a mosaic pattern, in the same manner as in the related art.

Here, 'to form a mosaic pattern' means that one kind of color pixels are arranged in a matrix with a predetermined matrix gap there between when paying attention to the color pixel. It does not necessarily mean that the color pixels are adjacent to each other. In addition, as a typical example of a case in which an arrangement where color pixels are adjacent to each other is adopted, there is an arrangement where squares of the wide wavelength region pixel 12A and the other color pixels are alternately arranged in the shape of grid (checker). In addition, there is an arrangement where squares of one kind of pixels of RGB pixels, which are based on a primary color system of visible light, or Cy, Mg, and Ye pixels, which are based on a complementary color system, are alternately arranged in the shape of grid (checker).

In addition, a red pixel 12R, a green pixel 12G, and a blue pixel 12B are collectively called a visible light detection pixel 12VL. The visible light detection pixel 12VL is an example of a specific wavelength region signal acquiring element that acquires a visible light signal, such as an RGB signal, by separating the wavelengths of the signal.

In order to suppress a decrease in resolution of a wide wavelength region image (that is, a luminance image) obtained in the wide wavelength region pixel 12A, for example, in the same manner as the arrangement shown in FIG. 2B, the wide wavelength region pixel 12A where the white filter 14W functioning as a high-sensitivity pixel is provided or the color filter 14 is not provided is first arranged in odd-numbered rows and odd-numbered columns and in even-numbered rows and even-numbered columns within a unit pixel matrix 12 having two rows by two columns and the green pixel 12G where the color filter 14G for sensing a green component in a visible light region is provided is arranged in even-numbered rows and odd-numbered columns. The wide wavelength region pixel 12A is an example of a wide wavelength region signal acquiring element that acquires a light signal including visible light and invisible light components, such as infrared light.

In addition, for odd-numbered pixels of the unit pixel matrix 12 in the column direction thereof, the blue pixel 12B where the color filter 14B for sensing a blue component in a visible light region is provided is arranged in odd-numbered row and even-numbered column in the odd-numbered unit pixel matrix 12 in the row direction, and the red pixel 12R where the color filter 14R for sensing a red component in a visible light region is provided is arranged in odd-numbered row and even-numbered column in the even-numbered unit pixel matrix 12 in the row direction. For even-numbered pixels of the unit pixel matrix 12 in the column direction thereof, the arrangement of the blue pixel 12B and the red pixel 12R is opposite to that in the above case. As a whole, a repetition cycle of a color filter group 314 is completed as the unit pixel matrix 12 of 2×2.

In this case, a rate of the wide wavelength region pixel 12A having a function of a high-sensitivity pixel is highest in a repetition unit of a filter arrangement. In addition, the checker shaped arrangement where squares of the wide wavelength region pixel 12A and the other color pixels are alternately arranged is adopted. Accordingly, since it is possible to make the arrangement density of the wide wavelength region pixel 12A equal to that in the case of the Bayer arrangement, the resolution of a luminance image that is output is not reduced. However, since the arrangement density of the green pixel 12G which largely contributes to the resolution of a visible light color image is a half of that of the wide wavelength region pixel 12A, the resolution of a visible light color image is lower than that of a luminance image obtained from the wide wavelength region pixel 12A.

An output luminance signal is acquired from the wide wavelength region signal SA obtained through the color filter C4. Accordingly, in consideration of this point, it largely contributes to obtaining high resolution as a whole to arrange color filters in the checker pattern while adopting the arrangement shape where the arrangement density of the wide wavelength region pixel 12A is as high as possible, that is, making the arrangement density of the wide wavelength region pixel 12A corresponding to a white pixel highest, as shown in FIG. 2B.

In this manner, since components in regions other than a visible light region can also be used for an image that is photographed under a low illuminance environment where there are few visible light components, it is possible to effectively reduce noises and to acquire an image with high resolution and high quality.

In addition, an inclined matrix arrangement shown in FIG. 2C is obtained by rotating the shape (referred to as square matrix arrangement), in which color filters are arranged in a square matrix as shown in FIG. 2B, by 45° to the right. Such an arrangement mode is called an inclined matrix arrangement. In the inclined matrix arrangement, pixel densities in the vertical direction and the horizontal direction increase, and as a result, the resolution in the directions can be further increased. In addition, in both the square matrix arrangement shown in FIG. 2B and the inclined matrix arrangement shown in FIG. 2C, the wide wavelength region pixels 12A corresponding to high-sensitivity pixels are arranged in a zigzag (WZigZag) pattern. These are collectively called a high-sensitivity zigzag (high-zigzag) arrangement.

In the case of color coding of the inclined matrix arrangement shown in FIG. 2C, the inclined matrix arrangement is changed to a square arrangement by embedding imaginary pixels (also referred to as blank pixels 12BL) through operation processing and higher resolution is obtained by performing mosaic processing in this state, as shown in FIG. 3. For example, luminance information of the blank pixel 12BL is calculated through interpolation processing based on signals of the wide wavelength region pixels 12A that are actually present above and below the blank pixel 12BL and/or left and right sides of the blank pixel 12BL.

Thus, various kinds of arrangements may be applied as arrangements (color arrangements) of the color filters 14 included in the color filter group 314. In any case, the wide wavelength region pixels 12A corresponding to high-sensitivity pixels are arranged in the checker pattern with a predetermined gap there between. When signal processing is executed on the basis of a pixel signal photographed by applying a solid-state imaging device as a semiconductor device having such color arrangement, the wide wavelength region pixel 12A of the white filter 14W where infrared light is suppressed has higher sensitivity than the green pixel 12G in a visible light region. As a result, since noises can be reduced even in an image photographed under low illuminance, it becomes possible to obtain a high-quality image. In addition, when the wide wavelength region pixel 12A allowing detection up to infrared light is adopted without using the white filter 14W, not only a signal based on a visible light component but also a signal based on an invisible light component are output in a state where the signals are superimposed. Accordingly, in particular, since noises can be reduced even in an image photographed under low illuminance, it becomes possible to obtain a high-quality image. By applying the inclined matrix arrangement shown in FIG. 2C, an image having high sensitivity and high resolution can also be obtained.

<Advantages and Disadvantages of High-Sensitivity Zigzag Arrangement>

FIGS. 4 to 6 are views explaining advantages and disadvantages of the inclined matrix arrangement shown in FIG. 2C. Here, FIG. 4 is a view explaining the relationship of luminance resolutions between the Bayer arrangement and the inclined matrix arrangement shown in FIG. 2C. FIG. 5 is a view explaining the relationship of color resolutions in the same manner as above. FIG. 6 is a view illustrating the relationship between luminance resolution and color resolution as a relationship between sampling frequencies fs in the horizontal direction H and the perpendicular direction V.

Pixel interpolation in an image sensor, in which high-sensitivity pixels W including luminance information are arranged and which has a high-sensitivity zigzag arrangement shown in FIG. 2C inclined by 45° with respect to a square matrix, has a problem in that a false color may be easily generated because color resolution of each pixel (particularly R pixel and B pixel) is low.

In the case of a color filter arrangement based on a primary color system or a complementary color system, it becomes difficult to secure the sensitivity due to miniaturization of a pixel cell. Accordingly, as measures against the difficulty in securing the sensitivity, it may be considered to adopt high-sensitivity pixels as shown in FIG. 2C. However, a problem that the color resolution decreases occurs. Within one arrangement unit of a filter arrangement (color coding), it is advantageous in obtaining high sensitivity or high-resolution to increase the number of high-sensitivity pixels. In this case, however, a problem of a decrease in color resolution or generation of a false color becomes noticeable.

For example, in the case of the same pixel size as shown in FIG. 4, horizontal and vertical resolution of luminance signals of a high-sensitivity zigzag arrangement becomes $\sqrt{2}(1.4)$ times that of the Bayer arrangement. As shown in FIG. 5, the resolution of mosaic images R and B of the high-sensitivity zigzag arrangement 0.7 times that of the Bayer arrangement, and accordingly, it is concerned that a false color will be frequently generated. FIG. 6 shows the point described above by using the relationship with the sampling frequency fs.

As signal processing at the time of the high-sensitivity zigzag arrangement, whether to maintain the luminance resolution of 1.4 times that of a square Bayer arrangement and to cope with a problem that a false color is frequently generated due to the color resolution of 0.7 times the square Bayer arrangement are important. In the present embodiment, as the measures, first, an S/N ratio is improved by using an output signal of the high-sensitivity pixel W, and correction using the output signal of the high-sensitivity pixel W is performed at the time of color signal processing for generating a mosaic image.

As an example, first, a coefficient of correlation is calculated on the basis of only the high-sensitivity pixel W as mosaic processing (synchronization processing) of the high-sensitivity zigzag arrangement using the high-sensitivity pixel W. Then, anti-aliasing processing is performed on each of the mosaic images G, R, and B corresponding to respective colors by a difference between the mosaic images and the high-sensitivity pixel W. In addition, interpolation processing is performed on the basis of the coefficient of correlation and information of difference between each of the mosaic images G, R, and B corresponding to respective colors and the high-sensitivity pixel W. By using the information on the high-sensitivity pixel W, high-sensitivity signal processing can be realized with a high S/N ratio and a false color can be effectively suppressed. These points will be described in detail later.

<<Spectral Characteristic of a Filter>>

Figure 8:
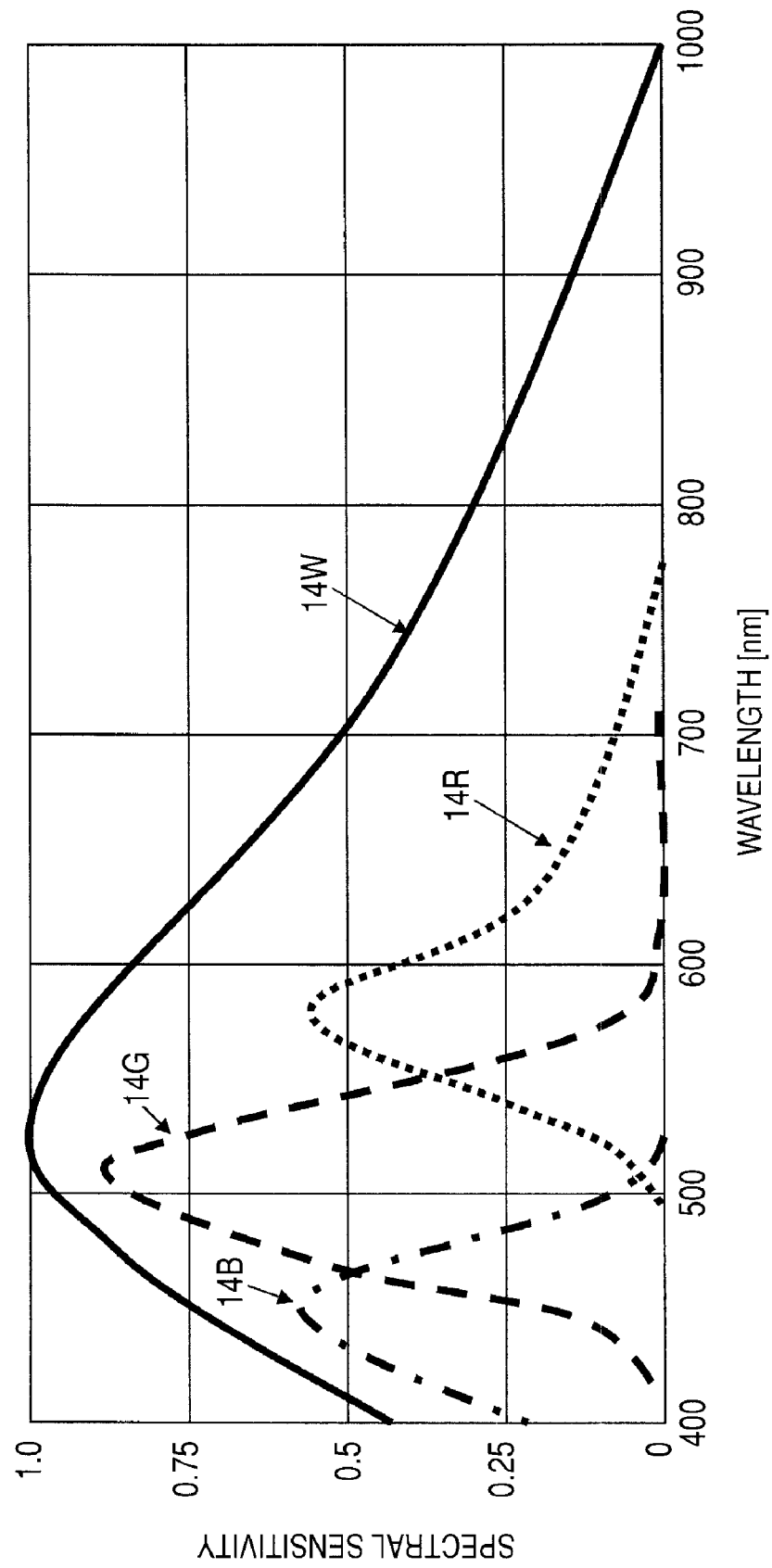
FIG. 8 is a view illustrating a first characteristic example of each color filter included in a color filter group.
Figure 9:
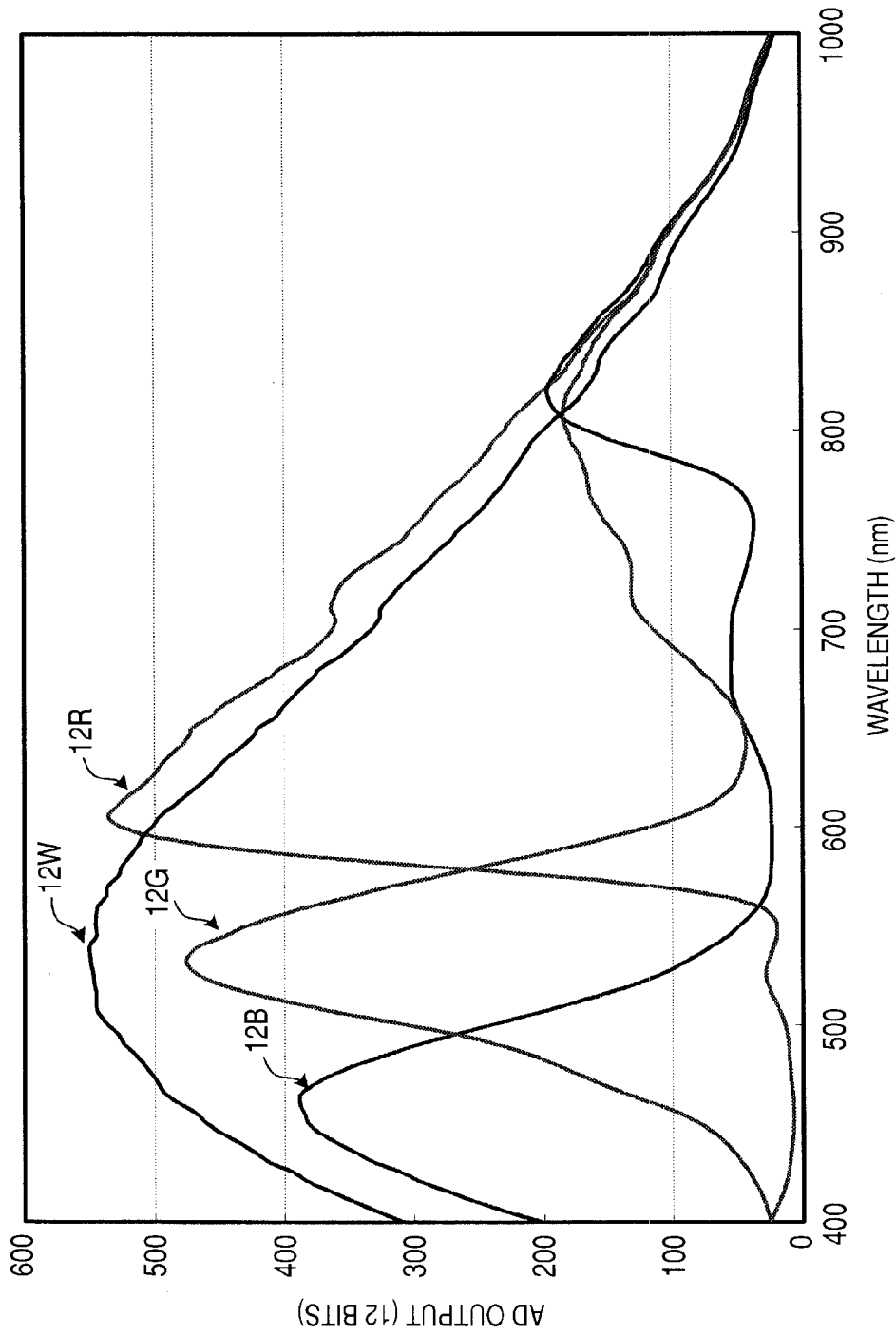
FIG. 9 is a view illustrating a second characteristic example of each color filter included in the color filter group.

FIGS. 7 to 9 are views illustrating specific examples of wavelength separation using an infrared light cut-off filter layer 313 and a color filter group 314. Here, FIG. 7 is a view illustrating a basic light transmission characteristic (spectral characteristic) of each of the color filters 14 included in the color filter group 314. In addition, FIG. 8 is a view illustrating an example of a first characteristic of each of the color filters 14 included in the color filter group 314. FIG. 9 is a view illustrating an example of a second characteristic of each of the color filters 14 included in the color filter group 314.

In this example, first, the color filter group 314 is configured by using the color filters 14 having various kinds of spectral characteristics, which include a red (R) color filter that allows light having a wavelength near a red color to be transmitted therethrough, a green (G) color filter that allows light having a wavelength near a green color to be transmitted therethrough, a blue (B) color filter that allows light having a wavelength near a blue color to be transmitted therethrough, and a white color filter (or a color filter may not be used) that allows all of the infrared (IR) light and RGB light to be transmitted therethrough.

The spectrum of the color filters 14 is configured to include an R channel, a G channel, a B channel, and an A (=Y+IR) channel that allows all of the infrared (IR) light and RGB light to be transmitted. By means of the corresponding red pixel 12R, the green pixel 12G, the blue pixel 12B, and the wide wavelength region pixel 12A that detects all of the infrared ray (IR) and the RGB, a mosaic image including four kinds of spectra can be obtained.

By providing the wide wavelength region pixel 12A, a measurement of the wide wavelength region signal SA indicating mixed components of infrared light IR and visible light incident on an imaging element, that is, a measurement of the wide wavelength region signal SA including both an infrared light signal (IR) and a luminance signal (Y) of a visible light portion can be made by the wide wavelength region pixel 12A.

In addition, although it is shown in FIG. 7 that a transmission characteristic of the white filter 14W is equal to those in a visible light band and an infrared light band, this is not essential. The transmission intensity in the infrared light band may be lower than that in the visible light band. It is sufficient to have characteristics that allow components corresponding to all wavelength in the visible light band to be transmitted with sufficient intensity and to cause light to be transmitted in the infrared band with sufficient intensity as compared with the transmission intensity of primary filters corresponding to R, G, and B.

In addition, the wide wavelength region signal SA obtained from the wide wavelength region pixel 12A includes not only the infrared light component IR but also the visible light component VL. Accordingly, by using the infrared light component IR but also the visible light component VL, the infrared light component IR can also be used for the luminance component rather than generating the luminance signal with only the visible light component VL. As a result, it is possible to increase the sensitivity. This is particularly advantageous in that a luminance signal with few noises can be obtained at the time of photographing under low illuminance.

Specifically, first, as the color filter group 314 for imaging of a visible light color image, primary color filter groups 314R, 314G, and 314B mainly corresponding to a blue component B (for example, a transmittance is about 1 at a wavelength $\lambda$=400 to 500 nm and about 0 at other wavelengths), a green component G (for example, a transmittance is about 1 at a wavelength $\lambda$=500 to 600 nm and about 0 at other wavelengths), and a red component R (for example, a transmittance is about 1 at a wavelength $\lambda$=600 to 700 nm and about 0 at other wavelengths), which are three primary colors of visible light VL (wavelength $\lambda$=380 to 780 nm), are used.

In addition, the transmittance of 'about 1' corresponds to an ideal condition, and it is desirable that the transmittance in the wavelength region be much larger than that in the other wavelength regions. A part whose transmittance is not '1' may be included. In addition, the transmittance of "about zero" also corresponds to an ideal condition, and it is desirable that the transmittance in the wavelength region be much smaller than that in the other wavelength regions. A part whose transmittance is not 'zero' may be included.

In addition, it is desirable to allow wavelength region components of predetermined colors (primary colors or complementary colors) within a visible light VL region, which are transmission wavelength region components, to be transmitted. It does not matter whether or not light in an infrared light IR region, which is a reflection wavelength region component, is transmitted. That is, a transmittance with respect to the infrared light IR does not matter. This is because the infrared light IR component is cut off by a dielectric-laminated layer 1.

As an example, a filter having a spectral sensitivity characteristic in a first example shown in FIG. 8 may be used. For example, the blue filter 14B corresponding to a B channel is a filter having high transmittance with respect to a light signal having a wavelength in a range of 380 nm to 480 nm corresponding to a blue color, the green filter 14G corresponding to a G channel is a filter having high transmittance with respect to a light signal having a wavelength in a range of 45° nm to 550 nm corresponding to a green color, and the red filter 14R corresponding to an R channel is a filter having high transmittance with respect to a light signal having a wavelength in a range of 550 nm to 650 nm corresponding to a red color. In addition, the color filters 14R, 14G, and 14B corresponding to the RGB colors have properties not allowing infrared light components having wavelengths of about 700 nm or more to be transmitted.

On the other hand, in the white filter 14W corresponding to the A channel, the peak is about 530 nm. However, the white filter 14W has a property allowing all signals corresponding to RGB components to be transmitted and also allowing infrared components having wavelengths of 700 nm or more to be transmitted. By causing not only a visible light component but also an infrared light component to be detected in the wide wavelength region pixel 12A, it is possible to make the wide wavelength region pixel 12A perform detection with higher sensitivity than the other color pixels (the red pixel 12R, the green pixel 12G, and the blue pixel 12B in this example) that detect respective components by separating a visible light region into a plurality of wavelengths.

Furthermore, in this example, the transmittance of the white filter 14W in a visible light region is almost the same as a ratio of transmittances of respective visible light regions of the blue filter 14B, the green filter 14G, and the red filter 14R and is higher than the entire transmittance of thereof. In addition, the sensitivity of the wide wavelength region pixel 12A in the visible light region is also higher than the sensitivity of the blue pixel 12B, the red pixel 12R, and the green pixel 12G. By causing an infrared light component, which is an example of an invisible light component, to be also detected, it is possible to obtain high sensitivity. In addition, it is possible to perform detection even in the visible light region with higher sensitivity than the other color pixels (the red pixel 12R, the green pixel 12G, and the blue pixel 12B in this example) that detect respective components by separating a visible light region into a plurality of wavelengths, such that higher sensitivity can be realized.

In addition, a filter having a spectral sensitivity characteristic in a second example shown in FIG. 9 may also be used. In addition, an A/D converted output is shown in FIG. 9. In the second example, all components having almost the same level are output in an infrared light region (800 nm or more). In addition, in the second example, detection of infrared light is excluded by using an infrared light cut-off filter, which is suitable for an application for acquiring an image in a visible light region. The transmittance of the white filter 14W in a visible light region is almost the same as the ratio of transmittances of respective visible light regions of the blue filter 14B, the green filter 14G, and the red filter 14R and is higher than the entire transmittance of thereof. In addition, the sensitivity of the wide wavelength region pixel 12A in the visible light region is also higher (is about twice with respect to G) than the sensitivity of the blue pixel 12B, the red pixel 12R, and the green pixel 12G. The high sensitization is realized by causing detection to be performed in the visible light region with higher sensitivity than the other color pixels (the red pixel 12R, the green pixel 12G, and the blue pixel 12B in this example) that detect respective components by separating the visible light region into a plurality of wavelengths.

<Imaging Apparatus>

Figure 10:
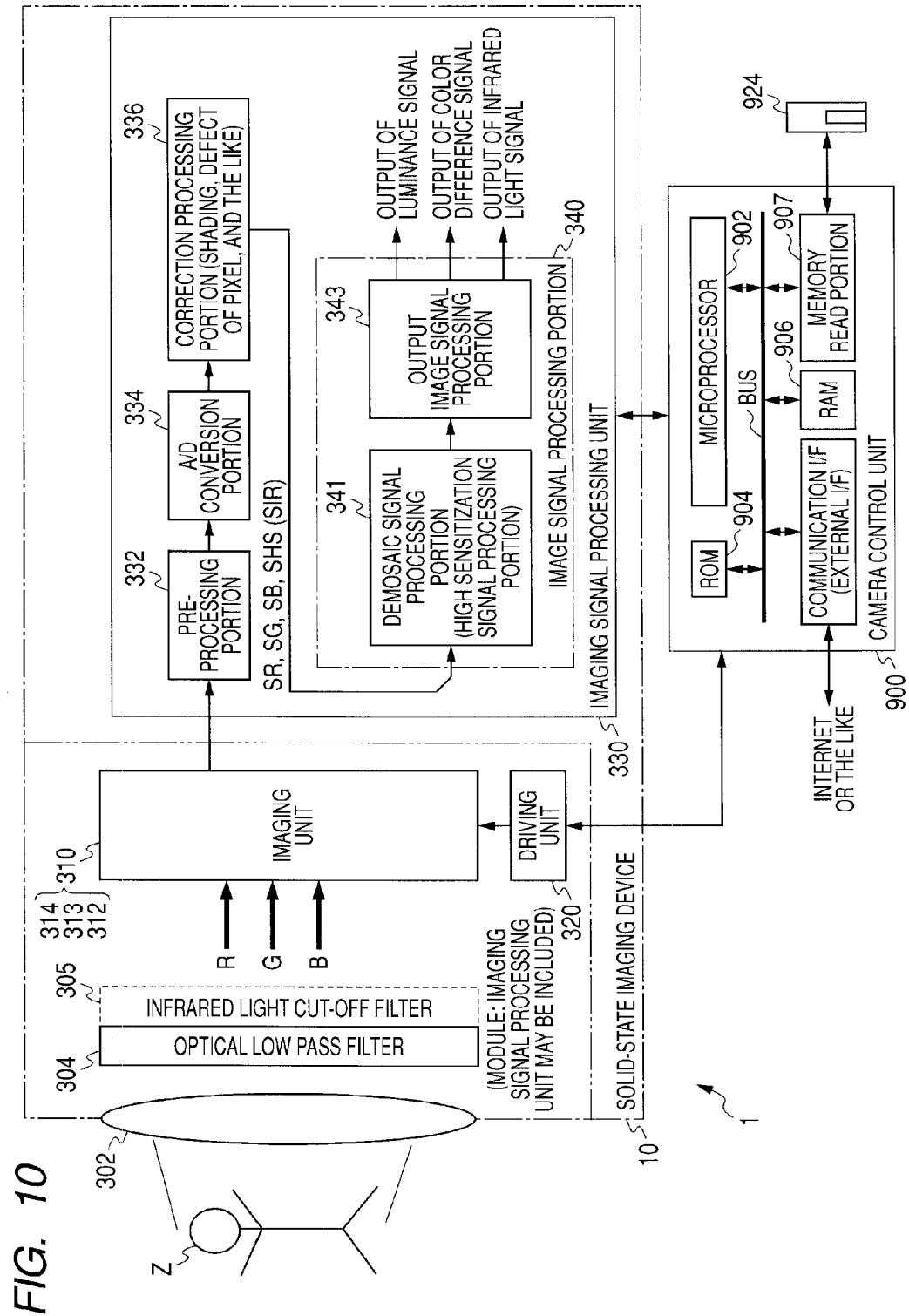
FIG. 10 is a view illustrating a schematic configuration of an imaging apparatus, which is an example of a physical information acquiring apparatus.

FIG. 10 is a view illustrating a schematic configuration of an imaging apparatus, which is an example of a physical information acquiring apparatus. An imaging apparatus 1 is an imaging apparatus, which independently obtains a luminance image including a visible light color image and a near-infrared light component, or an imaging apparatus which obtains a visible light color image corrected by using a near-infrared light component.

Specifically, the imaging apparatus 1 includes: an photographing lens 302 that forms an image by guiding light L, which carries an image of a photographic subject Z, toward an imaging portion; an optical low pass filter 304; an imaging unit 310 that forms a semiconductor device as a whole and includes a solid-state imaging device (image sensor) 312, which is an example of a semiconductor device, an infrared light cut-off filter layer 313, which is an example of an invisible light cut-off filter layer, and the color filter group 314; a driving unit 320 that drives the solid-state imaging device 312; an imaging signal processing unit 330 that processes an infrared light signal SIR (infrared light component), which is an example of an invisible light component signal output from the solid-state imaging device 312, and a visible light signal SVL (visible light component); and a camera control unit 900 functioning as a main control unit that controls the entire imaging apparatus 1. In the drawing, as an example, a solid-state imaging apparatus 10 is configured to include components from the photographing lens 302 to the imaging signal processing unit 330.

The infrared light cut-off filter layer 313 is an example of a first wavelength separation filter portion including: an opening portion 313a that allows a visible light region component as a component in a first wavelength region and an infrared light component as a component in a second wavelength region to be transmitted therethrough; and a non-opening portion 313b that allows a visible light region component as a component in the first wavelength region to be transmitted therethrough but does not allow an infrared light component as a component in the second wavelength region to be transmitted therethrough.

The color filter group 314 is an example of a second wavelength separation filter portion that separates the visible light region as the first wavelength region into wavelength region components different from the visible light region. The optical low pass filter 304 serves to cut off high-frequency components having the Nyquist frequency or more in order to prevent folded distortion.

In addition, as shown by a dotted line of the drawing, the infrared light cut-off filter 305 for reducing an infrared light component is provided together with the optical low pass filter 304 in a typical imaging apparatus. However, in order to make it possible to image an infrared light image, a configuration in which the infrared light cut-off filter 305 is not provided is basically adopted. Moreover, in the case of a configuration in which a visible light color image and a near-infrared light image are independently obtained, a structure having an optical member (referred to as a wavelength separation optical system) for dividing a light L1 that is incident through the photographing lens 302 into the infrared light IR, which is an example of invisible light, and visible light VL may be adopted.

The solid-state imaging element 312 is an imaging element configured to include a photoelectric conversion pixel group formed in a two-dimensional matrix. On an imaging surface of the solid-state imaging element 312, charges corresponding to infrared light IR, which carries an image of the photographic subject Z, and charges corresponding to the visible light VL are generated. Operations, such as a charge accumulating operation or a charge reading operation, are controlled by a sensor driving pulse signal that is output from a system control circuit (not shown) to the driving unit 320. A charge signal read from the solid-state imaging element 312 is transmitted to the imaging signal processing unit 330 in which a predetermined signal processing is performed.

Here, in the configuration according to the present embodiment, a wide wavelength region signal having higher light use efficiency than signals obtained through the color filters C1, C2, and C3 is made to be obtained through the color filter C4. When components up to an infrared light component are detected through the color filter C4, the infrared light signal SIR included in the wide wavelength region signal SA functions as a signal component that complements signals shown as the entire components in the visible light region, that is, a signal generally called a luminance signal SY. However, in the present embodiment, detection up to an infrared light component does not need to be necessarily performed. Preferably, the detection sensitivity in a visible light region when the detection is performed through the color filter C4 is at least higher than that of an output of a detecting portion for color signal detection when the detection is performed through the other color filters C1, C2, and C3.

For example, the imaging signal processing unit 330 includes: a pre-processing portion 332 that performs pre-processing, such as black level adjustment, gain adjustment, clipping processing, and gamma correction, on sensor output signals (wide wavelength region signal SA including the infrared light signal SIR and the luminance signal SY obtained through the color filter C4 and color signals SR, SG, and SB obtained through the color filters C1, C2, and C3) output from the solid-state imaging element 312; an A/D conversion portion 334 which converts an analog signal output from the pre-processing portion 332 into a digital signal; a correction processing portion 336 that performs white balance correction or corrects shading occurring in the photographing lens 302, defect of a pixel defect of the solid-state imaging element 312, and the like; and an image signal processing portion 340 which is an example of a signal processing unit according to the embodiment of the present invention.

The image signal processing portion 340 includes a synchronization processing portion or a demosaic signal processing portion 341 that is an example of a high sensitization signal processing portion, which images the photographic subject Z with color and sensitivity different for every pixel according to an arrangement pattern (mosaic pattern) of the color filters C1 to C4 and converts a color and sensitivity mosaic image, in which the color and the sensitivity are formed in a mosaic pattern, into an image in which each pixel has the entire color components and uniform sensitivity.

The demosaic signal processing portion 341 serving as a high sensitization signal processing portion acquires a signal indicating a photometric amount (measured amount) on the basis of a unit signal corresponding to each wavelength detected in a first detecting portion, which detects a signal through the color filters C1 to C3, and executes a sensitivity correction operation on the unit signal (color signal) corresponding to each wavelength detected in the first detecting portion by using the signal indicating the photometric amount and a signal of each color component in a first wavelength region (in this example, at least high-sensitivity information in a visible light region is included) detected in a second detecting portion that detects a signal through the color filter C4, which will be described in detail later.

Accordingly, although not shown here, the demosaic signal processing portion 341 includes a luminance image generation processing portion, which generates a luminance image as a signal indicating a photometric amount from the color and sensitivity mosaic image obtained by an imaging operation, and a monochrome image processing portion, which generates monochrome images R, G, and B by using a color and sensitivity mosaic image and a luminance image. Furthermore, in general, processing for generating a luminance image or a monochrome image as information, in which color and sensitivity is uniform at all pixel locations, from a mosaic image as imaging information of a mosaic pattern different in a wavelength component (color component) or the sensitivity is call demosaic processing.

In addition, the demosaic signal processing portion 341 includes a high sensitization correction portion that generates monochrome images R, G, and B, which are subjected to high-sensitivity correction, by correcting a monochrome image obtained in a monochrome image processing portion using a luminance image (indicating a photometric amount) obtained in the luminance image generation processing portion and a high-sensitivity imaging signal SHS obtained through the color filter C4.

Both the luminance image generation processing portion and the monochrome image processing portion generate monochrome images (demosaic images W, G, R, and B), each of which has a pixel value corresponding to each color component, by performing interpolation processing on the color and sensitivity mosaic image using a conversion color with respect to a component at a pixel location under attention, information on a pixel near the component, and high-sensitivity information acquired through the color filter C4.

Here, as an example of executing the sensitivity correction operation, it is considered that demosaic processing for generating information having uniform wavelength component or sensitivity from information having a mosaic pattern different in the wavelength component or the sensitivity is executed with respect to locations of all detecting portions and then a sensitivity correction operation is executed. However, in this method, in order to add the white (Y) for high-sensitivity luminance signals in the known color coding arrangement that is basically used, a predetermined color (one color or a plurality of colors) in the known arrangement needs to be replaced with the white (Y). As a result, a decrease in color resolution occurs or a false color due to the decrease in color resolution is generated in a demosaic image generated in demosaic processing. Therefore, in the case that a demosaic image is generated for each color and then high sensitization processing is performed by using information on a high-resolution pixel, the problems of the decrease in color resolution and the false color generated due to the decrease still remain. Depending on cases, false color information may be emphasized by the high sensitization processing. Accordingly, in the high sensitization correction according to the present embodiment, processing for suppressing incorrect color information is performed together with executing the sensitivity correction operation while demosaic processing is being executed, which is not performed after generating the demosaic image.

In addition, although a detailed explanation will be made later, at a stage subsequent to a monochrome image signal generating portion, a color difference signal processing portion which generates a color difference signal (for example, R−Y or B−Y) on the basis of the monochrome images R, G, and B obtained in the monochrome image signal generating portion may be provided or a mixing processing portion which generates monochrome image signals Rz, Gz, and Bz as final color output signals by adding monochrome image signals Ra, Ga, and Ba on the basis of the monochrome images R, G, and B obtained in the monochrome image signal generating portion, which may be different according to signal processing. In the latter case, a color difference signal processing portion which generates a color difference signal (for example, R−Y or B−Y) may be further provided at a subsequent stage.

In addition, the image signal processing portion 340 may include a luminance signal processing portion which generates a luminance signal Yz as a final luminance output signal by performing desired luminance signal processing on the wide wavelength region signal SA output from the luminance signal generating portion of the demosaic signal processing portion 341. In the case when the luminance signal processing portion is not provided, a signal obtained through the demosaic processing is output as a luminance signal Yz.

In addition, the image signal processing portion 340 may include an infrared signal processing portion which generates an infrared light signal SIRz, which indicates an infrared light image, by extracting the infrared light signal SIR from the wide wavelength region signal SA output from the luminance signal generating portion of the demosaic signal processing portion 341.

In the present embodiment, the luminance signal processing portion, the color difference signal processing portion, the mixing processing portion, and the infrared signal processing portion are collectively called an output image signal processing portion 343.

Although not shown, an encoder for obtaining a video signal for monitor output may be further provided at a stage subsequent to the output image signal processing portion 343. The encoder generates a chroma signal by performing modulation with sub-carriers based on various kinds of broadcasting systems on the basis of two color difference signals (for example, R−Y or B−Y) and generates a video signal by mixing the generated chroma signal with the luminance signal Y.

The monochrome image signal generating portion generates monochrome images, each of which has a pixel value corresponding to each color component, by performing interpolation processing on the color and sensitivity mosaic image using the neighboring pixel signals SR, SG, and SB having the same colors with respect to a color component under attention on the basis of each color and sensitivity mosaic image obtained through each of the color filters R, G, and B, color mosaic pattern information indicating an arrangement pattern of each of the color filters R, G, and B, and sensitivity mosaic pattern information.

Similarly, a luminance image generating portion generates a wide wavelength region image, in which all pixels obtained have pixel values of high wavelength region signal components, by performing interpolation processing on the color and sensitivity mosaic image using the neighboring pixel signal SA having the same color on the basis of a color and sensitivity mosaic image obtained through the color filter C4, color mosaic pattern information indicating an arrangement pattern of the color filter C4, and the sensitivity mosaic pattern information, and the generated wide wavelength region image is actually used as a luminance image.

In the case of the Bayer arrangement in which the color filter C4 is not provided and color filters corresponding to primary colors of R, G, and B, it is necessary to generate a luminance image by obtaining estimated values of the three primary color components R, G, and B on the basis of each color and sensitivity mosaic image obtained through each of the color filters R, G, and B, color mosaic pattern information indicating the arrangement pattern of each of the color filters R, G, and B, and the sensitivity mosaic pattern information, multiplying the obtained estimated values by a color balance coefficient, adding the multiplied values for each color, and setting the sum as a pixel value. However, in the present embodiment, such operations are not needed.

Through such a configuration, the imaging apparatus 1 captures an optical image, which shows the photographic subject Z including the infrared light IR, by means of the photographing lens 302, loads the captured optical image to the imaging unit 310 without separating the infrared light image (near-infrared light optical image) and a visible light image (visible light optical image), converts the infrared light image and the visible light image into video signals and then performs predetermined signal processing (for example, color signal separation into R, G, and B components) by means of the imaging signal processing unit 330, and outputs the signal subjected to signal processing as a color image signal or an infrared light image signal or a mixed image signal obtained by mixing the color image signal and the infrared light image signal.

For example, the photographing lens 302 is a lens formed of an optical material, such as quartz or sapphire, which allows light in a wavelength range of 380 nm to 2200 nm to be transmitted therethrough, and captures an optical image including the infrared light IR and forms the image on the solid-state imaging element 312 while condensing the light.

In addition, in the case when the white filter W is used as the color filter C4, a correction pixel where each color filter C4 is arranged has sensitivity in a wide wavelength region from visible light to infrared light. Accordingly, in this case, a pixel signal is easily saturated compared with other pixels for visible light imaging where the color filters C1, C2, and C3 are arranged. In order to avoid this problem, it is preferable to control a detection time of the second detecting portion where the color filter C4 is arranged by using the driving unit 320. For example, in the case of imaging in a bright place, it is preferable to read a pixel signal from a detecting portion of a correction pixel in a period shorter than that in a normal condition, for example, by using an electronic shutter function and then transmit the pixel signal to the pre-processing portion 332. In this case, an effect against saturation can be obtained by transmitting a signal at a rate higher than 60 frames/second.

In addition, an electric charge may be read from a detecting portion of a correction pixel in a period of time (accumulation time) shorter than 0.01667 second. In this case, accumulation of electric charges in an effectively short period of time can be read by discharging a charge signal to a substrate side using overflow. Furthermore, preferably, a better effect against saturation is obtained by transmitting a signal at a rate higher than 240 frames/second. In addition, an electric charge may be read from a detecting portion in a period of time (accumulation time) shorter than 4.16 milliseconds. In any case, it is preferable to make saturation of a pixel signal, which is output from the detecting portion of a correction pixel, difficult. In addition, such reading of electric charges performed in a short period (accumulation time) of time in order to prevent saturation may be performed only for a correction pixel or for all pixels.

In addition, a weak signal may be converted to a strong signal by integrating a signal read in a short period of time twice or more, such that an S/N ratio may be increased. In this manner, for example, suitable sensitivity and a high S/N ratio are obtained regardless of imaging in a bright place and imaging in a dark place, and a dynamic range is enlarged.

<<Camera Control Unit>>

The camera control unit 900 includes: a microprocessor 902 that is a core portion of a computer, a representative example of which is a CPU (central processing unit) in which functions of operations and controls performed by a computer are integrated in a micro integrated circuit; a ROM (read only memory) 904 that a storage portion for read only; a RAM (random access memory) 906 in which writing and reading are possible when needed and which is an example of a volatile storage portion; and other peripheral members which are not shown in the drawing. The microprocessor 902, the ROM 904, and the RAM 906 are collectively called a microcomputer. The camera control unit 900 serves to control the entire system. In particular, the camera control unit 900 has a function of adjusting various kinds of setting information when generating a demosaic image by interpolation processing performed by referring to pixel information on high-sensitivity wide wavelength region pixel or interpolation processing resulting from correlation correction.

In the above description, the 'volatile storage portion' means a storage portion in which stored contents are removed when an apparatus is turned off. On the other hand, the 'non-volatile storage portion' means a storage portion in which stored contents are persistently stored even when a main power supply of an apparatus is turned off. Any storage portion capable of persistently storing the stored contents may be used as the non-volatile storage portion. The non-volatile storage portion is not limited to a memory device which is formed of semiconductor and has a non-volatile property. For example, a volatile memory device may be configured to show the 'non-volatile property' by providing a backup power supply.

In addition, the non-volatile storage portion is not limited to being formed by using a memory device formed of semiconductor. For example, the non-volatile storage portion may be formed by using a medium, such as a magnetic disk or optical disk. For example, a hard disk drive may be used as a non-volatile storage portion. Alternatively, a configuration in which information is read from a recording medium, such as a CD-ROM, may be adopted as a non-volatile storage portion.

In the ROM 904, a control program and the like of the camera control unit 900 are stored. Particularly in this example, a program for performing interpolation processing accompanied by correlation correction by the camera control unit 900 is stored in the ROM 904. Data and the like allowing the camera control unit 900 to perform various kinds of processing are stored in the RAM 906.

In addition, the camera control unit 900 is configured such that a recording medium 924, such as a memory card, can be inserted thereinto or detached therefrom and configured so as to be able to be connected with a communication network, such as Internet. For example, the camera control unit 900 includes a memory read portion 907 and a communication I/F (interface) 908 in addition to the microprocessor 902, the ROM 904, and the RAM 906.

For example, the recording medium 924 is used to register program data, which is used to cause microprocessor 902 to execute software processing, or data, such as on/off timing of various kinds of control pulses or various set values, for performing exposure control processing (including an electronic shutter control) or convergence range of photometric data DL on the basis of a luminance signal from a luminance signal processing portion 840 and interpolation processing accompanied by correlation correction.

The memory read portion 907 stores (installs) data, which is read from the recording medium 924, in the RAM 906. The communication I/F 908 intermediates transmission and reception of communication data between a communication network, such as Internet, and the camera control unit 900.

In addition, in the imaging apparatus 1 described above, the driving unit 320 and the imaging unit 310 are shown as separate modules. However, it is needless to say that one-chip solid-state imaging device 10, in which the driving unit 320 and the imaging unit 310 are integrally formed on the same semiconductor substrate as the imaging unit 310, may be used.

In addition, in the drawing, the imaging apparatus 1 is shown in a condition where an optical system, such as a photographing lens 802, an optical low pass filter 804, or an infrared light cut-off filter 805, is also included in addition to the imaging unit 310 or the driving unit 320. This is suitable for a case of adopting a module shape having an imaging function packaged by collecting those described above.

In addition, the entire imaging apparatus 1 may be configured such that the solid-state imaging device 10 is provided in a module shape having an imaging function in a condition where the imaging unit 310 and a signal processing unit closely associated with the imaging unit 310, such as a parallel signal processing unit having an A/D conversion function or a differential (CDS) processing function, are collectively packaged and the imaging signal processing unit 330, which is the remaining signal processing unit, may be provided at a stage subsequent to the solid-state imaging device 10 provided in the module shape.

Alternatively, although not shown, the entire imaging apparatus 1 may be configured such that the solid-state imaging device 10 is provided in a module shape having an imaging function in a condition where optical systems, such as the imaging unit 310 and the photographing lens 802, are collectively packaged and the imaging signal processing unit 330 is also provided within the module in addition to the solid-state imaging device 10 provided in the module shape.

Such an imaging apparatus 1 is provided, for example, as a camera or a portable apparatus having an imaging function, which is used to perform 'imaging'. In addition, the 'imaging' includes not only imaging of an image at the time of normal photographing of a camera but also detection of a fingerprint and the like as a broad sense of meaning.

The imaging apparatus 1 having the above configuration is also configured to include all the functions of the solid-state imaging device 10, and accordingly, the basic configuration and operations of the solid-state imaging device 10 can be used in the same manner as above. In the case of adopting high-sensitivity zigzag arrangement color coding, a structure can be realized in which information having good quality (in particular, performance regarding color resolution) can be acquired by interpolation processing performed with reference to image information of the high-sensitivity wide wavelength region pixel 12A and interpolation processing accompanied by correlation correction.

<<Details of the Imaging Signal Processing Unit>>

Figure 11:
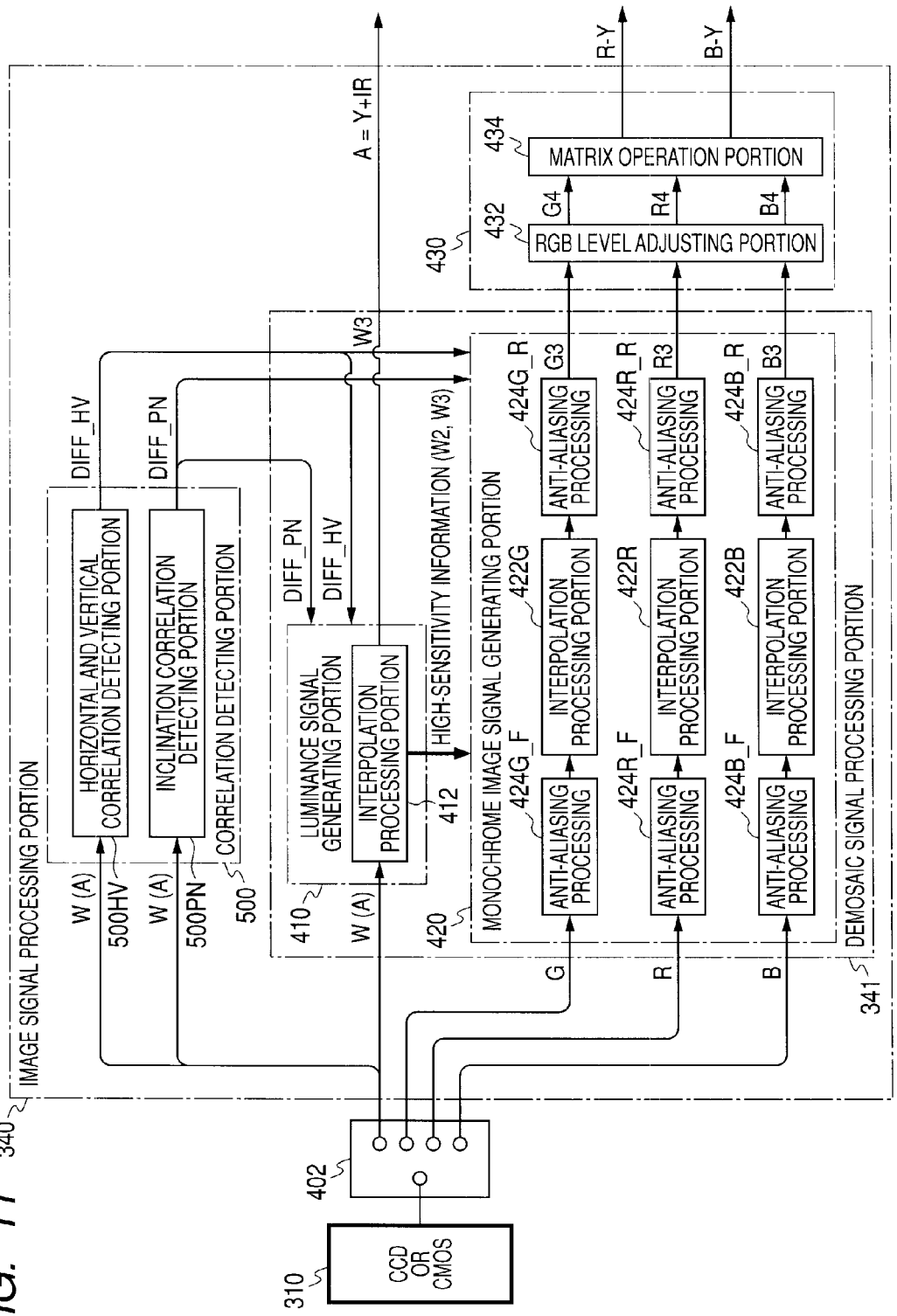
FIG. 11 is a functional block diagram illustrating the detailed configuration of an imaging signal processing unit (especially, an image signal processing portion) according to an embodiment.

FIG. 11 is a functional block diagram illustrating the detailed configuration of the imaging signal processing unit 330 (especially, the image signal processing portion 340) according to the present embodiment. The imaging signal processing unit 330 according to the present embodiment processes a pixel signal output from the solid-state imaging element 312 having a color arrangement that includes specific wavelength region signal acquisition elements (a set of pixels 12R, 12G, and 12R or a set of pixels 12Cy, 12Mg, and 12Ye), which acquire visible light signals corresponding to a specific light wavelength region of a primary color system of RGB or a complementary color system of Cy, Mg, and Ye, and a wide wavelength region signal acquisition element (wide wavelength region pixel 12A) which acquires a light signal including a visible light component and an invisible light component, such as infrared light.

As can be understood from the above explanation, the example of processing in the imaging signal processing unit 330 is suitable for noise reduction processing for an image including lots of noises, which is performed on the basis of image data of one sheet including lots of noises photographed by using the imaging unit 310, which includes the color filter group 314, under low illuminance, for example.

Here, the imaging signal processing unit 330 corresponds to the configuration of signal processing for acquiring a luminance signal (Y) and two color difference signals (R−Y) and (B−Y) by performing signal processing for an image photographed in the imaging unit 310 (for example, a CCD solid-state imaging element or a CMOS solid-state imaging element) having a color arrangement of RGBW as the color filter group 314.

In addition, processing, such as white balance adjustment, is executed on image data (pixel signal) acquired by the imaging unit 310. Since the processing is the same processing as in the related art, the processing is not shown in FIG. 11 (refer to the pre-processing portion 332 and the correction processing portion 336 shown in FIG. 10). In FIG. 11, a state in which the image signal processing portion 340 is focused is shown.

As shown in the drawing, the image signal processing portion 340 is configured to include: a luminance signal generating portion 410 which acquires the high-sensitivity mosaic image W, which is shown as an acquisition signal (wide wavelength region signal SA) of the wide wavelength region pixel 12A, from a signal acquired by the imaging unit 310 having an arrangement of RGBW and generates a demosaic image W2 (Y+IR), which is shown as a wide wavelength region signal, as a luminance signal; a monochrome image signal generating portion 420 which acquires mosaic images R, G, and B shown as acquisition signals SR, SG, and SB of the RGB elements 12R, 12G, and 12B and generates signals regarding colors indicating demosaic images R3, G3, and B3 (monochrome images R, G, and B) corresponding to visible light region signals; and a color signal generating portion 430 which generates color difference signals R−Y and B−Y on the basis of the demosaic images R3, G3, and B3 (monochrome images SR3, SG3, and SB3) acquired in the monochrome image signal generating portion 420.

The luminance signal generating portion 410 is an example of a first physical information acquiring portion. The monochrome image signal generating portion 420 is an example of a second physical information acquiring portion. The color signal generating portion 430 is an example of a third physical information acquiring portion. The luminance signal generating portion 410 and the monochrome image signal generating portion 420 form the demosaic signal processing portion 341, and the monochrome image signal generating portion 420 and the color signal generating portion 430 form a color component extracting portion. In addition, the luminance signal generating portion 410 and the color signal generating portion 430 form the output image signal processing portion 343.

The luminance signal generating portion 410 includes an interpolation processing portion 412 which has a low pass filter (LPF; interpolation filter) having a filter constant optimized for the high-sensitivity mosaic image W and which performs interpolation processing focused on the wide wavelength region pixel 12A (12W), which is a high-sensitivity pixel. Since the high-sensitivity pixel W has a relatively high S/N ratio in a condition of low illuminance, a luminance image which uses the high-sensitivity pixel W has low noise sensitivity. Accordingly, an image having high quality (high S/N ratio) where noises are satisfactorily suppressed in the low illuminance condition is obtained.

The monochrome image signal generating portion 420 includes: an interpolation processing portion 422 (422G, 422R, and 422B, respectively) which has a low pass filter, which has a filter constant optimized for the mosaic images R, G, and B, for each color and performs interpolation processing for each color; and an anti-aliasing processing portion 424 which performs anti-aliasing processing for each color and is positioned at a stage before or behind the interpolation processing portion 422 or both stages before and behind the interpolation processing portion 422. The front-stage-side anti-aliasing processing portion 424 is referred to as a front-stage anti-aliasing processing portion 424_F (424G_F, 424R_F, and 424B_F, respectively), and the rear-stage-side anti-aliasing processing portion 424 is referred to as a rear-stage anti-aliasing processing portion 424_R (424G_R, 424R_R, and 424B_R, respectively).

It is possible to suppress a false color generated due to a pixel phase difference and to increase an S/N ratio of demosaic images G, R, and B not having high sensitivity by performing anti-aliasing processing on color components G, R, and B. In addition, in the case where the anti-aliasing processing portion 424 is provided in either the stage before the interpolation processing portion 422 or the stage behind the interpolation processing portion 422, it is preferable to consider the following point.

That is, although it is optimal to perform anti-aliasing processing in both sides before and after interpolation processing, it is preferable to perform the anti-aliasing processing in a side where an existence effect or processing efficiency is better when the anti-aliasing processing portion 424 is arranged in one of the sides. In this example, there is no large difference between an effect of anti-aliasing processing before interpolation and an effect of anti-aliasing processing after interpolation. However, as for the number of pixels to be processed, a case of anti-aliasing processing before interpolation is smaller than a case of anti-aliasing processing after interpolation. Accordingly, as for the number of operation processing for anti-aliasing processing, the case of anti-aliasing processing before interpolation is smaller than the case of anti-aliasing processing after interpolation. Taking this point into consideration, a case in which the anti-aliasing processing portion 424 is arranged before the interpolation processing portion 422 to thereby perform the anti-aliasing processing before interpolation is effective and advantageous in that the number of operations is small.

Pixel signals at respective pixel locations are switched to be input to a first interpolation processing portion 412_1 and a second interpolation processing portion 412_2 of the luminance signal generating portion 410 and the monochrome image signal generating portion 420 from a side of the imaging unit 310 through a selection switch 402.

The color signal generating portion 430 includes: a level adjusting portion 432 (432G, 432R, and 432B, respectively) which adjusts signal levels of the monochrome signals SG3, SR3, and SB3, which correspond to respective colors, expressing the demosaic images G3, R3, and B3 output from the monochrome image signal generating portion 420; and a matrix operation portion 434 which generates a mixed luminance signal SY4 indicating a luminance component on the basis of monochrome signals SG4, SR4, and SB4 whose levels have been completely adjusted by the level adjusting portion 432 and generates color difference signals R-Y and B-Y by taking a difference between the monochrome signals SR4 and SB4.

The color signal generating portion 430 first adjusts a balance of a luminance signal level and a RGB signal level by means of the level adjusting portion 432 and then converts the color difference signals R−Y (or Cr) and B−Y (or Cb) by means of the matrix operation portion 434.

As an example of balance adjustment of signal levels performed by the level adjusting portion 432, a luminance signal based on the monochrome signals SG, SR, and SB output from the monochrome image signal generating portion 420 expressing each of the demosaic images G, R, and B is set to Yrgb (=k1*R+k2*G+k3*B), and a luminance signal expressing the high-sensitivity mosaic image W is set to Yw. From a ratio of those values, a gain KK=Yw/Yrgb is calculated. The level adjusting portion 432 passes to the matrix operation portion 434 SR3 (output RadjL)=KK*SR2, SR3 (GadjL) =KK*G, and SB3 (BadjL)=KK*B on the basis of the gain KK. By adjusting a signal level using the high-sensitivity mosaic image W, an aperture compensation effect or a color difference noise suppression effect are obtained.

In addition, the imaging signal processing unit 330 in the present embodiment includes a correlation detecting portion 500 which performs correlation detection on the basis of the high-sensitivity mosaic image W (image arranged in a square shape in the case of an inclined arranged color filter coding; the same below). A deviation in correlation can be eliminated by calculating a correlation only with the high-sensitivity pixel expressing the high-sensitivity mosaic image W.

The correlation detecting portion 500 includes: a horizontal and vertical correlation detecting portion 500HV, which detects a horizontal and vertical correlation coefficient DIFF_HV obtained by integrating correlation coefficients DIFF_H and DIFF_V in the horizontal direction and vertical direction of the high-sensitivity mosaic image W; and an inclination correlation detecting portion 500PN which detects an inclination correlation coefficient DIFF_PN obtained by integrating correlation coefficients DIFF_P and DIFF_N in a rightward ascending direction and rightward descending direction of the high-sensitivity mosaic image W.

Since the imaging signal processing unit 330 in the present embodiment uses the correlative relationship for mosaic processing, the correlation detecting portion 500 performs correlation detection using a high-sensitivity signal SW from the high-sensitivity mosaic image W. The luminance signal generating portion 410 and the monochrome image signal generating portion 420 are characterized in that processing performed with reference to a correlation coefficient, which shows the correlative relationship detected in the correlation detecting portion 500, is performed in all the anti-aliasing processing and the interpolation processing.

Since the correlative relationship is acquired only with a high-sensitivity pixel expressing the high-sensitivity mosaic image W, a deviation in correlation can be eliminated. Accordingly, referring to the horizontal and vertical correlation coefficient DIFF_HV and the inclination correlation coefficient DIFF_PN, for example, an effect that the resolution is increased at the time of interpolation processing in the luminance signal generating portion 410 is obtained. An effect of suppression of a false color generated due to a pixel phase difference is obtained at the time of interpolation processing of a color signal system. In addition, since a phase of a color signal system matches a luminance signal at the time of anti-aliasing processing, an effect of aliasing suppression is increased. As for all the color signals, an effect of suppressing noises of color difference signals output from the color signal generating portion 430 is obtained.

<<Demosaic Processing>> <<Outline of Processing>>

FIGS. 12A to 12F are views illustrating the outline of procedures of demosaic processing (synchronization processing) of the imaging signal processing unit 330 in the present embodiment which processes each of the pixel signals R, G, B, and W from the imaging unit 310 in which color filter coding using a high-sensitivity pixel and a primary color RGB pixels is performed. FIGS. 13 to 16 are views explaining a process of generating each of the demosaic images W, G, R and B in color filter coding of the inclined matrix arrangement shown in FIG. 2C. FIGS. 17 to 20 are views explaining a process of generating each of the demosaic images W, G, R and B in color filter coding of the square matrix arrangement shown in FIG. 2B. In each drawing, RGBW in a demosaic image is a pixel value obtained by a mosaic image, and rgbw indicates an interpolation pixel value obtained by demosaic processing.

A high-sensitivity pixel has luminance information, such as transparency, gray, or white W. If this is expressed as an expression, W=k1*R+k2*G+k3*B. Coefficients K1, K2, and K3 with respect to R, G, and B are arbitrary values that can be expressed as transparency, gray, or white W. As an example of color filter encoding, it is preferable that a rate of the wide wavelength region pixel 12A having a function of a high-sensitivity pixel be highest in a repetition unit of a filter arrangement. For example, the square matrix arrangement shown in FIG. 2B may be used. In addition, a high-sensitivity zigzag arrangement, such as the inclined matrix arrangement shown in FIG. 2C, may also be used. The example shown in FIG. 12A corresponds to a case of the inclined matrix arrangement shown in FIG. 2C, and FIG. 12B is a case of the square matrix arrangement shown in FIG. 2B.

A signal photographed in the imaging unit 310 having an arrangement of RGBW, which includes the white filter 14W, or an arrangement of RGBA, which does not include the white filter 14W, is converted into digital data in an A/D conversion portion (not shown; refer to the A/D conversion portion 334 shown in FIG. 10). Here, signals that are generated show four mosaic images corresponding to RGBW (RGBA).

Figures 12A, 12B, 12C, 12D, 12E, 12F:
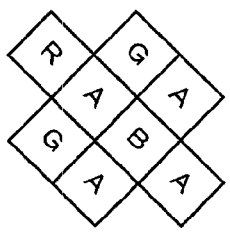
FIGS. 12A to 12F are views illustrating the outline of procedures of demosaic processing.

For example, in the case where the imaging unit 310 having the color filter group 314 with the color arrangement shown in FIG. 2C is applied, although described in FIG. 3, the imaging signal processing unit 330 embeds a blank pixel in the arrangement shown in FIG. 12A (similar to FIG. 2C), as shown in FIGS. 12A to 12F (S100). In this way, as shown in FIG. 12B, a state of a square arrangement in which a repetition unit of a filter arrangement includes five kinds of pixels of 'RGBW+blank' is acquired (this processing is called square arrangement processing).

Then, the imaging signal processing unit 330 acquires four mosaic images W, G, R, and B (or A, G, R, and A; herein after, explained as W, G, R, and B) obtained by extracting predetermined colors under attention from an image after the square arrangement processing shown in FIG. 12B. The mosaic image W is input to the luminance signal generating portion 410, the mosaic images G, R, and B are input to the monochrome image signal generating portion 420, and demosaic processing is executed by executing interpolation processing for setting pixel values of all pixels by processing of interpolating a pixel portion, in which a pixel value is not present, with a surrounding pixel value, such that four demosaic images W, G, R, and B shown in FIGS. 12C to 12F are acquired. At this time, data modification is performed with reference to one, which corresponds to the same interpolation processing direction, of the horizontal and vertical correlation coefficient DIFF_HV and the inclination correlation coefficient DIFF_PN acquired in the correlation detecting portion 500. This function is referred to as interpolation processing with correlation correction.

The demosaic processing is performed by processing for setting pixel values of all pixels by executing interpolation on a pixel, which does not have a pixel value, on the basis of a surrounding pixel value. For example, the same method as a known algorithm of Vargra can be applied. The algorithm of Vargra is an algorithm which performs demosaic processing by calculating eight-direction gradients of pixel values and averaging pixel values having close gradients.

The demosaic processing is processing for determining a pixel value of a pixel portion, in which a pixel value is not present, using pixel values of surrounding pixels. This processing is performed by a so-called two-dimensional FIR filter. That is, a filter having a coefficient corresponding to a pixel position is applied. In addition, preferably, not only the interpolation processing but also anti-aliasing processing is performed for the mosaic images G, R, and B. The interpolation processing and the anti-aliasing processing will be described in detail later.

In interpolation processing, various kinds of methods of using pixel values of surrounding pixels may be adopted. For example, there is a method in which when paying attention to a predetermined color, color interpolation processing for a pixel value of a pixel, in which a color filter corresponding to the color under attention is not arranged, is performed by using a pixel value of a surrounding effective pixel in which a color filter corresponding to the color under attention is arranged. That is, as for a color under attention, information on the position of a pixel, which is not actually present, is interpolated by using information of a pixel, which has the same color, near the pixel position. On the other hand, it is also possible to consider a method in which when paying attention to a predetermined color, color interpolation processing for a pixel value of a pixel, in which a color filter corresponding to the color under attention is not arranged, is performed by using a pixel value of an effective pixel near the pixel under attention using correlation with the other color signals regardless of a color. That is, as for a color under attention, information on the position of a pixel, which is not actually present, is interpolated by using correlation of the same color and the other colors near the pixel position.

In the present embodiment, the demosaic signal processing portion 341 performs interpolation processing in which the two methods are combined. Particularly in generating the demosaic images G, R, and B of a color signal system, interpolation processing is performed with reference to information on the high-sensitivity demosaic image W generated in the luminance signal generating portion 410. For example, at first, regarding a color that is actually present at the position of a pixel under attention but is different from a color of a conversion designation, information of a color pixel of a nearby conversion designation and interpolation processing (interpolation processing needs to be performed several times according to a conversion color) is performed referring to information on a high-resolution demosaic image at the same position as the pixel under attention and a nearby color pixel, such that a mosaic image configured to include pixels corresponding to the color under attention and blank pixels (or W pixels) is generated. Then, regarding the color under attention, interpolation processing for information on the blank pixels (or W pixels) which are not actually present is performed by using the pixel information on the color under attention near the pixel position and referring to information of a high-resolution demosaic image at each position of the blank pixel (or W pixel) under attention and the nearby color pixel, and as a result, a demosaic image in which the same color is arranged at all the pixel positions is generated.

<Demosaic Processing of Inclined Matrix Arrangement Coding>

For example, in the case where the imaging unit 310 including the color filter group 314 having the color arrangement shown in FIG. 2C is applied, for a mosaic image in which five kinds of pixels of 'RGBW+blank' obtained when the inclined matrix arrangement changes to the square arrangement are coded, in a process until the high-sensitivity demosaic image W is acquired, pixels corresponding to R and B colors are converted into G pixels by performing interpolation in the horizontal or vertical direction using G pixels and R pixels (or B pixels) positioned near upper, lower, left, and right sides with the R pixel (or B pixel) interposed there between, as shown in FIG. 13. Thus, a GWBL mosaic image W1 in which three kinds of pixels of GW+blank are coded is acquired. Then, for the GWBL mosaic image W1, a G pixel is converted into a W pixel by performing interpolation in the P and N directions using the W pixel and the G pixel positioned near the rightward ascending direction (P direction) and the rightward descending direction (N direction) with the G pixel interposed there between. As a result, a WBL mosaic image W2 in which two kinds of pixels of 'W+blank' are coded is acquired. Finally, for the WBL mosaic image W2, conversion to the W pixel is made by performing interpolation in the horizontal or vertical direction using the W pixels positioned near upper, lower, left, and right sides with the blank pixel interposed there between. As a result, a high-sensitivity demosaic image W3 configured to include only W pixels is acquired.

In addition, for a mosaic image in which five kinds of pixels of 'RGBW+blank' obtained when the inclined matrix arrangement changes to the square arrangement are coded, in a process until a green demosaic image G is acquired, pixels corresponding to R and B colors are converted into G pixels by performing interpolation in the horizontal or vertical direction using G pixels and R pixels (or B pixels) positioned near upper, lower, left, and right sides with the R pixel (or B pixel) interposed there between, as shown in FIG. 14. Thus, a GWBL mosaic image G1 in which three kinds of pixels of 'GW+blank' are coded is acquired. This GWBL mosaic image G1 is actually the same as the GWBL mosaic image W1 acquired in a process until the high-sensitivity demosaic image W is acquired and may be generated in any of the processing.

Then, for the GWBL mosaic image G1, a W pixel is converted into a G pixel by performing interpolation in the P and N directions using the G pixels positioned near the rightward ascending direction (P direction) and the rightward descending direction (N direction) with the W pixel interposed there between and referring to information on the WBL mosaic image W2 at the same position as the W pixel under attention and the nearby G pixel. As a result, a GBL mosaic image G2 in which two kinds of pixels of 'G+blank' are coded is acquired. Finally, for the GBL mosaic image G2, conversion to the G pixel is made by performing interpolation in the horizontal or vertical direction using the G pixels positioned near upper, lower, left, and right sides with the blank pixel interposed there between and referring to information on the high-sensitivity demosaic image W3 at the same position as the blank pixel under attention and the nearby G pixel. As a result, a demosaic image G3 configured to include only G pixels is acquired.

Furthermore, in a process until a red demosaic image R is acquired, as shown in FIG. 15, for a mosaic image in which five kinds of pixels of 'RGBW+blank' obtained when the inclined matrix arrangement changes to the square arrangement are coded, a B pixel is converted into an R pixel by performing interpolation using R pixels positioned near the P or N direction with the B pixel interposed there between and referring to information on the WBL mosaic image W2 at the same position as the B pixel under attention and the nearby R pixel. As a result, a RGWBL mosaic image R0 in which four kinds of pixels of 'RGW+blank' are coded is acquired. Then, for the RGWBL mosaic image R0, a G pixel is converted into an R pixel by performing interpolation in the horizontal and vertical directions using the R pixels positioned near upper, lower, left, and right sides with the G pixel interposed there between and referring to information on the WBL mosaic image W2 at the same position as the G pixel under attention and the nearby R pixel. As a result, a RWBL mosaic image R1 in which three kinds of pixels of 'RW+blank' are coded is acquired.

Then, for the RWBL mosaic image R1, a W pixel is converted into an R pixel by performing interpolation in the P and N directions using the R pixels positioned near the rightward ascending direction (P direction) and the rightward descending direction (N direction) with the W pixel interposed there between and referring to information on the WBL mosaic image W2 at the same position as the W pixel under attention and the nearby R pixel. As a result, an RBL mosaic image R2 in which two kinds of pixels of 'R+blank' are coded is acquired. Finally, for the RBL mosaic image R2, conversion to the R pixel is made by performing interpolation in the horizontal or vertical direction using the R pixels positioned near upper, lower, left, and right sides with the blank pixel interposed there between and referring to information on the high-sensitivity mosaic image W3 at the same position as the blank pixel under attention and the nearby R pixel. As a result, a demosaic image R3 configured to include only R pixels is acquired.

Furthermore, in a process until a blue demosaic image B is acquired, as shown in FIG. 16, for a mosaic image in which five kinds of pixels of 'RGBW+blank' obtained when the inclined matrix arrangement changes to the square arrangement are coded, an R pixel is converted into a B pixel by performing interpolation using B pixels positioned near the P or N direction with the R pixel interposed there between and referring to information on the WBL mosaic image W2 at the same position as the R pixel under attention and the nearby B pixel. As a result, a BGWBL mosaic image B0 in which four kinds of pixels of 'BGW+blank' are coded is acquired. Then, for the BGWBL mosaic image B0, a G pixel is converted into a B pixel by performing interpolation in the horizontal and vertical directions using the B pixels positioned near upper, lower, left, and right sides with the G pixel interposed there between and referring to information on the WBL mosaic image W2 at the same position as the G pixel under attention and the nearby B pixel. As a result, a BWBL mosaic image B1 in which three kinds of pixels of 'BW+blank' are coded is acquired.

Then, for the BWBL mosaic image B1, a W pixel is converted into a B pixel by performing interpolation in the P and N directions using the B pixels positioned near the rightward ascending direction (P direction) and the rightward descending direction (N direction) with the W pixel interposed there between and referring to information on the WBL mosaic image W2 at the same position as the W pixel under attention and the nearby B pixel. As a result, a BBL mosaic image B2 in which two kinds of pixels of 'B+blank' are coded is acquired. Finally, for the BBL mosaic image B2, conversion to the B pixel is made by performing interpolation in the horizontal or vertical direction using the B pixels positioned near upper, lower, left, and right sides with the blank pixel interposed there between and referring to information on the high-sensitivity demosaic image W3 at the same position as the blank pixel under attention and the nearby B pixel. As a result, a demosaic image B3 configured to include only B pixels is acquired.

<Demosaic Processing of Square Matrix Arrangement Coding>

Further, in the case where the imaging unit 310 including the color filter group 314 having the color arrangement shown in FIG. 2B is applied, for a GRBW mosaic image in which four kinds of pixels of 'GRBW' are coded, in a process until the high-sensitivity demosaic image W is acquired, conversion to a W pixel is made by performing interpolation in the horizontal or vertical direction using the W pixels positioned near upper, lower, left, and right sides with another color pixel interposed there between, as shown in FIG. 17. Thus, a high-sensitivity demosaic image W3 configured to include only the W pixels is acquired.

Furthermore, in a process until a green demosaic image G is acquired, as shown in FIG. 18, for a GRBW mosaic image in which four kinds of pixels of 'GRBW' are coded, an R pixel and a B pixel are converted into G pixels by performing interpolation in the P and N directions using G pixels positioned near the P or N direction with the R pixel (or B pixel) interposed there between and referring to information on the high-sensitivity mosaic image W2 at the same position as the R pixel (or B pixel) under attention and the nearby G pixel. As a result, a GW mosaic image G2 in which two kinds of pixels of GW are coded is acquired. Finally, for the GW mosaic image G2, conversion to the G pixel is made by performing interpolation in the horizontal or vertical direction using the G pixels positioned near upper, lower, left, and right sides with the W pixel interposed there between and referring to information on the high-sensitivity demosaic image W3 at the same position as the W pixel under attention and the nearby G pixel. As a result, a demosaic image G3 configured to include only G pixels is acquired.

Furthermore, in a process until the red demosaic image R is acquired, as shown in FIG. 19, for a GRBW mosaic image in which four kinds of pixels of 'GRBW' are coded, a B pixel is converted into an R pixel by performing interpolation in the horizontal or vertical direction using R pixels positioned near upper, lower, left, and right sides with the B pixel interposed there between and referring to information on the high-sensitivity mosaic image W2 at the same position as the B pixel under attention and the nearby R pixel. As a result, a GRW mosaic image R1 in which three kinds of pixels of 'GRW' are coded is acquired.

Then, for the GRW mosaic image R1, a G pixel is converted into an R pixel by performing interpolation in the P direction or the N direction using the R pixels positioned near the P direction or the N direction with the G pixel interposed there between and referring to information on the high-sensitivity mosaic image W2 at the same position as the G pixel under attention and the nearby R pixel. As a result, an RW mosaic image R2 in which two kinds of pixels of 'RW' are coded is acquired. As a result, an RW mosaic image R2 in which two kinds of pixels of 'RW' are coded is acquired. Finally, for the RW mosaic image R2, conversion to the R pixel is made by performing interpolation in the horizontal or vertical direction using the R pixels positioned near upper, lower, left, and right sides with the W pixel interposed there between and referring to information on the high-sensitivity demosaic image W3 at the same position as the W pixel under attention and the nearby R pixel. As a result, a demosaic image R3 configured to include only R pixels is acquired.

Furthermore, in a process until the blue demosaic image B is acquired, as shown in FIG. 20, for a GRBW mosaic image in which four kinds of pixels of 'GRBW' are coded, an R pixel is converted into a B pixel by performing interpolation in the horizontal or vertical direction using B pixels positioned near upper, lower, left, and right sides with the R pixel interposed there between and referring to information on the high-sensitivity mosaic image W2 at the same position as the R pixel under attention and the nearby B pixel. As a result, a GBW mosaic image B1 in which three kinds of pixels of 'GBW' are coded is acquired.

Then, for the GBW mosaic image B1, a G pixel is converted into a B pixel by performing interpolation in the P direction or the N direction using the R pixels positioned near the P direction or the N direction with the G pixel interposed there between and referring to information on the high-sensitivity mosaic image W2 at the same position as the G pixel under attention and the nearby B pixel. As a result, a BW mosaic image B2 in which two kinds of pixels of 'BW' are coded is acquired. Finally, for the BW mosaic image B2, conversion to the B pixel is made by performing interpolation in the horizontal or vertical direction using the B pixels positioned near upper, lower, left, and right sides with the W pixel interposed there between and referring to information on the high-sensitivity demosaic image W3 at the same position as the W pixel under attention and the nearby B pixel. As a result, a demosaic image B3 configured to include only B pixels is acquired.

In addition, in the present embodiment, the correlative relationship is used for demosaic processing (synchronization processing). Accordingly, the correlation detecting portion 500 performs correlation detection on the basis of the high-sensitivity mosaic image W, calculates the horizontal and vertical correlation coefficient DIFF_HV and the inclination correlation coefficient DIFF_PN, and supplies the correlation coefficients DIFF_HV and the DIFF_PN to the luminance signal generating portion 410 and each portion of the monochrome image signal generating portion 420 (interpolation processing portion 422, front-stage anti-aliasing processing portion 424_F, and rear-stage anti-aliasing processing portion 424_R).

In interpolation processing in the luminance signal generating portion 410 or interpolation processing and anti-aliasing processing in the monochrome image signal generating portion 420, processing is performed with reference to the horizontal and vertical correlation coefficient DIFF_HV and the inclination correlation coefficient DIFF_PN detected in the correlation detecting portion 500. In this case, a correlation coefficient matching the direction of interpolation processing is used.

For example, the luminance signal generating portion 410 performs interpolation processing on the high-sensitivity mosaic image W in the interpolation processing portion 412 and generates a luminance signal Y, which expresses the high-sensitivity demosaic image W, by modifying the high-sensitivity mosaic image W referring to the inclination correlation coefficient DIFF_PN and the horizontal and vertical correlation coefficient DIFF_HV in the same direction as the interpolation processing direction. Then, in the monochrome image signal generating portion 420, color noises (color difference noises generated due to a color difference output that is output from the color signal generating portion 430 in this example) are suppressed by causing the interpolation processing portion 422 to perform interpolation processing on the mosaic images G, R, and G corresponding to respective colors and causing the anti-aliasing processing portion 424 to perform anti-aliasing processing for suppressing alias noises, the anti-aliasing processing being performed before or after the interpolation processing or before and after the interpolation processing. Even in this case, in the monochrome image signal generating portion 420, interpolation processing is performed on demosaic images G, R, and B not having high sensitivity, which are obtained in the above interpolation processing, and the demosaic images G, R, and B are modified by referring to horizontal and vertical correlation coefficient DIFF_HV and the inclination correlation coefficient DIFF_PN. Even at the time of the anti-aliasing processing, mosaic images G, R, and B (before interpolation processing) not having high sensitivity, which are obtained in the anti-aliasing processing, or demosaic images G, R, and B (after interpolation processing) not having high sensitivity are modified referring to the inclination correlation coefficient DIFF_PN and the horizontal and vertical correlation coefficient DIFF_HV in the same direction as the anti-aliasing processing.

<Correlation Detection Processing>

Figure 21:
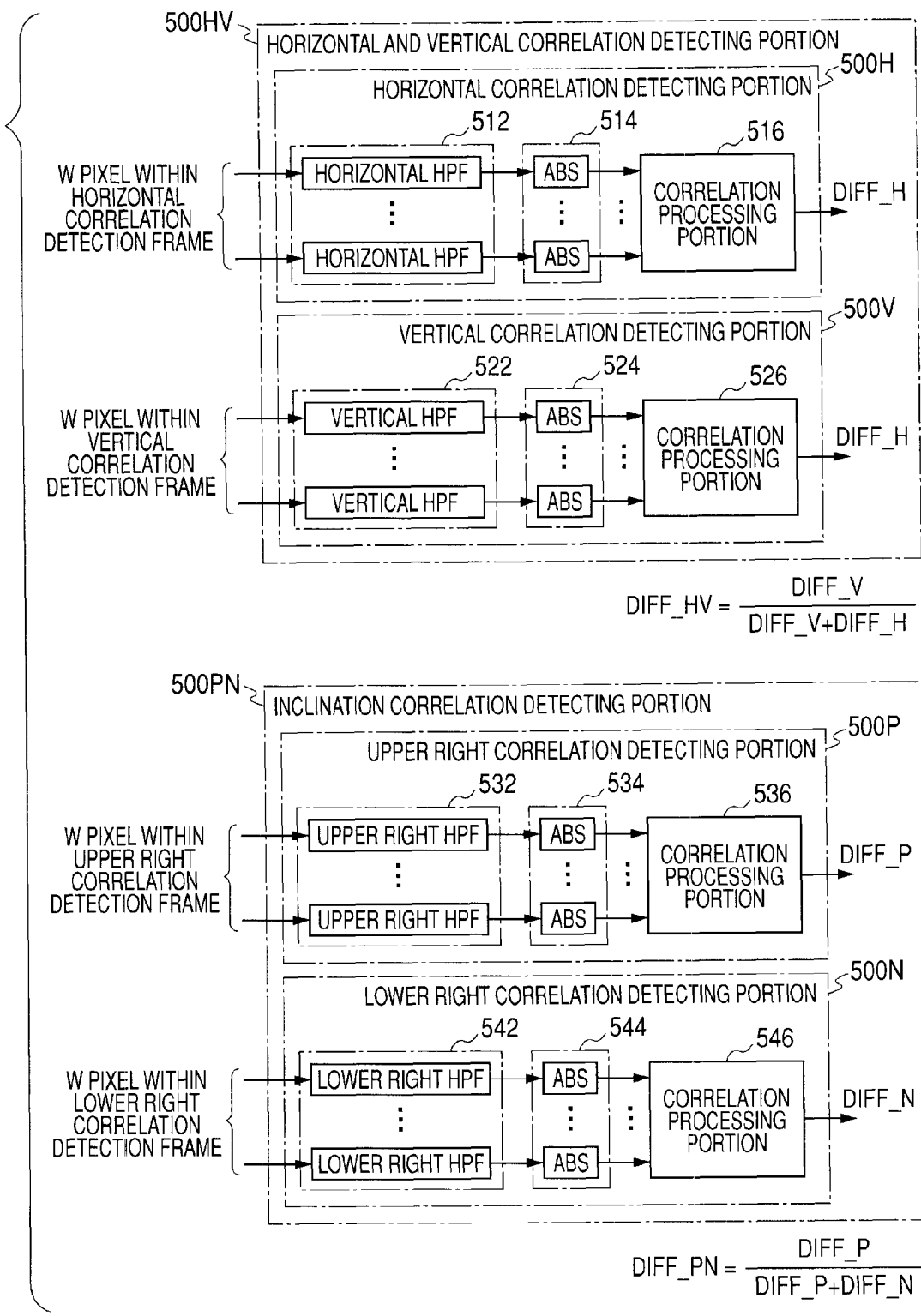
FIG. 21 is a view illustrating an example of a detailed configuration of a correlation detecting portion.
Figure 22A:
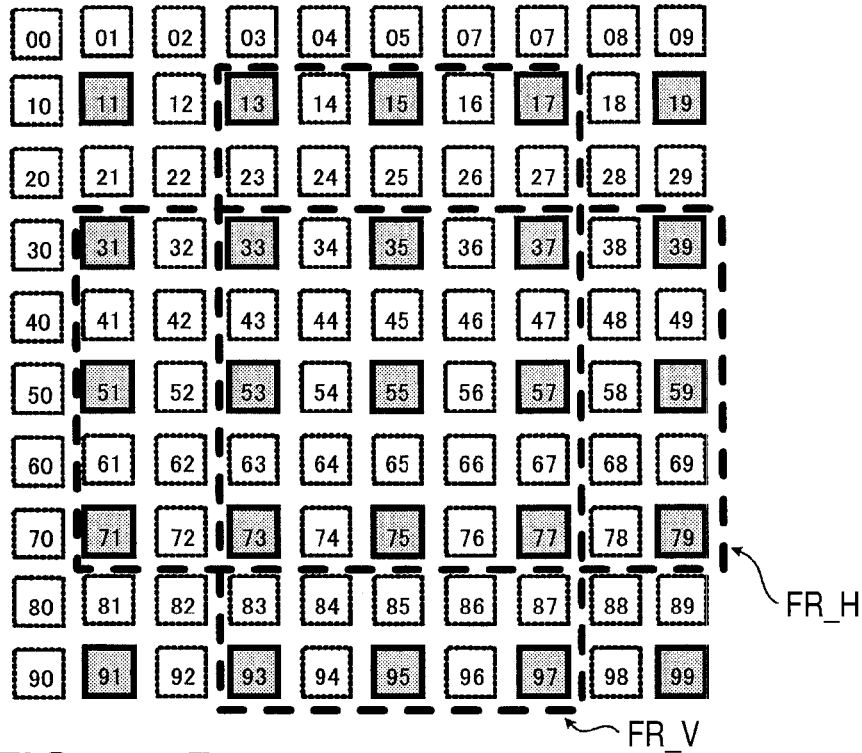
FIGS. 22A and 22B are views illustrating correlation detection frames set when correlation coefficients are calculated.
Figure 22B:
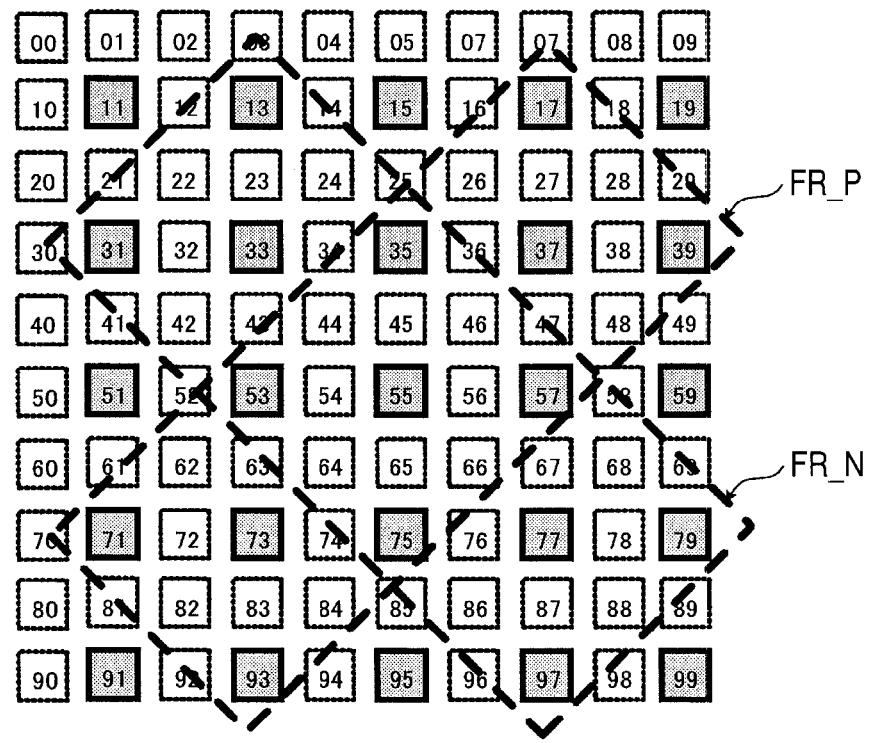

FIGS. 21 and 22 views explaining details of the correlation detecting portion 500. Here, FIG. 21 is a view illustrating an example of a detailed configuration of the correlation detecting portion 500. FIGS. 22A and 22B are views illustrating a correlation detection frame set when each correlation coefficient is calculated on the basis of the high-sensitivity mosaic image W.

As an example of color filter coding, it is preferable that a rate of the wide wavelength region pixel 12A having a function of a high-sensitivity pixel be highest in a repetition unit of a filter arrangement. For example, the square matrix arrangement shown in FIG. 2B may be used. In addition, a high-sensitivity zigzag arrangement, such as the inclined matrix arrangement shown in FIG. 2C, may also be used. Hereinafter, an example of the inclined matrix arrangement shown in FIG. 2C will be described. In this case, a state of a square arrangement where a repetition unit of a filter arrangement is configured to include five kinds of pixels of 'RGBW+blank' is acquired by square arrangement processing for embedding a blank pixel in the arrangement shown in FIG. 12A (same as FIG. 2C).

As shown in FIG. 21, the horizontal and vertical correlation detecting portion 500HV includes a horizontal correlation detecting portion 500H, which detects a horizontal correlation coefficient DIFF_H of the high-sensitivity mosaic image W, and a vertical correlation detecting portion 500V, which detects a vertical correlation coefficient DIFF_V of the high-sensitivity mosaic image W. The inclination correlation detecting portion 500PN includes an upper right correlation detecting portion 500P, which detects a correlation coefficient DIFF_P of the high-sensitivity mosaic image W in the rightward ascending direction thereof, and a lower right correlation detecting portion 500N, which detects a correlation coefficient DIFF_N of the high-sensitivity mosaic image W in the rightward descending direction thereof.

The horizontal correlation detecting portion 500H includes: a horizontal high pass filtering portion (herein after, referred to as a horizontal HPF) 512 which is provided for each row, sets a detection frame (referred to as a horizontal correlation detection frame FR_H) having a predetermined size in the horizontal direction of the high-sensitivity mosaic image W as shown in FIG. 22A, and extracts horizontal-direction high frequency components in each row within the horizontal correlation detection frame FR_H; an absolute value processing portion (described as an ABS in the drawing) 514 which is provided for each row and acquires an absolute value of an output of each horizontal HPF 512; and a correlation processing portion 516 which calculates a correlation coefficient (referred to as a horizontal correlation coefficient) DIFF_H of the high-sensitivity pixel W within the horizontal correlation detection frame FR_H on the basis of a processing result of each row.

The vertical correlation detecting portion 500V includes: a vertical high pass filtering portion (herein after, referred to as a vertical HPF) 522 which is provided for each column, sets a detection frame (referred to as a vertical correlation detection frame FR_V) having a predetermined size in the vertical direction of the high-sensitivity mosaic image W as shown in FIG. 22A, and extracts vertical-direction high frequency components in each column within the vertical correlation detection frame FR_V; an absolute value processing portion (described as an ABS in the drawing) 524 which is provided for each column and acquires an absolute value of an output of each vertical HPF 522; and a correlation processing portion 526 which calculates a correlation coefficient (referred to as a vertical correlation coefficient) DIFF_V of the high-sensitivity pixel W within the vertical correlation detection frame FR_V on the basis of a processing result of each column.

The upper right correlation detecting portion 500P includes: a high pass filtering portion (herein after, referred to as an upper right HPF) 532 which is provided for each direction, sets a detection frame (referred to as an upper right (P direction) correlation detection frame FR_P) having a predetermined size in the rightward ascending direction of the high-sensitivity mosaic image W as shown in FIG. 22B, and extracts high-frequency components in the corresponding direction within the upper right correlation detection frame FR_P; an absolute value processing portion (described as an ABS in the drawing) 534 which is provided for each direction and acquires an absolute value of an output of each upper right HPF; and a correlation processing portion 536 which calculates a correlation coefficient (referred to as an upper right correlation coefficient) DIFF_P of the high-sensitivity pixel W within the upper right correlation detection frame FR_P on the basis of a processing result of each direction.

The lower right correlation detecting portion 500N includes: a high pass filtering portion (herein after, referred to as a lower right HPF) 542 which is provided for each direction, sets a detection frame (referred to as a lower right (N direction) correlation detection frame FR_N) having a predetermined size in the rightward descending direction of the high-sensitivity mosaic image W as shown in FIG. 22B, and extracts high-frequency components in each direction within the lower right correlation detection frame FR_N; an absolute value processing portion (described as an ABS in the drawing) 544 which is provided for each direction and acquires an absolute value of an output of each a lower right HPF 542; and a correlation processing portion 546 which calculates a correlation coefficient (referred to as a lower right correlation coefficient) DIFF_N of the high-sensitivity pixel W within the lower right correlation detection frame FR_N on the basis of a processing result of each direction.

Each of the high pass filtering portions (HPFs 512, 522, 532, and 542) includes a filter having a high-frequency pass characteristic, such as (−1, 2, −1). The correlation processing portions 516, 526, 536, and 546 calculate the correlation coefficients DIFF_H, DIFF_V, DIFF_P, and DIFF_N corresponding to the respective directions by performing an integrating operation of absolute values of HPFs obtained in the absolute value processing portions 514, 524, 534, and 544.

The horizontal and vertical correlation detecting portion 500HV calculates the horizontal and vertical correlation coefficient DIFF_HV (=DIFF_V/(DIFF_V+DIFF_H)) by acquiring a ratio of a sum of the horizontal correlation coefficient DIFF_H, which is obtained in the correlation processing portion 516, and the vertical correlation coefficient DIFF_V, which is obtained in the correlation processing portion 526, to the vertical correlation coefficient DIFF_V. For example, in the case of an image pattern having a strong correlation in the vertical direction like a straight line extending in the vertical direction, the horizontal correlation coefficient DIFF_H is increased because an edge is detected by the horizontal HPF 512, while the vertical correlation coefficient DIFF_V is close to '0' because most signals are not detected in the vertical HPF 522. In contrast, in the case of an image pattern having a strong correlation in the horizontal direction like a straight line extending in the horizontal direction, the vertical correlation coefficient DIFF_V is increased because an edge is detected by the vertical HPF 522, while the horizontal correlation coefficient DIFF_H is close to '0' because most signals are not detected in the horizontal HPF 512. Therefore, as can be estimated from the above expression, a correlation in the vertical direction is stronger as a value of DIFF_HV is closer to '0', while a correlation in the horizontal direction is stronger as the value of DIFF_HV is closer to '1'.

Similarly, the inclination correlation detecting portion 500PN calculates the inclination correlation coefficient DIFF_PN (=DIFF_P/(DIFF_P+DIFF_N)) by acquiring a ratio of a sum of the upper right correlation coefficient DIFF_P, which is obtained in the correlation processing portion 536, and the lower right correlation coefficient DIFF_N, which is obtained in the correlation processing portion 546, to the upper right correlation coefficient DIFF_P. For example, in the case of an image pattern having a strong correlation in the N direction like a straight line extending in a rightward descending direction, the upper right correlation coefficient DIFF_P is increased because an edge is detected by the upper right HPF 532, while the lower right correlation coefficient DIFF_N is close to '0' because most signals are not detected in the lower right HPF 542. In contrast, in the case of an image pattern having a strong correlation in the P direction like a straight line extending in a rightward ascending direction, the lower right correlation coefficient DIFF_N is increased because an edge is detected by the lower right HPF 542, while the upper right correlation coefficient DIFF_P is close to '0' because most signals are not detected in the upper right HPF 532. As can be estimated from the above expression, a correlation in the rightward ascending direction (P direction) is stronger as a value of DIFF_PN is closer to '0', while a correlation in the rightward descending direction is stronger as the value of DIFF_PN is closer to '1'.

<Interpolation Processing: High-Sensitivity Luminance Signal>

Figure 23:
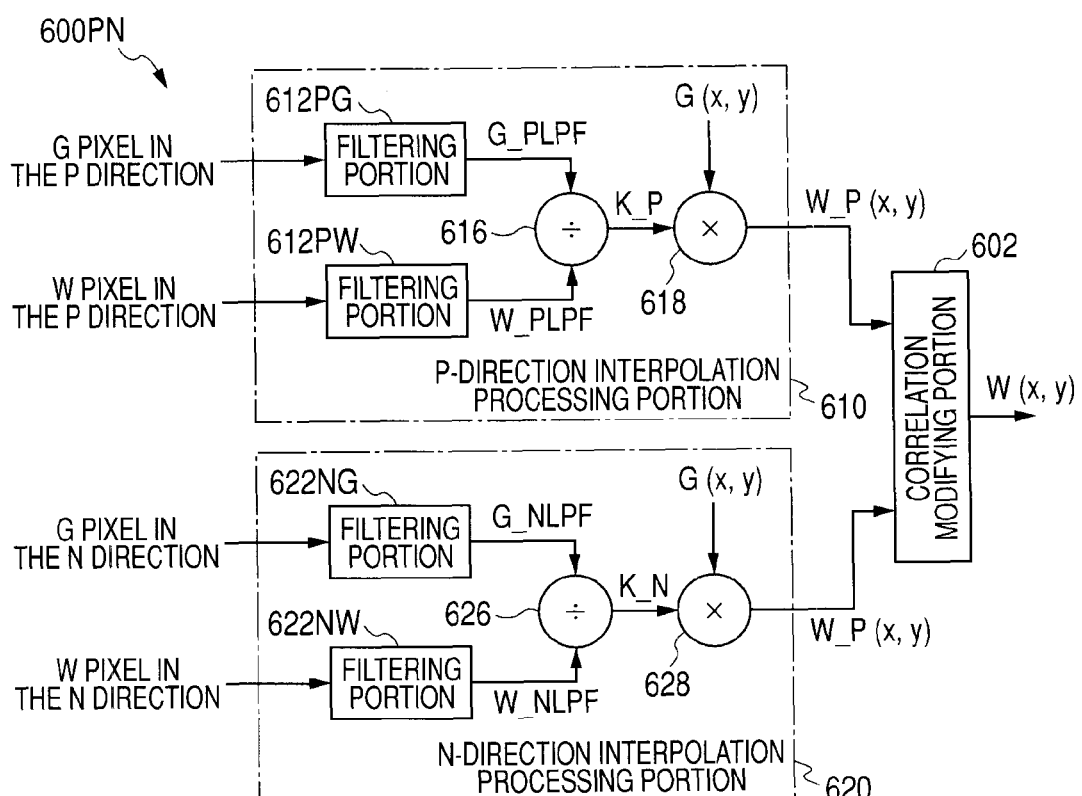
FIG. 23 is a view illustrating an example of a detailed configuration of an interpolation processing portion for high sensitivity luminance signals.
Figure 24A:
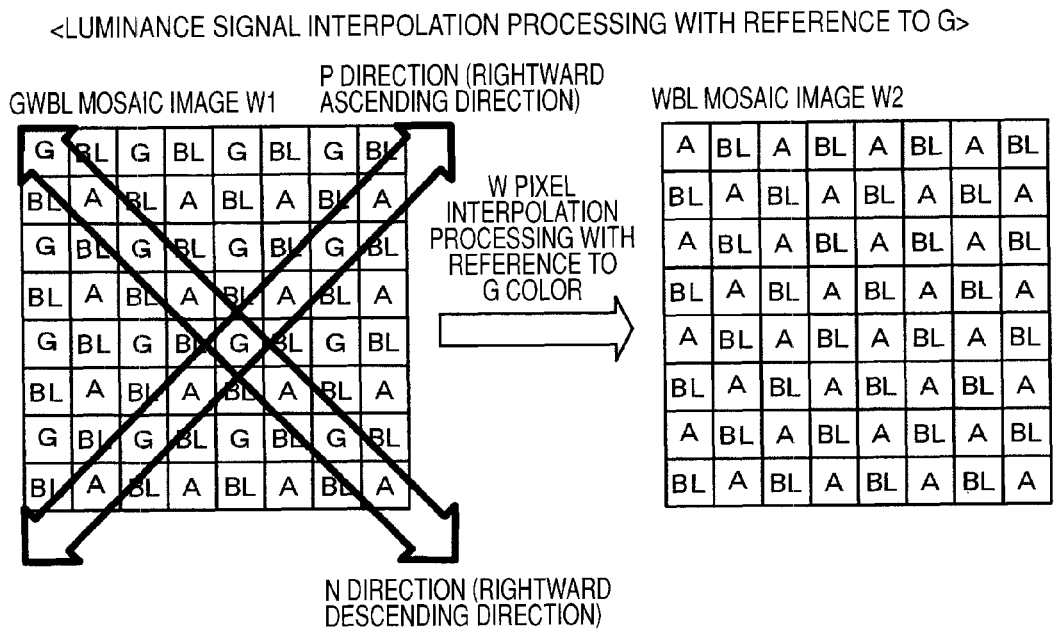
FIGS. 24A and 24B are views illustrating an algorithm of interpolation processing for high sensitivity luminance signals.
Figure 24B:
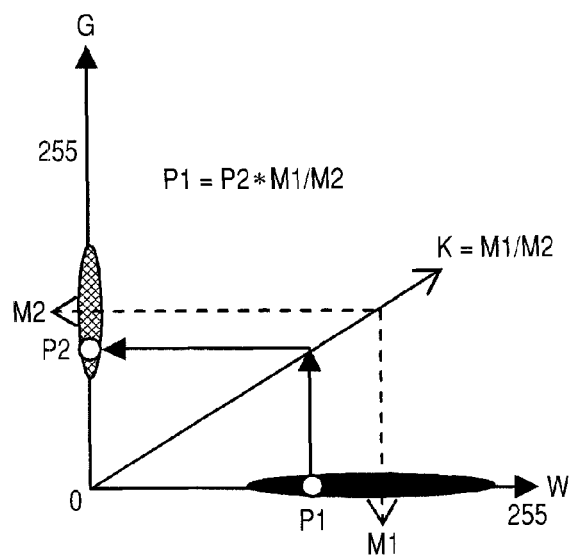

FIGS. 23, 24A, and 24B are views illustrating details of the interpolation processing portion 412 (422G, 422R, and 422B) for high-sensitivity luminance signals. Here, FIG. 23 is a view illustrating an example of a detailed configuration of the interpolation processing portion 412 for high-sensitivity luminance signals. FIGS. 24A and 24B are views explaining an algorithm of interpolation processing for high-sensitivity luminance signals and illustrate a case in which the high-sensitivity demosaic image W is generated referring to the mosaic image G including only a G color.

Here, an example of the inclined matrix arrangement shown in FIG. 2C will be described as an example of color filter coding. In this case, as shown in FIG. 3, a state of a square arrangement where a repetition unit of a filter arrangement is configured to include five kinds of pixels of 'RGBW+blank' is acquired by square arrangement processing for embedding a blank pixel in the inclined matrix arrangement shown in FIG. 2C.

As shown in FIG. 23, the interpolation processing portion 412 for high-sensitivity luminance signals includes: a first interpolation processing portion 462 that acquires a GWBL mosaic image, in which three kinds of pixels of 'GW+blank' are coded, by converting pixels corresponding to R and B colors into pixels corresponding to a G color for a mosaic image in which five kinds of pixels of 'RGBW+blank' are coded; and a second interpolation processing portion 464 that acquires a WBL mosaic image, in which two kinds of pixels of 'W+blank' are coded, for a GWBL mosaic image acquired in the first interpolation processing portion 462. Each of the interpolation processing portions 462 and 464 has a filtering portion which performs filtering.

In interpolation processing in the first interpolation processing portion 462, paying attention to the G color, pixel values of R and B pixels where a color filter corresponding to the color G under attention is not arranged are subjected to color interpolation processing by using a pixel value of a G pixel, which is a nearby effective pixel where the R and B pixels are arranged. Since this interpolation processing is known processing, a detailed explanation thereof will be omitted.

On the other hand, in the case of interpolation processing in the second interpolation processing portion 464, when a G pixel is converted into a W pixel by the interpolation processing, color interpolation processing for a pixel value of a G pixel where the W pixel is not arranged is performed paying attention to the W pixel by using correlation of respective pixel signals using pixel values of W pixels and G pixels, which are effective pixels near the W pixel under attention, regardless of a color. That is, as for the W pixel, information on the G pixel that is not actually present is interpolated by using correlation of the same color (W) and another color (G) near the W pixel position. At this time, in the present embodiment, modification is performed referring to the inclination correlation coefficient DIFF_PN obtained in the correlation detecting portion 500. Although not shown, a second interpolation processing portion that acquires the high-sensitivity mosaic image W in which all pixels are W pixels, with respect to the WBL mosaic image acquired in the second interpolation processing portion 464 is provided at a stage subsequent to the second interpolation processing portion 464. In the second interpolation processing portion, modification is performed referring to the horizontal and vertical correlation coefficient DIFF_HV obtained in the correlation detecting portion 500.

The second interpolation processing portion 464 (not shown) includes a PN-direction interpolation processing portion 600PN which performs interpolation processing in the direction inclined with respect to the G pixel under attention. The PN-direction interpolation processing portion 600PN includes: a P-direction interpolation processing portion 610 which performs interpolation processing in the rightward ascending direction (P direction; refer to FIG. 24A) with respect to the G pixel under attention; and an N-direction interpolation processing portion 620 which performs interpolation processing in the rightward descending direction (N direction; refer to FIG. 24A) with respect to the G pixel under attention.

In addition, although not shown, in order to realize the configuration in which interpolation processing is performed in the horizontal and vertical directions with respect to the G pixel under attention, there is provided a horizontal and vertical interpolation processing portion including: a horizontal direction interpolation processing portion which performs interpolation processing in the horizontal direction (not shown) with respect to the G pixel under attention; and a vertical direction interpolation processing portion which performs interpolation processing in the vertical direction (not shown) with respect to the G pixel under attention. Since directions of objects to be processed or pixel positions are only different, the configuration based on the PN-direction interpolation processing portion 600PN is preferably adopted.

The P-direction interpolation processing portion 610 includes: a filtering portion 612PG which performs low pass filtering processing on the G pixel in the P direction; a filtering portion 612PW which performs low pass filtering processing on the W pixel in the P direction; a proportional processing portion 616 which performs proportional processing on each output of the filtering portions 612PG and 612PW; and an integration processing portion 618 which performs integration of an output K_P of the proportional processing portion 616 and a signal G(x, y) of a G pixel of a pixel position (x, y) under attention.

The N-direction interpolation processing portion 620 includes: a filtering portion 622NG which performs low pass filtering processing on the G pixel in the N direction; a filtering portion 622NW which performs low pass filtering processing on the W pixel in the N direction; a proportional processing portion 626 which performs proportional processing on each output of the filtering portions 622NG and 622NW; and an integration processing portion 628 which performs integration of an output K_N of the proportional processing portion 626 and a signal G(x, y) of a G pixel of a pixel position (x, y) under attention.

In addition, the PN-direction interpolation processing portion 600PN includes a correlation modifying portion 602 provided at a stage subsequent to the integration processing portion 618 and the integration processing portion 628. The correlation modifying portion 602 performs a modification operation (here, referred to as integration) on interpolations output W_P and W_N in the P and N directions by referring to the inclination correlation coefficient DIFF_PN, which is obtained in the correlation detecting portion 500, in the same direction as directions of interpolation processing in the P-direction interpolation processing portion 610 and the N-direction interpolation processing portion 620.

Interpolation processing of a W pixel in the P direction will be representatively described with reference to FIG. 24B. As shown in FIG. 24B, it is known that G pixels are in charge of most of luminance information in a visible light region. On the other hand, the W pixel has high sensitivity because wavelength components of R, G, and B are included. Accordingly, a signal level of the W pixel is higher than that of the G pixel, and there is opposite relationship between information of the W pixel and information of the G pixel. For example, assuming that a signal level of a G pixel is M2 and a signal level of a W pixel corresponding thereto is M1, a relative gain K is K=M1/M2. A signal level P1 of a W pixel corresponding to an arbitrary signal level P2 of a G pixel can be expressed as P1=P2*K=P2*M1/M2 using the relative gain K.

Using the above, a relative gain K_P (=W_PLPF/G_PLPF) in the P direction is obtained by calculating a ratio of an output W_PLPF of the filtering portion 612PW to an output G_PLPF of the filtering portion 612PG in the proportional processing portion 616, and a signal value W_P(x, y) of a W pixel corresponding to G(x, y) is obtained by performing integration of the relative gain K_P and the signal G(x, y) in the integration processing portion 618. Similarly, relative gain K_N (=W_NLPF/G_NLPF) in the N direction is obtained by calculating a ratio of an output W_NLPF of the filtering portion 622NW to an output G_NLPF of the filtering portion 622NG in the proportional processing portion 626, and a signal value W_N(x, y) of a W pixel corresponding to G(x, y) is obtained by performing integration of the relative gain K_N and the signal G(x, y) in the integration processing portion 628.

Thereafter, pixel data W(x, y) in which inclination correlation is considered is calculated on the basis of W(x, y)=DIFF_PN*W_N(x, y)+(1−DIFF_PN)*W_P(x, y).

<Interpolation Processing: Color Signal not having High Sensitivity>

FIGS. 25A, 25B, 26A, and 26B are views illustrating details of the interpolation processing portion 422 (422G, 422R, and 422B) for color signals. Here, FIGS. 25A and 25B are views illustrating an example of a detailed configuration of the interpolation processing portion 422 for color signals G, R, and B. FIGS. 26A and 26B are views explaining an algorithm of interpolation processing for color signals G, R, and B and illustrates a case in which a demosaic image R is generated from a red mosaic image R. As an example of color filter coding, coding of high-sensitivity zigzag arrangement is preferable. Hereinafter, a square matrix arrangement shown in FIG. 2B will be described as an example.

As shown in FIG. 25A, the interpolation processing portion 422 includes a PN-direction interpolation processing portion 604PN which performs interpolation processing in the direction inclined with respect to the color pixels G, R, and B (R in the drawing) under attention. In a first configuration example of the interpolation processing portion 422 for color signals, the PN-direction interpolation processing portion 604PN includes: a differential processing portion 472 which acquires difference data D (=W−G, R, B: ',' means any one of G, R, and B) between pixel data W of a high-sensitivity demosaic image W (Wadj), which is acquired by interpolation processing in the luminance signal generating portion 410, and pixel data G, R, and B of mosaic images (any one of the G, R, and B), which correspond to colors to be processed, for a pixel under attention and nearby pixels; and a filtering portion 476 which performs filtering processing on the difference information generated in the differential processing portion 472 referring to the horizontal and vertical correlation coefficient DIFF_HV and the inclination correlation coefficient DIFF_PN acquired in the correlation detecting portion 500.

On the other hand, as shown in FIG. 25B, in a second configuration example of the interpolation processing portion 422 for color signals, the PN-direction interpolation processing portion 604PN includes: a proportional processing portion 474 which acquires proportional data M (=G, R, B/W: ',' means any one of G, R, and B) between the pixel data W of the high-sensitivity demosaic image W (Wadj), which is acquired by interpolation processing in the luminance signal generating portion 410, and the pixel data G, R, and B of mosaic images (any one of the G, R, and B), which correspond to colors to be processed, for a pixel under attention and nearby pixels; and a filtering portion 476 which performs filtering processing on the proportional information generated in the proportional processing portion 474 referring to the horizontal and vertical correlation coefficient DIFF_HV and the inclination correlation coefficient DIFF_PN acquired in the correlation detecting portion 500.

In the differential processing portion 472 and the proportional processing portion 474, on the basis of pixel data at the position of a color pixel that is actually present, pixel data at the position that is not actually present is interpolated by referring to pixel data of the same position as the high-sensitivity pixel Wadj after interpolation. In this case, various kinds of methods may be used as the processing procedures. For example, in the case of a square matrix arrangement shown in FIG. 2B, first, two color pixels actually present in the inclined direction are set as near pixels and a pixel corresponding to another color, which is present at the position interposed in the near by pixels, is set to a pixel under attention, and interpolation is performed on the basis of color pixel data of the two nearby pixels that are actually present by referring to pixel data at the same position as the high-sensitivity pixel Wadj after interpolation. For example, as shown in FIGS. 26A and 26B, in the case of color coding in a square arrangement, pixel data at the positions 0 and 2 of R pixels that are actually present and the position 1 (G pixel in this example) which is not present and is located between the positions 0 and 2 is set as objects to be processed. In addition, the differential processing portion 472 calculates difference data D_0, D_1, and D_2 between pixel data R_0, R_1, and R_2 at the respective pixel positions and pixel data W_0, W_1 and W_2 at the same positions in the high-sensitivity demosaic image Wadj after interpolation.

Here, since R pixels are present at the positions 0 and 2, the difference data D_0, D_1, and D_2 is obtained as D_0=W_0−R_0 and D_2=W_2−R_2. However, since an R pixel is not present at the position 1, the proper difference data D_1 is not calculated in this condition. For this reason, the filtering portion 476 calculates the difference data D_1 using an average (D_1=(D_0+D_2)/2) of the difference data D_0 and D_2. In addition, the filtering portion 476 calculates the R pixel data R_1 at the position 1 from 'R_1=W_1−D_1' since D_1=W_1−R_1.

In addition, although the filtering portion 476 calculates data (R1 in the previous example) of a color pixel, which is not present, using an average operation, the filtering portion 476 properly adjusts a coefficient of a filter and the number of taps of a filter according to the pixel position, which is actually present in the neighborhood, referred to calculate data of a color pixel that is not present.

On the other hand, the proportional processing portion 474 calculates proportional data M_0, M_1, and M_2 between pixel data R_0, R_1, and R_2 at the respective pixel positions and pixel data W_0, W_1 and W_2 at the same positions in the high-sensitivity demosaic image Wadj after interpolation.

Here, since R pixels are present at the positions 0 and 2, the proportional data M_0, M_1, and M_2 is obtained as M_0=R_0/W_0 and M_2=R_2/W_2. However, since an R pixel is not present at the position 1, the proper proportional data M_1 is not calculated in this condition. For this reason, the filtering portion 476 calculates the proportional data M_1 using an average (M_1=(M_0+M_2)/2) of the proportional data M_0 and M_2. In addition, the filtering portion 476 calculates the pixel data R_1 at the position 1 from 'M_1*W_1' since M_1=R_1/W_1.

In addition, although not shown, in order to realize the configuration in which interpolation processing is performed in the horizontal and vertical directions with respect to color pixels G, R, and B under attention, there is provided a horizontal and vertical direction interpolation processing portion including: a horizontal direction interpolation processing portion which performs interpolation processing in the horizontal direction with respect to the color pixels G, R, and B under attention; and a vertical direction interpolation processing portion which performs interpolation processing in the vertical direction with respect to the color pixels G, R, and B under attention. Since directions of objects to be processed or pixel positions are only different, the configuration based on the PN-direction interpolation processing portion 604PN is preferably adopted.

In addition, as for pixel data obtained in the differential processing portion 472 or the proportional processing portion 474, the filtering portion 476 applies a weight to a filter in the same direction (horizontal and vertical directions or inclined direction) as the interpolation processing in accordance with the intensity of correlation by referring to one of the horizontal and vertical correlation coefficient DIFF_HV and the inclination correlation coefficient DIFF_PN, which corresponds to the same direction as the interpolation processing, supplied from the correlation detecting portion 500, thereby calculating final pixel data (R2 in this example) passed to the color signal generating portion 430.

For example, in the case of interpolation processing in the inclined direction like the previous example, assuming that an upper right correlation coefficient is DIFF_P and a lower right correlation coefficient is DIFF_N, the inclination correlation coefficient DIFF_PN is DIFF_PN=DIFF_P/(DIFF_P+DIFF_N). A correlation in the rightward ascending direction is stronger as a value of DIFF_PN is closer to '0', while a correlation in the rightward descending direction is stronger as the value of DIFF_PN is closer to '1'. Taking this point into consideration, for example, in the case that pixel data R after filtering processing in the rightward ascending direction (P direction) and the rightward descending direction (N direction) is assumed to be R_P and R_N, respectively, pixel data R in which an inclination correlation is considered is calculated by R=(1−DIFF_PN)*R_P+DIFF_PN*R_N. The interpolation processing portion 422 performs correlation correction regarding the horizontal and vertical directions and inclined direction and passes pixel data R2, for which interpolation processing has been completed, to the color signal generating portion 430.

This is the same as for the horizontal and vertical directions. Assuming that a horizontal correlation coefficient is DIFF_H and a vertical correlation coefficient is DIFF_V, the horizontal and vertical correlation coefficient DIFF_HV is DIFF_HV=DIFF_V/(DIFF_H+DIFF_V). A vertical correlation is stronger as a value of DIFF_HV is closer to '0', while a horizontal correlation is stronger as the value of DIFF_HV is closer to '1'. Taking this point into consideration, for example, in the case that pixel data R after filtering processing in the horizontal and vertical directions is assumed to be R_H and R_V, respectively, pixel data R in which the horizontal and vertical correlation is considered is calculated by R=(1−DIFF_HV)*R_V+DIFF_HV*R_H.

Thus, in the interpolation processing portion 422 in the present embodiment, color pixel data that is not actually present is calculated by pixel interpolation processing of the differential processing portion 472 or the proportional processing portion 474 by using information on the high-sensitivity demosaic image W. Accordingly, the S/N ratio of the demosaic image G, R, and B not having high sensitivity can be raised. Moreover, in the filtering portion 476, correlation correction in each direction is performed with reference to correlation coefficients in the horizontal and vertical and inclined directions calculated in the correlation detecting portion 500. Accordingly, an effect of suppressing a false color generated due to a pixel phase difference is obtained.

By such interpolation processing, as shown in FIG. G31, first, a demosaic image W2 shown in FIG. G31(B1) is obtained from a mosaic image W shown in FIG. G31(A1) by means of the second interpolation processing portion 412_2 based on a luminance signal system. In addition, a demosaic image G2 shown in FIG. G31 (B2) is obtained from a mosaic image G shown in FIG. G31(A2) by means of the interpolation processing portion 422G. In addition, a demosaic image R2 shown in FIG. G31(B3) is obtained from a mosaic image R shown in FIG. G31(A3) by means of the interpolation processing portion 422R. In addition, a demosaic image B2 shown in FIG. G31(B4) is obtained from a mosaic image B shown in FIG. G31(A4) by means of the interpolation processing portion 422B.

A signal expressing the demosaic image W2 becomes a signal indicating 'W=Y+IR'. Accordingly, since the signal W includes components in regions from a visible light region to an infrared light region, light components in a wider wavelength range are included. In addition, even in the visible light region, a high-sensitivity (about twice in an example of a sensitivity characteristic shown in FIG. 8) demosaic image W2 is output for the G component.

On the other hand, the demosaic images G2, R2, and B2 corresponding to RGB generated in the interpolation processing portions 422G, 422R, and 422B provided in the monochrome image signal generating portion 420, that is, the demosaic images G2, R2, and B2 shown in FIGS. G31(B2) to G31(B4) are input to the color signal generating portion 430, and gain adjustment related to the high-sensitivity demosaic image W is performed in the level adjusting portion 432. Then, color difference signals R-Y and B-Y are generated to be output by a matrix operation based on signals, which express the demosaic images G2, R2, and B2 after level adjustment, in the matrix operation portion 434.

In addition, the color signal generating portion 430 may also be configured to generate a color difference signal by using the demosaic image W2 obtained in the luminance signal generating portion 410. In this case, although a detailed explanation is omitted, it may also be configured to perform a high-sensitivity correction operation on the demosaic images G2, R2, and B2 and then to generate a color difference signal by using the demosaic images G2, R2, and B2 of the monochrome image signal generating portion 420, which can be obtained by detection after dividing a visible light region into a plurality of wavelength regions, and visible light (especially, components corresponding to respective colors) in the high-sensitivity demosaic image W2 obtained in the luminance signal generating portion 410.

By applying the imaging unit 310 including the color filter group 314 having a color arrangement of RGBW according to the present embodiment, it is possible to obtain a demosaic image W2 of a W channel including light components in a wide wavelength range including visible light and infrared light, and this can be used as a luminance signal 'W=Y+IR'.

Since an infrared light component is included in the luminance component, a pixel value of each pixel of a demosaic image corresponding to a W channel serves as data that reflects a level difference of infrared light components under the environment where the level difference of infrared light components is detected, even for image data photographed under low illuminance. As a result, it becomes possible to improve an S/N ratio of image data photographed in the environment where an illuminance is low. For example, this configuration is suitable for an application, such as a surveillance camera in which high color reproducibility is not requested but the sensitivity or the S/N ratio needs to be raised.

In addition, in the example of a sensitivity characteristic shown in FIG. 8, the infrared light cut-off filter 305 may be preferably added in the configuration shown in FIG. 10 in the case of a configuration in which infrared light is not used.

<Anti-Aliasing Processing>

FIGS. 27A, 27B, 28A, 28B, and 29 are views illustrating details of the anti-aliasing processing portions 424 (424G, 424R, and 424B) for color signals. Here, FIGS. 27A and 27B are views illustrating an example of a detailed configuration of the anti-aliasing processing portion 424 for color signals G, R, and B. FIGS. 28A and 28B are views explaining an algorithm of anti-aliasing processing for a color signal G and show a case where a green color is targeted. FIG. 29 is a view explaining an algorithm of anti-aliasing processing for color signals R and B and shows a case where a blue color is targeted as an example.

As shown in FIG. 27A, in a first configuration example of the anti-aliasing processing portions 424 for color signals, there is included: a differential processing portion 482 which acquires difference data DD for a pixel under attention by performing predetermined differential processing (different from differential processing in interpolation processing) between pixel data W of a high-sensitivity demosaic image W (Wadj), which is acquired by interpolation processing in the luminance signal generating portion 410, and pixel data G, R, and B of mosaic images (any one of the G, R, and B), which correspond to colors to be processed, for a pixel under attention and nearby pixels; and a filtering portion 486 which performs filtering processing on the difference data DD generated in the differential processing portion 482 referring to the horizontal and vertical correlation coefficient DIFF_HV and the inclined correlation coefficient DIFF_PN acquired in the correlation detecting portion 500.

First, the differential processing portion 482 acquires difference data D (=W−G, R, B: ',' means any one of G, R, and B) between pixel data W of a high-sensitivity demosaic image W (Wadj), which is acquired by interpolation processing in the luminance signal generating portion 410, and pixel data G, R, and B of mosaic images (any one of the G, R, and B), which correspond to colors to be processed, for a pixel under attention and nearby pixels. The high-sensitivity demosaic image W (Wadj) for reference may be the WBL mosaic image W2 in which two kinds of pixels of 'W+blank' are coded or the high-sensitivity demosaic image W3 configured to include only W pixels.

Then, the filtering portion 486 performs filtering processing on the difference data D to thereby obtain average data Dave. At this time, a weight of a pixel under attention is set to be larger than that of a nearby pixel. In addition, modified data DD (=W−Dave) of a pixel under attention is obtained by differential processing between the average data Dave and the pixel data W at the same pixel position (same position) as the pixel under attention.

On the other hand, as shown in FIG. 27B, in a second configuration example of the anti-aliasing processing portions 424 for color signals, there is included: a proportional processing portion 484 which acquires proportional data MM for a pixel under attention by performing predetermined proportional processing (different from proportional processing in interpolation processing) between the pixel data W of the high-sensitivity demosaic image W (Wadj), which is acquired by interpolation processing in the luminance signal generating portion 410, and the pixel data G, R, and B of mosaic images (any one of the G, R, and B), which correspond to colors to be processed, for a pixel under attention and nearby pixels; and a filtering portion 486 which performs filtering processing on the proportional data MM generated in the proportional processing portion 484 referring to the horizontal and vertical correlation coefficient DIFF_HV and the inclined correlation coefficient DIFF_PN acquired in the correlation detecting portion 500.

First, the proportional processing portion 484 acquires proportional data M (=G, R, B/W: ', ' means any one of G, R, and B) between the pixel data W of the high-sensitivity demosaic image W (Wadj), which is acquired by interpolation processing in the luminance signal generating portion 410, and the pixel data G, R, and B of mosaic images (any one of the G, R, and B), which correspond to colors to be processed, for a pixel under attention and near by pixels. Then, the filtering portion 486 performs filtering processing on the proportional data M to thereby obtain average data Mave. At this time, a weight of a pixel under attention is set to be larger than that of a nearby pixel. In addition, modified data MM (=W*Mave) of a pixel under attention is obtained by taking a product between the average data Mave and the pixel data W at the same pixel position (same position) as the pixel under attention.

<Anti-Aliasing Processing for G Color>

A specific example of anti-aliasing processing for G color will be described with reference to FIGS. 28A and 28B. As an example of color filter encoding, encoding of high-sensitivity zigzag arrangement is preferable. Hereinafter, a square matrix arrangement shown in FIG. 2B will be described as an example.

In the differential processing portion 482 and the proportional processing portion 484, pixel data of a pixel under attention is modified on the basis of pixel data at a plurality of positions (pixel under attention and nearby pixels) of color pixels that are actually present. In this case, various kinds of methods may be used as the processing procedures. For example, in the case of a square matrix arrangement shown in FIG. 2B, first, a pixel in the middle among three color pixels actually present in the horizontal direction is set as a pixel under attention and pixels adjacent to both sides of the pixel in the middle are set as nearby pixels, and pixel data of the pixel under attention is modified by referring to pixel data of the high-sensitivity pixel Wadj at the same position as each pixel.

For example, as shown in FIGS. 28A and 28B, in the case of color coding in a square arrangement, pixel data at the positions 0, 1, and 2 of three G pixels that are actually present are set as objects to be processed. In addition, a difference between a G pixel and a W pixel in the horizontal direction is calculated in the differential processing portion 482, and the G pixel is modified by using a difference average in the horizontal direction in the filtering portion 486. Similarly, although not shown, a difference between the G pixel and the W pixel in the vertical direction is calculated in the differential processing portion 482, and the G pixel is modified by using a difference average in the vertical direction in the filtering portion 486.

Specifically, the differential processing portion 482 calculates difference data D_0, D_1, and D_2 between pixel data G_0, G_1, and G_2 at the respective pixel positions and pixel data W_0, W_1 and W_2 at the same positions in the high-sensitivity demosaic image Wadj after interpolation. In anti-aliasing processing, color pixels are present at all of the positions 0, 1, and 2. Accordingly, the difference data D_0, D_1, and D_2 are calculated as D_0=W_0−G_0, D_1=W_2−G_2, and D_2=W_2−G_2.

The filtering portion 486 calculates average data Dave (=(D_0+2*D_1+D_2)/4) by performing filtering processing on the difference data D_0, D_1, and D_2 calculated in the differential processing portion 482 such that a weight of a pixel under attention is set to be larger than that of a nearby pixel. In addition, the filtering portion 486 calculates modified data DD (=W_1−Dave) of the G pixel G_1 under attention by differential processing between the average data Dave and the pixel data W_1 at the same pixel position (same position) as the pixel under attention.

Furthermore, the proportional processing portion 484 calculates proportional data M_0, M_1, and M_2 between pixel data G_0, G_1, and G_2 at the respective pixel positions and pixel data W_0, W_1 and W_2 at the same positions in the high-sensitivity demosaic image Wadj after interpolation. In anti-aliasing processing, color pixels are present at all of the positions 0, 1, and 2. Accordingly, the proportional data M_0, M_1, and M_2 are calculated as M_0=W_0−G_0, M_1=W_2−G_2, and M_2=W_2−G_2.

The filtering portion 486 calculates average data Mave (=(M_0+2*M_1+M_2)/4) by performing filtering processing on the proportional data M_0, M_1, and M_2 calculated in the proportional processing portion 484 such that a weight of a pixel under attention is set to be larger than that of a nearby pixel. In addition, the filtering portion 486 calculates modified data MM (=W_1*Mave) of a pixel under attention by taking a product between the average data Mave and the pixel data W_1 at the same pixel position (same position) as the pixel under attention.

In addition, the filtering portion 486 applies a weight to a filter in the same direction as the anti-aliasing processing in accordance with the intensity of correlation by referring to the horizontal and vertical correlation coefficient DIFF_HV and the inclined correlation coefficient DIFF_PN supplied from the correlation detecting portion 500, thereby calculating final pixel data (G2 in this example) passed to the color signal generating portion 430.

For example, in the previous example in which the direction of the anti-aliasing processing is horizontal and vertical directions, assuming that a horizontal correlation coefficient is DIFF_H and a vertical correlation coefficient is DIFF_V, the horizontal and vertical correlation coefficient DIFF_HV is DIFF_HV=DIFF_V/(DIFF_H+DIFF_V). A vertical correlation is stronger as a value of DIFF_HV is closer to '0', while a horizontal correlation is stronger as the value of DIFF_HV is closer to '1'. Taking this point into consideration, for example, in the case that average data Dave after filtering processing in the horizontal and vertical directions is assumed to be Dave_H and Dave_V, respectively, and modified data DD at the position 1 in which horizontal and vertical correlation is considered is Gadj_1, Gadj_1 can be calculated as Gadj_1=(1−DIFF_HV)*Dave_V+DIFF_HV*Dave_H. Then, by performing anti-aliasing processing on the original pixel data G_1 at the position 1, generation of a false color can be suppressed.

Although not shown, the same is true for a case in which the direction of the anti-aliasing processing is an inclined direction. In this case, assuming that an upper right correlation coefficient is DIFF_P and a lower right correlation coefficient DIFF_N, the inclined correlation coefficient DIFF_PN is DIFF_PN=DIFF_P/(DIFF_P+DIFF_N). A correlation in the rightward ascending direction is stronger as a value of DIFF_PN is closer to '0', while a correlation in the rightward descending direction is stronger as the value of DIFF_PN is closer to '1'. Taking this point into consideration, for example, when it is assumed that average data Dave after filtering processing in the rightward ascending direction (P direction) and the rightward descending direction (N direction) is Dave_P and Dave_N, respectively, and modified data MM at the position 1 in which inclined correlation is considered is Gadj_1, Gadj_1 can be calculated as Gadj_1=(1−DIFF_PN)*Dave_P+DIFF_PN*Dave_N. Then, anti-aliasing processing on the original pixel data G_1 at the position 1 can be performed.

<Anti-Aliasing Processing for R and B Colors>

A specific example of anti-aliasing processing for B and R colors will be described with reference to FIG. 29. As an example of color filter encoding, encoding of high-sensitivity zigzag arrangement is preferable. Hereinafter, an inclined matrix arrangement shown in FIG. 2C will be described as an example.

A basic method is the same as the above-described processing for G color. In the differential processing portion 482 and the proportional processing portion 484, pixel data of a B pixel (or R pixel) under attention is modified on the basis of pixel data at the plurality of positions (pixel under attention and nearby pixels) of the B pixel (or R pixel) that is actually present. In this case, various kinds of methods may be used as the processing procedures. For example, in the case of an inclined matrix arrangement shown in FIG. 2C, first, a pixel in the middle among three B pixels (or R pixels) present in the horizontal direction is set as a pixel under attention. Then, pixel data of the pixel under attention is modified by referring to pixel data of the high-sensitivity pixel Wadj at the same position as the three pixels between the B pixels (or R pixels) closest to both sides of the pixel in the middle. For example, as shown in FIG. 29, an explanation on processing in the differential processing portion 482 when a B color is used as a representative example is as follows.

A difference between a B pixel and a W pixel in the horizontal direction is obtained in the differential processing portion 482, and the B pixel is modified by using a difference average in the horizontal direction in the filtering portion 486. Similarly, a difference between the B pixel and the W pixel in the vertical direction is obtained in the differential processing portion 482, and the G pixel is modified by using a difference average in the vertical direction in the filtering portion 486.

Specifically, in the differential processing portion 482, a B pixel corresponding to a coordinate (x, y) is set as a pixel under attention and difference data $D\_H1=B(x-2, y)-W(x-2, y)$, $D\_H2=B(x, y)-W(x, y)$, and $D\_H3=B(x+2, y)-W(x+2, y)$ in the horizontal direction between pixel data $B(x-2, y)$, $B(x, y)$, and $B(x+2, y)$ at respective pixel positions and pixel data $W(x-2, y)$, $W(x, y)$, and $W(x+2, y)$ at the same positions in the mosaic image Wadj (WBL mosaic image W2) after interpolation is calculated. The filtering portion 486 modifies the B pixel on the basis of $B\_H=W(x, y)+(D\_H1+D\_H2+D\_H3)/3$ by using difference D_H1, D_H2, and D_H3 in the horizontal direction obtained by the differential processing portion 482.

The same is true for the vertical direction. In the differential processing portion 482, difference data $D\_V1=B(x, y-2)-W(x, y-2)$, $B(x, y)-W(x, y)$, and $B(x, y+2)-W(x, y+2)$ in the vertical direction between pixel data $B(x, y-2)$, $B(x, y)$, and $B(x, y+2)$ at respective pixel positions and pixel data $W(x, y-2)$, $W(x, y)$, and $W(x, y+2)$ at the same positions in the mosaic image Wadj (WBL mosaic image W2) after interpolation is calculated. The filtering portion 486 modifies the B pixel on the basis of $B\_V=W(x, y)+(D\_V1+D\_V2+D\_V3)/3$ by using difference D_V1, D_V2, and D_V3 in the vertical direction obtained by the differential processing portion 482.

In addition, finally, the filtering portion 486 can acquire data of B pixels after anti-aliasing processing on the basis of $B(x, y)=(1-DIFF\_HV)*B\_V+DIFF\_HV*B\_H$. Then, by performing anti-aliasing processing on original pixel data B(x, y) corresponding to a position coordinate (x, y), generation of a false color can be suppressed.

Thus, in the anti-aliasing processing portions 424 in the present embodiment, color pixel data of a pixel under attention can be acquired by pixel interpolation processing of the differential processing portion 482 or the proportional processing portion 484 by using information on the high-sensitivity demosaic image W. Accordingly, the S/N ratio of the demosaic image G, R, and B not having high sensitivity can be raised. Moreover, in the filtering portion 486, correlation correction in each direction is performed with reference to correlation coefficients in the horizontal and vertical and inclined directions calculated in the correlation detecting portion 500. Accordingly, an effect of suppressing a false color generated due to a pixel phase difference is also obtained in the anti-aliasing processing.

Figure 30A:
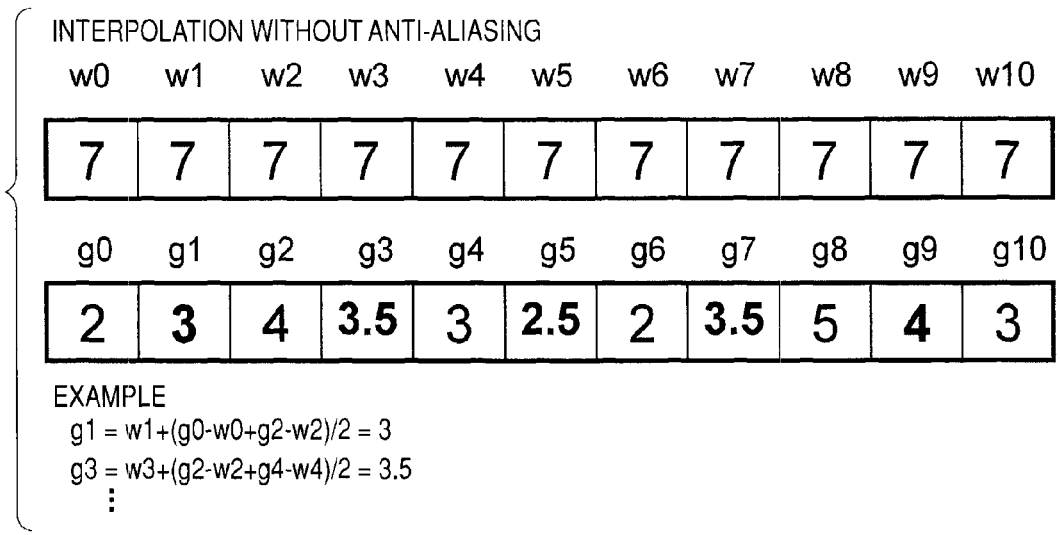
FIGS. 30A and 30B are views illustrating an anti-aliasing effect at the time of interpolation processing based on a color signal system.
Figure 30B:
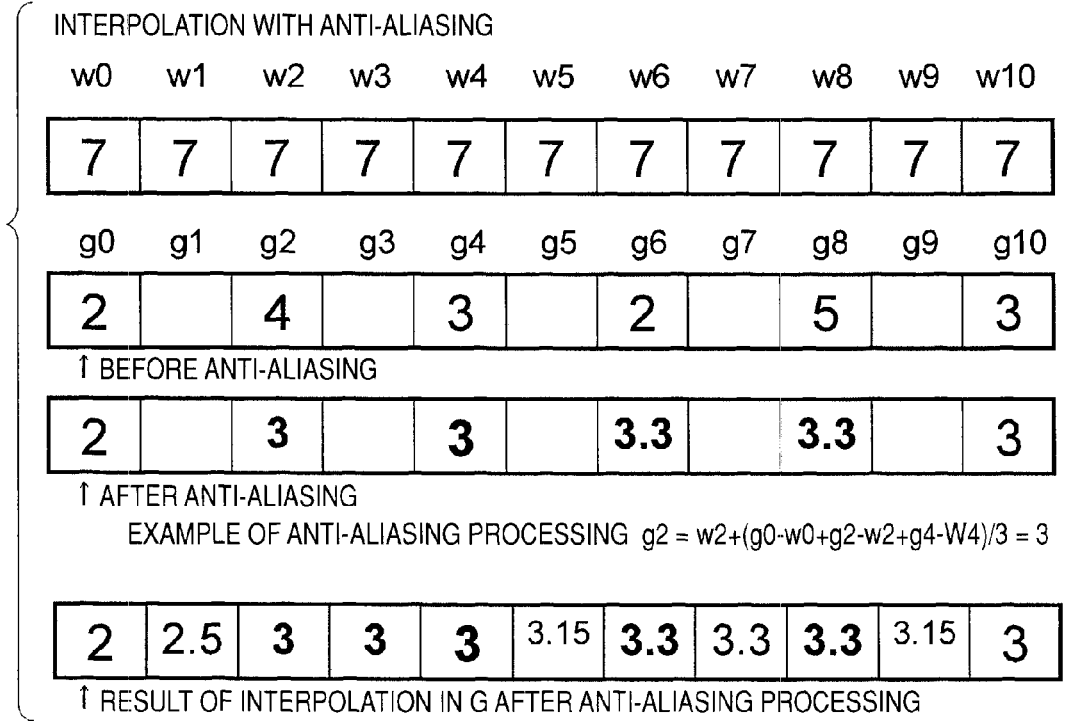

FIGS. 30A and 30B are views illustrating an anti-aliasing effect at the time of interpolation processing based on a color signal system. FIG. 30A is an example of interpolation without anti-aliasing, and FIG. 30B is an example of interpolation with anti-aliasing. The high-sensitivity mosaic image W is in an ideal state, and a signal level of a green image G varies due to a noise. Similarly, it is considered that signal levels of both a red image R and a blue image B also vary, but variations in signal levels in the R/G/B pixels come apart, the image is viewed as a noise with color. In addition, if interpolation is performed in addition to a phase difference of R/G/B, the effect is not insufficient even if the high-sensitivity mosaic image W is referred. The anti-aliasing processing is a method of making a change such that variations in the R/G/B pixels become the same as that of the high-sensitivity mosaic image W. Thus, since a common reference called the high-sensitivity mosaic image W exists at the time of anti-aliasing processing, the variation in the R/G/B is suppressed and an effect of suppressing a false color is increased.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
a first detecting portion that detects components of incident light with a first sensitivity and by dividing a wavelength region into a plurality of component wavelength regions;
a second detecting portion that detects the incident light in the wavelength region with a second sensitivity that is higher than the first sensitivity and without dividing the wavelength region into the component wavelength regions; and
a signal processing unit including a high sensitization signal processing portion (i) that acquires a first signal indicating a measured amount on the basis of a unit signal corresponding to each component detected in the first detecting portion and (ii) that executes a sensitivity correction operation on the unit signal corresponding to each component detected in the first detecting portion by using the first signal indicating the measured amount and a second signal of the component in the wavelength region, which signal has high sensitivity and is detected in the second detecting portion,
wherein,
the high sensitization signal processing portion includes a color signal interpolation processing portion that performs pixel interpolation processing,
the signal processing unit further includes a correlation detecting portion that detects correlation of image information on the basis of the second signal of the component in the wavelength region,
the correlation detecting portion calculates a horizontal and vertical correlation coefficient and an inclination correlation coefficient, and supplies the horizontal and vertical correlation coefficient and the inclination correlation coefficient to the high sensitization signal processing portion,
the high sensitization signal processing portion executes the sensitivity correction operation using high-sensitivity information detected in the second detecting portion and performs processing for suppressing incorrect color information during an execution of demosaic processing for generating information, in which wavelength components or sensitivity is uniform, from mosaic shaped information, in which wavelength components or sensitivity varies, for all pixel positions, the demosaic processing including the pixel interpolation processing, and
the processing for suppressing the incorrect color information being performed at least in the color signal interpolation processing portion at the time of the pixel interpolation processing, the pixel interpolation processing including performing a correlation correction for each of directions of interpolation processing, the directions including horizontal, vertical, and inclination directions, by referring to a respective correlation coefficient supplied from the correlation detecting portion.

2. The solid-state imaging device according to claim 1, wherein the color signal interpolation processing portion performs the pixel interpolation processing based on difference information between the first signal indicating the measured amount and the second signal of the component in the wavelength region.

3. The solid-state imaging device according to claim 1, wherein the color signal interpolation processing portion performs pixel interpolation processing on the basis of proportional information between the first signal indicating the measured amount and the second signal of the component in the wavelength region.

4. The solid-state imaging device according to any one of claims 1 to 3, wherein the high sensitization signal processing portion further includes an anti-aliasing processing portion that performs anti-aliasing processing on the basis of difference information between the first signal indicating the measured amount and the second signal of the component in the wavelength region.

5. The solid-state imaging device according to any one of claims 1 to 3, wherein the high sensitization signal processing portion further includes an anti-aliasing processing portion that performs anti-aliasing processing on the basis of proportional information between the first signal indicating the measured amount and the second signal of the component in the wavelength region.

6. The solid-state imaging device according to claim 1, wherein within one arrangement unit of a plurality of first detecting portions and a plurality of second detecting portions, a number of the second detecting portions is larger than a number of the first detecting portions.

7. An imaging apparatus comprising:
a first detecting portion that detects components of incident light with a first sensitivity and by dividing a wavelength region into a plurality of component wavelength regions;
a second detecting portion that detects incident light in the wavelength region with a second sensitivity that is higher than the first sensitivity and without dividing the wavelength region into the component wavelength regions;
a signal processing unit including a high sensitization signal processing portion that acquires a first signal indicating a measured amount on the basis of a unit signal corresponding to each component detected in the first detecting portion and that executes a sensitivity correction operation on the unit signal corresponding to each component detected in the first detecting portion by using the first signal indicating the measured amount and a second signal of the component in the wavelength region, which signal has high sensitivity and is detected in the second detecting portion; and
a control unit that controls processing in the signal processing unit,
wherein,
the high sensitization signal processing portion includes a color signal interpolation processing portion that performs pixel interpolation processing,
the signal processing unit further includes a correlation detecting portion that detects correlation of image information on the basis of the second signal of the component in the wavelength region,
the correlation detecting portion calculates a horizontal and vertical correlation coefficient and an inclination correlation coefficient, and supplies the horizontal and vertical correlation coefficient and the inclination correlation coefficient to the high sensitization signal processing portion,
the high sensitization signal processing portion executes the sensitivity correction operation using high-sensitivity information detected in the second detecting portion and performs processing for suppressing incorrect color information during an execution of demosaic processing for generating information, in which wavelength components or sensitivity is uniform, from mosaic shaped information, in which wavelength components or sensitivity varies, for all pixel positions, the demosaic processing including the pixel interpolation processing, and
the processing for suppressing the incorrect color information being performed at least in the color signal interpolation processing portion at the time of the pixel interpolation processing, the pixel interpolation processing including performing a correlation correction for each of directions of interpolation processing, the directions including horizontal, vertical, and inclination directions, by referring to a respective correlation coefficient supplied from the correlation detecting portion.

8. The imaging apparatus according to claim 7, wherein:
the color signal interpolation processing portion includes one of: (a) a first interpolation processing portion that performs the pixel interpolation processing on the basis of difference information between the first signal indicating the measured amount and the second signal of the component in the wavelength region and (b) a second interpolation processing portion that performs the pixel interpolation processing on the basis of proportional information between the first signal indicating the measured amount and the second signal of the component in the wavelength region, and
the high sensitization signal processing portion further includes at least one of:
(a) a first anti-aliasing processing portion that performs anti-aliasing processing on the basis of difference information between the first signal indicating the measured amount and the second signal of the component in the wavelength region, and
(b) a second anti-aliasing processing portion that performs anti-aliasing processing on the basis of proportional information between the first signal indicating the measured amount, and the second signal of the component in the wavelength region.

* * * * *